(12) United States Patent
Sheha et al.

(10) Patent No.: US 7,913,179 B2
(45) Date of Patent: Mar. 22, 2011

(54) METHOD AND APPARATUS FOR SENDING, RETRIEVING AND PLANNING LOCATION RELEVANT INFORMATION

(75) Inventors: Michael A. Sheha, Laguna Niguel, CA (US); Angie Sheha, Laguna Niguel, CA (US); Stephen Petilli, Laguna Niguel, CA (US)

(73) Assignee: TeleCommunication Systems, Inc., Anapolis, MD (US)

( * ) Notice: Subject to any disclaimer, the term of this patent is extended or adjusted under 35 U.S.C. 154(b) by 839 days.

(21) Appl. No.: 11/888,992

(22) Filed: Aug. 2, 2007

(65) Prior Publication Data
US 2008/0036778 A1    Feb. 14, 2008

Related U.S. Application Data

(62) Division of application No. 10/378,980, filed on Mar. 3, 2003, now Pat. No. 7,271,742.

(60) Provisional application No. 60/360,737, filed on Mar. 1, 2002.

(51) Int. Cl.
*G06F 3/048* (2006.01)
*G01C 21/00* (2006.01)
*G01C 21/30* (2006.01)

(52) U.S. Cl. ........ 715/769; 701/200; 701/201; 701/202; 701/210; 701/211

(58) Field of Classification Search .................. 715/769; 701/210, 202, 201, 211
See application file for complete search history.

(56) References Cited

U.S. PATENT DOCUMENTS

| | | | | |
|---|---|---|---|---|
| 4,939,662 | A | | 7/1990 | Nimura et al. |
| 5,389,934 | A | * | 2/1995 | Kass ......................... 342/357.07 |
| 5,557,254 | A | * | 9/1996 | Johnson et al. .......... 340/426.19 |
| 5,636,122 | A | * | 6/1997 | Shah et al. ..................... 701/207 |
| 5,684,951 | A | | 11/1997 | Goldman |
| 5,689,269 | A | * | 11/1997 | Norris ....................... 342/357.08 |
| 5,689,809 | A | * | 11/1997 | Grube et al. ................... 455/457 |
| 5,727,057 | A | | 3/1998 | Emery et al. |
| 5,774,824 | A | * | 6/1998 | Streit et al. ..................... 701/207 |

(Continued)

FOREIGN PATENT DOCUMENTS

GB    2305568    4/1997

(Continued)

OTHER PUBLICATIONS

Supplementary European Search Report in European Appl. No. 06839236.4 dated Dec. 6, 2010.

(Continued)

*Primary Examiner* — Tadeese Hailu
*Assistant Examiner* — Nicholas S Ulrich
(74) *Attorney, Agent, or Firm* — William H. Bollman

(57) ABSTRACT

The present invention is directed to a method and apparatus for sending and retrieving location relevant information to a user by selecting and designating a point of interest that is displayed on a graphical user interface and sending the location information associated with that point of interest to a receiver that is also selected using the graphical user interface. The location relevant information may also include mapped routes, waypoints, geo-fenced areas, moving vehicles etc. Updated location relevant information may also be continuously sent to the user while generating updated mapping information on the graphical user interface. The present invention may be practiced by using communication devices such as a personal computer, a personal digital assistance, in-vehicle navigation systems, or a mobile telephone.

54 Claims, 36 Drawing Sheets

U.S. PATENT DOCUMENTS

| | | | |
|---|---|---|---|
| 5,801,700 A * | 9/1998 | Ferguson | 715/748 |
| 5,802,492 A | 9/1998 | DeLorme et al. | |
| 5,904,727 A | 5/1999 | Prabhakaran | |
| 5,926,118 A | 7/1999 | Hayashida | |
| 5,944,768 A * | 8/1999 | Ito et al. | 701/200 |
| 5,982,301 A | 11/1999 | Ohta | |
| 6,049,718 A | 4/2000 | Stewart | |
| 6,084,951 A | 7/2000 | Smith | |
| 6,091,957 A | 7/2000 | Larkins et al. | |
| 6,138,003 A * | 10/2000 | Kingdon et al. | 455/410 |
| 6,138,072 A | 10/2000 | Nagai | |
| 6,169,516 B1 | 1/2001 | Watanabe | |
| 6,182,006 B1 | 1/2001 | Meek | |
| 6,182,227 B1 | 1/2001 | Blair | |
| 6,185,426 B1 | 2/2001 | Alperovich et al. | |
| 6,188,957 B1 | 2/2001 | Bechtolsheim | |
| 6,204,844 B1 * | 3/2001 | Fumarolo et al. | 715/736 |
| 6,208,934 B1 | 3/2001 | Bechtolsheim et al. | |
| 6,226,367 B1 | 5/2001 | Smith | |
| 6,263,278 B1 | 7/2001 | Nikiel et al. | |
| 6,317,684 B1 * | 11/2001 | Roeseler et al. | 701/202 |
| 6,321,158 B1 | 11/2001 | DeLorme et al. | |
| 6,331,825 B1 * | 12/2001 | Ladner et al. | 340/988 |
| 6,353,664 B1 | 3/2002 | Cannon | |
| 6,366,782 B1 * | 4/2002 | Fumarolo et al. | 455/457 |
| 6,366,856 B1 | 4/2002 | Johnson | |
| 6,377,210 B1 | 4/2002 | Moore | |
| 6,415,224 B1 | 7/2002 | Wako | |
| 6,434,482 B1 | 8/2002 | Oshida et al. | |
| 6,441,752 B1 * | 8/2002 | Fomukong | 340/988 |
| 6,442,391 B1 * | 8/2002 | Johansson et al. | 455/456.2 |
| 6,459,782 B1 | 10/2002 | Bedrodian | |
| 6,466,788 B1 * | 10/2002 | Carlsson | 455/435.2 |
| 6,529,143 B2 | 3/2003 | Mikkola et al. | |
| 6,539,080 B1 | 3/2003 | Bruce | |
| 6,563,824 B1 | 5/2003 | Bhatia | |
| 6,571,174 B2 * | 5/2003 | Rigazio et al. | 701/209 |
| 6,621,423 B1 * | 9/2003 | Cooper et al. | 340/995.24 |
| 6,643,516 B1 | 11/2003 | Stewart | |
| 6,665,715 B1 | 12/2003 | Houri | |
| 6,674,849 B1 | 1/2004 | Froeberg | |
| 6,766,174 B1 | 7/2004 | Kenyon | |
| 6,775,371 B2 | 8/2004 | Elsey | |
| 6,791,477 B2 | 9/2004 | Sari et al. | |
| 6,801,850 B1 * | 10/2004 | Wolfson | 701/209 |
| 6,816,782 B1 * | 11/2004 | Walters et al. | 701/209 |
| 6,819,919 B1 * | 11/2004 | Tanaka | 455/414.1 |
| 6,829,532 B2 | 12/2004 | Obradovich | |
| 6,839,630 B2 | 1/2005 | Sakamoto | |
| 6,842,696 B2 | 1/2005 | Silvester | |
| 6,873,907 B1 | 3/2005 | Millington et al. | |
| 6,885,874 B2 * | 4/2005 | Grube et al. | 455/520 |
| 6,895,329 B1 * | 5/2005 | Wolfson | 701/209 |
| 6,910,818 B2 | 6/2005 | McLoone | |
| 6,925,603 B1 | 8/2005 | Naito | |
| 6,944,535 B2 | 9/2005 | Iwata | |
| 6,970,871 B1 * | 11/2005 | Rayburn | 1/1 |
| 6,983,203 B1 | 1/2006 | Wako | |
| 7,079,945 B1 | 7/2006 | Kaplan | |
| 7,142,163 B2 | 11/2006 | Connor | |
| 7,142,205 B2 | 11/2006 | Chithambaram | |
| 7,167,187 B2 | 1/2007 | Scott | |
| 7,202,801 B2 | 4/2007 | Chou | |
| 7,266,376 B2 | 9/2007 | Nakagawa | |
| 7,653,544 B2 | 1/2010 | Bradley | |
| 2002/0032036 A1 | 3/2002 | Nakajima | |
| 2002/0052786 A1 | 5/2002 | Kim et al. | |
| 2002/0059201 A1 | 5/2002 | Work | |
| 2002/0069239 A1 * | 6/2002 | Katada et al. | 709/202 |
| 2002/0086683 A1 * | 7/2002 | Kohar et al. | 455/456 |
| 2002/0169539 A1 * | 11/2002 | Menard et al. | 701/200 |
| 2003/0014487 A1 * | 1/2003 | Iwakawa et al. | 709/204 |
| 2003/0036949 A1 | 2/2003 | Kaddeche | |
| 2003/0061211 A1 | 3/2003 | Shultz et al. | |
| 2004/0008225 A1 | 1/2004 | Cambell | |
| 2004/0204829 A1 | 10/2004 | Endo | |
| 2004/0229595 A1 | 11/2004 | Laursen | |
| 2005/0062636 A1 | 3/2005 | Conway | |
| 2005/0219067 A1 | 10/2005 | Chung | |
| 2005/0242168 A1 | 11/2005 | Tesavis | |
| 2007/0004461 A1 | 1/2007 | Bathina | |
| 2007/0208687 A1 | 9/2007 | O'Connor | |
| 2008/0077324 A1 | 3/2008 | Hatano | |
| 2008/0129475 A1 | 6/2008 | Breed | |
| 2008/0288166 A1 | 11/2008 | Onishi | |
| 2010/0268848 A1 | 10/2010 | Maurya | |

FOREIGN PATENT DOCUMENTS

| | | |
|---|---|---|
| WO | WO-96/36930 | 11/1996 |

OTHER PUBLICATIONS

Supplementary European Search Report in European Appl. No. 02 75 0138 dated Oct. 13, 2010.

* cited by examiner

METHOD AND APPARATUS FOR SENDING, RETRIEVING AND PLANNING LOCATION RELEVANT INFORMATION

CROSS-REFERENCE TO RELATED APPLICATIONS

The present invention is a division of U.S. patent application Ser. No. 10/378,980 filed Mar. 3, 2003, which claims the benefit under 35 USC 119(e) of U.S. provisional patent application Ser. No. 60/360,737 filed Mar. 1, 2002, the contents of both which are incorporated by reference herein.

BACKGROUND

1. Field of Invention

This present invention relates to a computerized mapping and real-time communication software program, and more specifically, to integrating or coupling computerized mapping and real-time communication software for the purpose of transferring location-related information using a real-time communication system.

2. Description of the Related Art

Computerized mapping and real-time communication software are independently achieving widespread use today. Such mapping programs are commonly used to automate tasks of calculating routes, viewing location-specific geographical areas for their spatial content, such as addresses, roadways, rivers, etc., and for the purpose of being used with Global Positioning System (GPS) devices for various applications, such as a personal navigation application. Mapping software programs apply to a wide variety of uses, such as personal navigation, telematics, thematic mapping, resource planning, routing, fleet tracking, safety dispatching (i.e., Police, Fire, and Rescue organizations), and a wide variety of specialized Geographic Information System (GIS) applications, all of which are well known to people skilled in the art.

Real-time communication software applications are also being used today in various applications, like Instant Messaging (IM) applications such as American Online's (AOL) IM (AIM), Yahoo's IM, and Microsoft's IM, all of which are well known to people skilled in the art. None of these prior art IM software applications contain mapping capabilities. These applications provide presence information about other users on a user's roster or buddy list, such as online, busy, away, on the phone, offline, etc., and are primarily used for non-commercial applications, such as for conversing with friends or buddies that are online.

Prior art applications provide various features, such as displaying driving directions (i.e., routes), Points Of Interest (POI), waypoints (such as personalized, user-specific, points on a route or along a track), etc., but do not enable the transfer of such information to other users in real-time. A user will typically copy an image of a map from a standard mapping program, usually with a highlighted route, and e-mail the bitmap image and/or directions to another user or group of users for the purpose of meeting at a specific location or POI, such as a restaurant. Alternatively, with the adoption of IM programs, users can transfer these images and directions, typically by using an integrated file transfer program (FTP) connection, in real-time to other users based on their presence, and obtain real-time feedback from their buddies about the destination POI or location and specific route used to get to the destination.

Current applications that integrate both mapping and real-time messaging are well known in the art, such as the Automatic Vehicle Location (AVL) or Fleet Tracking industry, where vehicles that have position devices, such as GPS, report their position to a centralized computer for the mapping and display of the vehicles' locations. Some of these prior art systems may incorporate real-time messaging for the transfer of logistical information, such as pickup and drop-off status messages. However, these existing applications do not provide a method for dynamically and graphically transferring location-relevant information coupled with a spatial map. Additionally, these applications typically provide only one-way transfer of position information, from the mobile vehicle to the dispatcher application, either on a web-based or desktop-based program. Usually, there is no need to transfer the dispatcher's location to the mobile vehicle since the dispatcher's location is always stationary. Mobile devices typically use location telemetry devices to transmit their location in a pre-defined manner or by request, where the dispatcher's location request is usually initiated by clicking on a Graphical User Interface (GUI) or by using a set of preferences to automatically request position updates. These preferences are based on various parameters, such as reporting location updates based on the distance traveled by the vehicle or by using various time intervals to trigger position updates either by a push or pull method relative to the telemetry device.

Another problem with existing AVL software solutions are that most applications are web-based applications that only allow for static image-based mapping, such as those provided by various online mapping companies like MapQuest. Also, the mapping and communication systems are disjointed from each other, as is the case with various companies, such as Televoke, Inc. These static image-based mapping applications do not enable real-time graphical manipulation of POIs on the map, nor do they provide a graphical connection between the map and vehicle roster listing. Some AVL software solutions provide the ability to display moving vehicles on dynamically viewable maps. However, these solutions do not enable the user to select a vehicle on the map, nor a stationary representation of a vehicle in a roster list, in real-time for the purpose of sending the vehicle's location to other users, and thus do not allow the creation of ad-hoc position transfers between various parties. Some dynamic mapping applications, such as Microsoft's MapPoint application, allow users to select Points Of Interest (POI) generally for the purpose of providing additional information about the POI or enabling the user to add the POI to a route planner as a route start, end, or stop point. This POI is selected by 'right-clicking' on the object after it has been selected and then choosing the specific route option. However, prior art fails to provide real-time communication capability with location-relevant information (i.e., POIs) for the purpose of graphically sending location-relevant information in established or ad-hoc networks to other users or location-enabled devices.

Another problem with prior art, such as in the case of AVL software solutions, is that vehicles or other mobile devices that a user wishes to map must first be selected from a list of available position-enabled vehicles. These vehicles, however, must already be configured for mapping on a dispatcher's mapping application and do not enable position requests in an ad-hoc environment. Prior art AVL mapping and tracking systems, such as At Road Inc., only allow users to select from a list of pre-configured location-updating vehicles, and then require the user to press a button in order to map the location of the selected vehicle(s). A much better solution, as people skilled in the art will appreciate, is to select a user, device, or group of users and devices in a roster list and graphically drag-and-drop the selection onto an active map. This method significantly simplifies the process of identifying a single or group of user(s)/device(s) and mapping their location appropriately. Additionally, prior art AVL systems do not allow for the case of users or devices to disallow their position from being mapped on the current mapping application.

There also exists a need for the consideration of permissions in such a case of privacy concerns, where a real-time location request be sent across the real-time communication connection to the user, vehicle, or device, whose location information is being requested. The user, vehicle, or device can select the resolution of position information they want to communicate (i.e., latitude and longitude, or city, or state, or etc.) to control the level of accuracy to which they can be mapped. Once approved, this ad-hoc transfer of position information occurs and the graphical mapping of the received position information is completed on the requestor's mapping application. Thus, allowing users to initiate position requests graphically and in real-time, and providing the capability of ad-hoc position requests to other users not pre-configured to allow their location information to be mapped, provides an extremely efficient method and system when compared to prior art systems.

Another drawback of prior art is that integrated mapping and communication programs, such as AVL applications, provide the ability for the receiving of position information for mapping purposes only. These prior art systems do not provide the capability of sending, or pushing, location-relevant information, such as POIs, to other mapping programs or textual devices, such as Personal Digital Assistants (PDA), pagers, cell phones, etc. For instance, prior art mapping systems, such as Microsoft's MapPoint, allow the user to select POIs, such as restaurants and gas stations, but does not allow the user to transfer these POIs to other users, and more specifically does not allow users to graphically drag-and-drop these selections (i.e., POIs) for various purposes, such as to dynamically add them to a route planner for inclusion in an undefined route or pre-calculated route.

The integration of a highly dynamic mapping application and a real-time communication system enables users to select POIs, such as houses, theaters, city names, roads, etc., or icon representations of other users on a mapping program for the purpose of graphically sending location-relevant graphical information, such as the selected POIs, to a specific user on a roster listing of available online users in real-time. As people skilled in the art will appreciate, graphical location-relevant information is not limited to only POIs, but also includes mapped routes, waypoints, geo-fenced areas, planes, etc. A valuable feature that prior art fails to provide is the transfer mechanism that allows the ability to drag-and-drop this location-relevant map information (i.e., routes, geo-fenced areas, etc.) to the current application's roster list for such transfers.

Prior art systems, such as AVL software, also fail to provide the capability of allowing the map application user (i.e., in the case of an AVL software solution the user is typically denoted as the dispatcher) to send the position information of one vehicle to another vehicle on the user's roster list for an ad-hoc location transfer. This method of transferring information is best performed by dragging the icon representation of one vehicle to the icon representation of another vehicle in the user's roster list. Before the completion of the transfer of one vehicle's location information to another vehicle, where the user or dispatcher acts as the location-transfer hub, each user sets the appropriate permissions to allow the transfer. Thus, each of the vehicles' roster lists do not need to be included in the other vehicle's roster list, since the user or dispatcher has both vehicles on its roster list and acts as the hub for the transfer of the position information. This creates a dynamic environment for ad-hoc position transfers that are not available in prior art systems.

As an additional drawback of prior art systems, there is no way to provide real-time route planning of a system consisting of a real-time communication system integrated with a mapping and real-time communication program. In other words, it is not currently possible for a roster icon representation of a vehicle or user to be graphically selected into, or dragged-and-dropped onto, a route planner for the purpose of setting a user's current position as a route's destination points, where the term 'destination' refers to a point or location on a map that the user indicates as a start of a trip, end of a trip, or stop or waypoint along a trip. Origin also is used to refer to the start of a trip. This route planning operation also applies to POI locations. For instance, prior art systems, such as Microsoft's MapPoint allows users to graphically alter a pre-calculated route, such as graphically indicating the portion of the route to alter.

However, current art systems do not allow the capability of selecting real-time location-enabled or static POIs (such as vehicles, restaurants, people, gas stations, houses, etc.) for the purpose of graphically adding to, or updating, a route's destination points in an undefined or pre-calculated route. Additionally, this prior art system application only allows the alteration of a route to a new destination by dragging the selected portion of the route to that new location. A more useful method, which can incorporate the integrated real-time communication system, is by allowing the user to drag a graphical representation of a location-relevant object, such as POI (i.e., restaurant, gas station, house, user, etc.), to the pre-calculated route itself or to a route planner, thus graphically altering the pre-calculated route by creating a destination point based on the dragged POI's location information. If the POI has a static location, and its position information is already known, then the real-time communication system is not utilized. However, if the POI is dynamic (i.e., a moving vehicle), then the real-time communication system is utilized to obtain the position information of the selected dynamic POI in real-time, thus producing a dynamically moving route, where the destination point can change its position in real-time, thus causing the route to continually update it parameters based on the moving object. Another advantage for using the dynamic route calculation, is as the POI moves its location, the entire route need not be re-calculated in real-time, but only that portion of the route that needs to be re-calculated.

An additional problem with current map planning applications or integrated mapping and real-time communication software applications, such as AVL software solutions, is that they do not provide the capability of allowing users to graphically transfer routes to other users in real-time. Current prior art systems that are capable of generating routes allow users to send route representations, such as bitmap images or driving directions, to other users either by e-mail or FTP connection, where these routes representations only provide a static set of information, such as the starting and ending (i.e., destination) points of the predefined route. The route is usually generated based on the sender's origin and destination, or is based on generic major roadways that are easily identifiable in the immediate area.

A more useful implementation, when compared to prior art systems, would enable users to transfer or 'share' pre-defined routes, including all of the destination and turn points of the route and all of the metrics used to calculate the route, in real-time, so that they can be incorporated into the recipient user's routes or dynamically viewed on the recipient user's map. In the case of an in-vehicle navigational system, transferring a vehicle's actual route to another vehicle or graphical application allows the other user to view in real-time the exact location of that vehicle relative to the route that vehicle is traveling along. An additional benefit of this more useful application would be that the recipient of the route would be able to use in their route planner tool the sent destination points (i.e., stop points, end point, etc.), and use their own current location as the route's origin. For example, prior art systems, such as MapQuest or MapBlast, allow users to send image representations of static routes to other users. However, these routes are relative to the sender's location. There needs to be a method to create a route that can automatically include the received route's destination points while recalculating the route relative to the recipient's current position.

Thus, a need exits for a method and system that allows users to graphically send, request, and plan, in real-time, location-relevant information between users and devices. Until now, an adequate solution to those problems has eluded those skilled in the art. Providing a solution enabling users to graphically send, request, and plan, in real-time, location-relevant information between users and devices would prove especially useful for wireless devices that incorporate positioning technologies, such as Global Positioning Satellite (GPS) devices. This provides great benefits to wireless in-vehicle navigational systems (i.e., telematics) and fleet tracking systems, since they would be able to make more efficient use of position information by including a real-time communication infrastructure and application with a graphically enabled interface.

SUMMARY OF THE INVENTION

It is an object of the present invention to provide a method and system for the receipt of location-relevant information, or user or group contact information, such as personal data information (i.e., vcard or personal profile information), from a list of users or group of users, where users can include inanimate objects (i.e., phones, vehicles, boats, database, device, etc.) or living things (i.e., people, pets, etc.), for the purpose of mapping the location information by graphically selecting and dragging the icon representation of the user, contact, or group of users and/or contacts to a map.

In accordance with the preferred embodiment of the present invention, the location-relevant information can be stored locally, typically with contact information, cached from a recently received location update, or location information can be automatically requested in real-time from a specified user or group of users where a user may include an online database storage system. Once the location-relevant information (e.g., latitude, longitude, altitude, heading, etc.) has been received, that location is mapped based on varying resolution and size. In one embodiment, a user can select another user, typically from a roster list, and drag-and-drop the user onto a map in order to automatically map this other user's current location. The mapped user can be in the form of a contact, where the location information (i.e., vcard), such as an address, is typically stored locally in the storage system of the computing device, or the user can be in the form of a roster list of users connected via a real-time communication system. In the case of a roster list, the location information can be in the form of vcard information, and may also include position information from various positioning devices, such as a GPS device. In both cases, the remote user to be mapped (e.g., person, phone, vehicle, etc.) could receive a message showing the request for their position information.

Upon accepting the request to send their position information, the requesting user's real-time communication program would receive the remote user's position information from the remote user and transfer the remote user's position information to the requesting user's mapping application to be displayed on a graphical map. The remote user can also be considered to be in the form of an online database storage system. In essence, all of the previous steps are performed using a simple selection and drag-and-drop operation. It should be noted that the mapping application and the real-time communication application do not have to be fully integrated (i.e., they can be separate applications), but do preferably include a conduit for transferring position information between the two applications. Integrating the two applications typically provides for a better user experience, but is not required by this object.

It is another object of the present invention to provide a method and system for receiving location-relevant information from a list of users or group of users, where users can include inanimate objects (i.e., phones, vehicles, boats, etc.) or living things (i.e., people, pets, etc.), for the purpose of requesting, in real-time and in an ad-hoc environment, the users' position information for mapping their location(s) by pushing a button or selecting from a menu list in a real-time communication program, such as an instant message application. In one embodiment, a user engaged in an instant message conversation with a mobile wireless phone user desires to obtain the position of said wireless phone user. The requesting user can push a button on the instant message window, or select a menu bar option, to initiate the request of the wireless phone user's position information. After the mobile wireless phone user has allowed the transfer of its own position information, the requesting user's mapping application can automatically display the location of the wireless phone user. Additionally, the requesting user could have also initiated the position request by selecting the body of an instant message window and performing a drag-and-drop operation onto the mapping application. In this manner, the user is able to request the position information of another user and automatically map it quickly, easily, using an ad-hoc position request method and system.

It is another object of the present invention to provide a method and system for sending location-relevant information to a single or list of users or group of users, in real-time and ad-hoc environment, by pushing a button on a real-time communication instant message window. In one embodiment, a user engaged in an instant message session can push a button to send their own position information to the other user or group of users that are currently participating in the instant message session. The recipient user or group of users can have the option to accept or decline the transfer of the said position information, and, upon acceptance, the recipient user's mapping application can automatically perform a mapping operation.

It is another object of the present invention to provide a method and system for sending location-relevant information objects, such as routes, POIs, waypoints, user's locations, geo-fenced areas, vehicles, planes, etc., to other users or groups of users, where users can include inanimate objects (i.e., devices, phones, vehicles, boats, database, etc.) or living things (i.e., people, pets, etc.), by means of a graphical operation on a user or group in a list or on a graphical icon representation of a user or group and via a real-time communications system.

It is another object of the present invention to provide a method and system for selecting location-relevant information object(s) (e.g., routes, users, POI, etc.) on a graphical map for the purpose of sending location-relevant information object(s) to other users or a group of users by first selecting the location-relevant information object(s) and either using a graphical operation, such as dragging and dropping, the object(s) to a user or group listing representation, such as an icon of the destination user or group, or by selecting from a menu the user or group list of the destination user or group of users to send the location-relevant object(s) information to. In one embodiment, a user can select a position-enabled object (e.g. POI) from a graphical map and either drag-and-drop the POI to a user or group in a list, or select from a menu list the specific destination user or group of users to which the POI should be sent.

It is another object of the present invention to provide a method and system for allowing a user to accept or reject the receipt of location-relevant information, such as routes, another user's location information, POIs, etc., by their real-time communication program. Upon receipt of said location-relevant information, the information can be automatically mapped in an accompanying mapping application. The mapping application and the real-time communication application do not have to be fully integrated (i.e., they can be separate applications), but they do require a conduit, such as a software application program interface (API), for transferring said position information between the two applications. In one embodiment, a remote user that has been sent location-relevant information, such as a POI, can receive a notification message indicating that the POI will be transferred upon acceptance of the request. Upon acceptance of the request, the POI will be transferred to the destination user, who can then have the option to map the received POI or display the textual location and name of the POI, or both. This preference information can be configured in real-time or pre-configured in the application preferences of the real-time communication application.

It is another object of the present invention to provide a method and system for allowing a user to graphically initiate the transfer of location information, in an established or ad-hoc real-time environment, between a user or group of users, or any combination thereof. In one embodiment, a user that has a list of N other users can select an icon representation of a user or group of users and initiate the transfer of the location information of the selected user or group of users to a destination user or group of users other then themselves. The initiating user essentially acts as the hub for graphically initiating and transferring the location information between users and/or groups of users. The initiating user can perform this graphical initiation of a location transfer by highlighting a user or group of users from a list or graphical icon representation, and select from a pop-up menu or list the destination user or group of users to which the location information should be sent. Additionally, the initiator can start the location transfer by selecting the icon representation of the user or group of users from a list or graphical icon representation, and then dragging-and-dropping it to another icon or list representation of a user or group of users, or any combination thereof, for the purpose of sending or transferring said location information. Before the location transfer is completed, permission settings can be obtained from the origin and destination users or groups of users. It is not a requirement that the origin and destination user or group of users include each other in their own roster list, since only the initiating user needs to have both origin and destination users or groups of users in their roster lists.

It is another object of the present invention to provide a method and system for sending your position information to a list of users or group of users, in real-time, by selecting a graphical icon representation of yourself and dragging and dropping the icon onto a user or group of users. In one embodiment, a user wanting to send their own position information to a group of users can select their own icon representation and drag-and-drop said icon representation onto the icon representation of the group of users who should receive said position information. In one embodiment, each user in the group will have the option of accepting or declining said position information transfer, and each receiving user that accepts the position information transfer has a mapping application that automatically performs a mapping operation to display the received position information on a graphical map.

It is another object of the present invention to provide a method and system for receiving a route that may or may not include the sender's real-time location along that route for display in real-time on the recipient's graphical mapping application. In one embodiment, an in-vehicle navigation system on a defined route may need to transfer that route to a desktop computer. The route, and all of its parameters, can be transferred to the desktop's mapping application for display. Additionally, the sender of the route can include and send their own real-time position information with the route for display on the desktop computer's mapping application. When the sender initiates such a transfer, the sender's real-time communication application is configured to send its own location on the route to the recipient, via a real-time communication system, at any given interval of time, distance change, or upon the sender's request. The recipient's real-time communication application is configured to receive these location updates from the sender, which then triggers the recipient's mapping application to display the updated location of the sender. Thus, the real-time communication application not only provides the ability to send the route, but to transfer the vehicle's real-time position information in order for it to be mapped.

It is another object of the present invention to provide a method and system for sending routes to other users and enabling the recipients of said routes to dynamically change the received route's origin to be the recipient's current location or the closest starting position relative to the received route. The destinations in the received route can remain a common element between the sender and the recipient, but the origin, or closest starting position relative to the received route, can change to be the recipient's current position information on the received route, thus allowing a new route to be calculated based on the recipient's current position information and a common set of received destinations. All of the received destinations are optional, but at least one received destination is required to calculate a new route from the recipient's current position. For example, if the initiator sends, or shares, their current route with another user (i.e., recipient), the recipient user can receive the sent route with the original origin and destinations of the route. The recipient's mapping application can then dynamically re-calculate a new route based on all or a subset of the received route's destinations and with an origin being the recipient's current real-time position information.

It is another object of the present invention to provide a method and system for graphically selecting a user or group of users, where a user can include an inanimate object (i.e., phone, vehicle, boat, etc.) or living thing (i.e., person, pet, etc.), or a contact, all of which have position information associated with them, and graphically modifying a pre-calculated route to include the location of the selected user(s) for the purpose of preparing and calculating a new route. In one embodiment, a user can select an icon representation of another user, group of users, or contact from a list and drag-and-drop said icon representation onto a pre-calculated graphically-displayed route for the purpose of modifying said route by inserting into that route as destinations the location(s) of the selected user(s), such that the inserted destinations are placed after the destination point that immediately preceded the route segment where the icon was dropped, and before the destination point that immediately followed the route segment where the icon was dropped. In this manner, the user is able to add a new route destination simply by dragging an icon representation of the user, group of users, or contact onto a pre-calculated route.

The position information can be either locally stored, as is typically the case with contacts, or can be retrieved and updated in real-time as the position information changes, which may be very useful for a user that is defined as a mobile phone or vehicle. One advantage of the present invention is that the entire route need not be recomputed each time a destination is updated. Only the portion of the route that was changed can be recalculated. For example, if a route consists of origin point A and destination points B then C, and an additional destination is added in-between points A and B, then only the portion of the route between A and B needs to be recalculated to include the added destination. In another embodiment, a user can select another user, group of users, or contact icon representation from a list and drag-and-drop said icon representation into a route planner window, such that the order of the route destinations are arranged as previously described, with the new destination point being inserted in the route between the points immediately preceding and following the point where the icon was dropped. If there is no destination point immediately preceding or immediately following the point where the icon was dropped, then that new route destination point becomes the origin or destination, respectively, of the new route. The minimal route calculation can compute the route segment consisting of the new destination point and the destination points immediately preceding and immediately following the new destination point can then be recalculated. However, the entire route may be recalculated to maximize overall route optimization. The retrieval of the position information is the same as described in previous objects, but in this embodiment the route would not automatically calculate a new route until the user instructs it to be calculated.

It is another object of the present invention to provide a method and system for graphically adding location-relevant information objects, such as POIs, city names, street names, user icon representations, vehicles, etc., as additional destinations to a pre-calculated route or to a route planner. In a mapping application, graphically selecting location-relevant information objects, such as POIs, dragging said objects to a pre-calculated graphically-displayed route, and dropping said objects onto the route enables the addition of destination points, based on the selected location-relevant information objects, along said route at the point where they were graphically dropped. The need for the mapping program to calculate which portion of the route to alter is eliminated since the user selects the appropriate portion directly with the selected location-relevant information object. In one embodiment, a location-relevant object, such as a gas station POI, is selected and dragged to the graphically displayed pre-calculated route, and then dropped onto a particular route segment on the map. This action automatically adds the POI as a destination point, where the order of the destination point in the route is determined by the object's drop point, and automatically recalculates the route with the new inserted destination point included. Another benefit is that the entire route need not be recalculated, but only the segment of the route upon which the object was dropped needs to be computed. For example if 6 points define a route and a POI is added between points 5 and 6, the drop point being labeled point 5a, then only the route segments from point 5 to 5a and from point 5a to 6 need to calculated, not the entire route (i.e., points 1, 2, 3, 4, 5, 5a, and 6).

This object also applies to another embodiment of a method for graphically selecting location-relevant information objects, such as POIs, and dragging-and-dropping said objects to a route planner for the purpose of adding additional origin or destination points along said route. The difference in this embodiment is that the POI is not dropped onto a pre-calculated graphically displayed route, but onto a route planner instead. The benefit of the previous embodiment also applies to this embodiment, in that the entire route does not need to be recalculated, but only the portion of the route into which the new destination point is inserted can be recomputed. Also the route can be a pre-calculated route or a route that is being planned and still needs to be calculated.

It is another object of the present invention to provide a method and system for selecting a graphical icon representation of a user on a map and dragging it onto a POI on a map, or visa versa, for the purpose of creating a dynamically-generated real-time route and adding that route between the location user and POI to a route planner. The selected user's position information is updated either through the real-time communications system, or if the selected user is the application user, the position information is updated from a locally connected positioning device (e.g. GPS). The POI is sometimes considered a static location-relevant object, such as a gas station, house, restaurant, city location identifier, etc., whose position remains relatively unchanged. In one embodiment, a user tracking a vehicle on a map that wishes to obtain a route for said vehicle to a gas station can select the vehicle's graphical icon representation on the map and drag-and-drop it onto an icon representation of a restaurant on the map. This action can generate a route from the selected vehicle's current position on the map to the location of the restaurant and may create a new route in a route planner consisting of the origin as the selected vehicle's current location and the destination as the selected POI's location.

One advantage of this method and system is that the real-time communication system allows the vehicle to move while the route is dynamically updated using the vehicle's new position information as the origin of the route and using the restaurant POI as the destination. Another benefit of this object is that if there are two or more destinations (i.e., three or more route points) the entire route does not need to be recalculated, but only the portion of the route that has been changed, by real-time position updates of location-relevant objects such as the vehicle, needs to be computed.

It is another object of the present invention to provide a method and system for graphically creating a dynamic route between two moving location-relevant objects on a map. A location-relevant object is a map object that has a spatial component associated with it, such as latitude and longitude values, and is graphically selectable by the user. Selecting an icon representation for a dynamic location-relevant object, such as a vehicle, person, plane, boat, etc., where the position of the dynamic location-relevant object can change with time and its real-time position updates can be received via the real-time communications system or locally when connected to a local positioning device such as a GPS receiver, and dragging and dropping said object representation onto another icon representation of a dynamic location-relevant object will create a route between the two dynamic objects and/or add the objects into a route planner, depending on the user's preferences. The object that was first selected is considered the starting point, or origin, of the route, and the second selected object is considered the destination point of the route. If any new position updates for either dynamic location-relevant object occurs, the route between the two dynamic location-relevant objects will be re-calculated, thus enabling a constantly updated dynamic route. Another benefit of this object is that if there are two or more destinations (i.e., three or more route points) the entire route does not have to be recalculated, but only the portion of the route that has changed, including any real-time position updates of location-relevant objects.

It is another object of the present invention to provide a method and system for graphically adding location-relevant objects on a map to a route planner. The selection of an icon representation of a location-relevant object on a map, such as a vehicle, pet, person, boat, wireless phone, computer, city name, street name, park, etc., followed by the use of a drag-and-drop operation to a route planner window in order to drop said location-relevant object into the route planner window adds the said object to the route planner for the purpose of either updating a pre-calculated route or creating a new route. The order that the location-relevant object is dropped into the route planner window directly affects the order of the destination points of the route, and thus the route itself. In one embodiment, a route planner window display consists of a route with three destination points (i.e., four route points including the origin). Selecting an icon representation of a location-relevant object, such as a wireless phone, and then dragging-and-dropping the icon into the route planner between the first and second destination points causes the wireless phone object to become the second destination in the route. Since the wireless phone's location can change with time, the route will be a dynamically calculated route based on changes in its position. Another benefit of this object is that if there are two or more destinations (i.e., three or more route points) the entire route does not have to be recalculated, but only the portion of the route that has changed, including any real-time position updates of location-relevant objects.

It is another object of the present invention to provide a method and system for creating a route by graphically dragging-and-dropping a list or icon representation of a user or group of users onto another list or icon representation of another user or group of users. A route can then be generated between the two location-relevant user objects, or the objects can be included in a route planner window for the purpose of planning a new route. In one embodiment, the origin route point is defined as the first selected and dragged location-relevant user object, and the destination route point is defined as the location-relevant user object that the first object was dropped upon. The position information for these location-relevant user objects, if not stored locally, can be retrieved in real-time using the real-time communication system. In another embodiment, the location retrieval process is based on the approval of the transfer of the required location information by the users.

It is another object of the present invention to provide a method and system for generating or planning a route from a user's current position information to or from the location of a location-relative object that is selected from a list or graphical icon representation on a map using a drag-and-drop action. In one embodiment, a user can select a graphical icon representation of themselves in a list and drag said representation to the graphical icon representation in a list or on a map of any location-relevant object on a map, such as another user or a static POI, for the purpose of generating a route. The route's origin can be the user's current position information, and the destination can be the position information of either a dynamic location-relevant object, such as a mobile user, where the real-time position information is received via the real-time communications system, or can be a static location-relevant object, such as a POI (i.e., gas station), where the position information may already be known. In the case where the position information for a POI is not known, it can be retrieved using the real-time communication system connected to a database where the appropriate position information is stored.

It is another object of the present invention to provide a method and system for generating a graphical route history based on a dynamically generated or changing route. A pre-calculated route with two or more destination points will be recalculated when any of those destination points change due to a position update via the real-time communication system. Instead of deleting the previous pre-calculated-route, the route portion that is different from the original route is graphically displayed differently than the recalculated route, thus providing the user with a greater amount of information. In one embodiment, an icon representation of a location-relevant object, such as a car, that has been included into a pre-calculated route along with a stationary POI, such as a gas station, can initially display the pre-calculated route on a map. If the car's position, as updated via the real-time communication system, changes and is updated on the map display, such that the previous pre-calculated route no longer applies, a new route can be calculated based on its new position information and displayed. The previous pre-calculated route can be displayed using a different highlighted color and pattern than the new route that was just calculated. Another benefit of this object is that if there are two or more destinations (i.e., three or more route points) the entire route does not have to be recalculated, but only the portion of the route that has changed will be displayed differently than the new route segment.

DETAILED DESCRIPTION OF THE EMBODIMENTS

The details of the preferred embodiments of the present invention will now be described with references to FIGS. 1-32.

The present invention provides a method and system for graphically sending (and sharing), retrieving, and planning location-relevant information with a mapping and real-time communications applications, where both applications can be integrated into one application or each application is separate and capable of communicating with the other. The present invention may be embodied in a mapping and real-time communication application, such as the "Map Messenger" application owned and licensed by the Networks In Motion Corporation of Pasadena, Calif.

Figure 1:
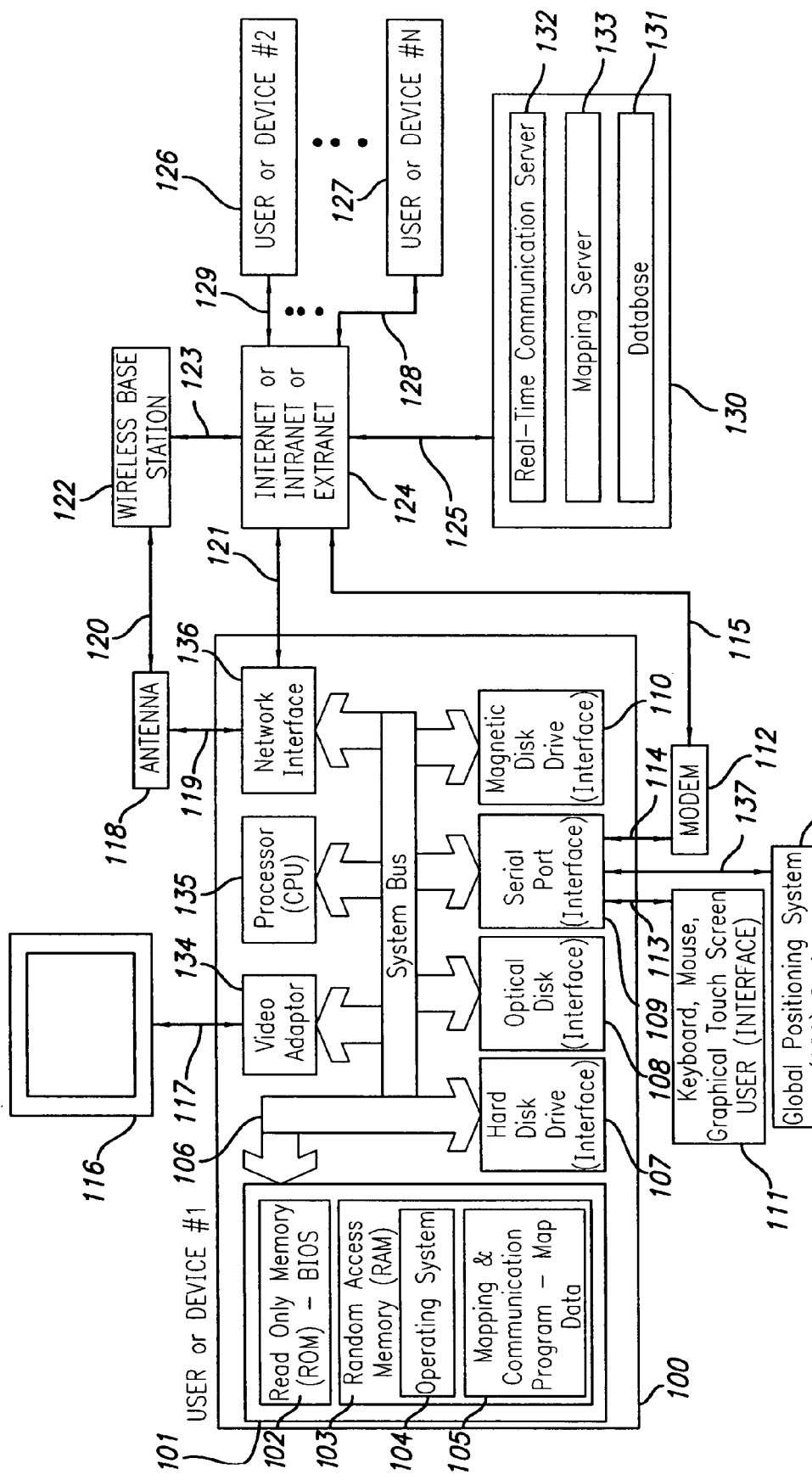
FIG. 1 illustrates a computer system and a network system that provide an operating environment for the present invention.

FIG. 1 illustrates a high-level diagram of one environment that is a suitable computing and networking environment in which the invention may be implemented. The invention will be described in the general context of an application that executes on an operating system in conjunction with a personal computer, but those skilled in the art will realize that this invention also may be implemented in combination with other program modules. Program modules typically include routines, programs, data structures, etc. that perform particular tasks or implement particular abstract data types. This invention is not limited to a typical personal computer, but may also be utilized with other computing systems, such as handheld devices, mobile laptop computers, wireless phones, in-vehicle navigation systems, programmable consumer electronics, mainframe computers, distributed computer systems, etc., and the like.

FIG. 1 includes a typical personal computer 100, that includes a central processing unit (CPU) 135, video adapter 134, hard disk drive 107, optical disk 108, serial port 109, magnetic disk drive 110, system bus 106, and network interface 136. The hard disk drive 107 typically refers to a local non-volatile storage system for storing large amounts of data, such as map data. The optical disk 108 typically refers to a CD-ROM disk used for storing read-only data, such as an installation program. The serial port interface 109 is typically used to connect 113 the computer 100 to external devices 111, such as a keyboard, mouse, and graphical touch screen interface, and also can connect 137 to positioning devices 138, such as a GPS receiver. The keyboard and mouse 111, amongst other input devices 138, enable users to input information into the computer 100. The connection 113 & 137 cables can include a serial cable or universal serial bus (USB) cable. Other input devices, that are not shown, may include a joystick, scanner, camera, microphone, or the like.

The magnetic disk drive 110 is typically used to store small amounts data, in comparison to a hard 107 or optical 108 disk drive, and typically lacks the data transfer rates of those other storage drives, but it enables both readable and writable capability. The hard disk drive 107, optical disk drive 108, serial port interface 109, and magnetic disk drive 110 are all connected to the main system bus 106 of the computer 100 for transferring data. A monitor 116 or other type of display device, such as a LCD display, is connected 117 to the computer system's 100 video adapter 134, which is connected to the system bus 106. Additional peripheral output devices, which are not included in this embodiment, such as a printer, speaker, etc., can also be connected to a personal computer 100. The system bus 106 also connects to the network interface 136, central processing unit (CPU) 135, and system memory 101. The system memory 101 contains both random access memory (RAM) 103, and read only memory (ROM) 102, that typically consists of the BIOS (Basic Input/Output System) of the computer, necessary for containing basic routines that enable the transfer of information between elements within the personal computer 100. The RAM 103 stores a number of program modules, such as the Mapping and Communication Program, including Map Data, 105, and the Operating System 104 of the personal computing device 100 or personal computer 100. One example of such a program module 105 can be the "Map Messenger" program previously mentioned.

A network interface 136, shown in FIG. 1, illustrates how data is typically transferred between other computing devices 122, 126, 127, & 130 and a computer 100 through an Internet, Intranet, or Extranet network 124. Additionally, this connection 115 can be implemented using a MODEM 112 that is connected 114 to the personal computing device 100 by using a serial port interface 109. In one embodiment, a computer 100 can connect 121 to a network 124, such as an Internet, Intranet, or Extranet, by various means that are well known in the art, such as by using a Digital Subscriber Line (DSL) cable. Additionally, a computing device 100 can also connect to the Internet 124 by means of a wireless connection 120 to a wireless base station 122, where the antenna is coupled 119 to the network interface 136 of the computing device or personal computer 100. The wireless base station 122 is also connected 123 to the Internet, Intranet, or Extranet network 124 by some means well known to people skilled in the art, such as a T1 connection. A wireless base station 122 can represent a local area network (LAN) base station, such as that used in an office building, or a wide area network (WAN) base station, such as that used in a cellular, Personal Communications System (PCS), 3G, or the like, wireless phone network. The Internet, Intranet, or Extranet 124 allows for connection 129 & 128 to other personal computing devices 126 & 127, such as a wireless phone, hand-held device, in-vehicle navigation (i.e., telematics device), or the like. The Internet, Intranet, or Extranet 124 is also connected 125 to a central or distributed server system 130, however this connection is not necessary in a peer-to-peer environment. This server system 130 can contain a real-time communication server 132, a mapping server 133 which can provide map data for devices that do not have large storage capabilities, and a database 131 where location-relevant information such as POIs can be stored.

Figure 1A:
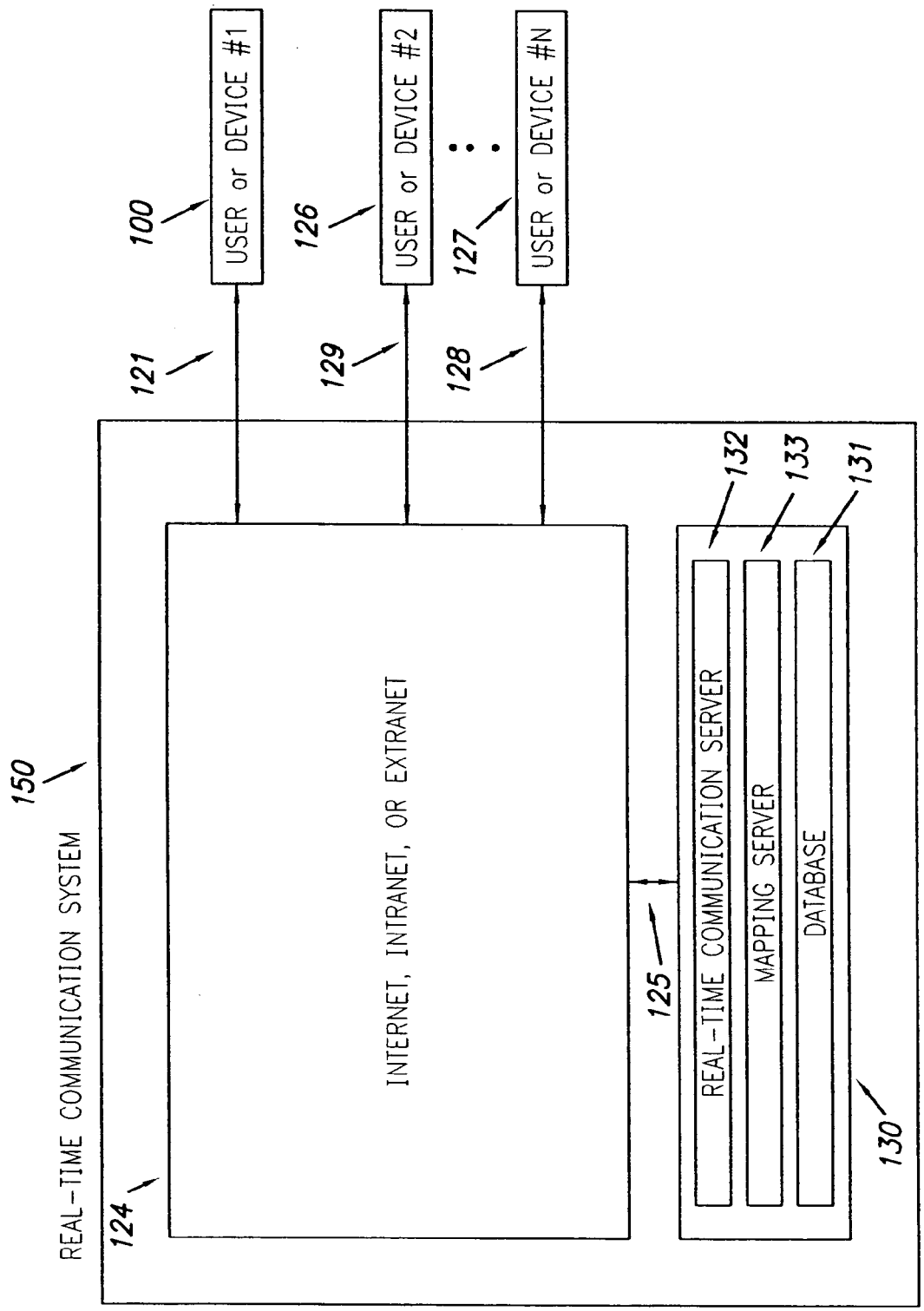

The real-time communication system 150, as illustrated in FIG. 1A, can be either one of two possible systems, both of which apply to this invention. The first embodiment is a peer-to-peer system, where each computing device 100, 126, & 127 is connected to the Internet, Intranet, or Extranet 124 by some means 120, 122, & 123, or 121, or 115, 112, & 114, or 129 or 128, such as a wireless connection or landline connection. This connection provides the capability for all computing devices 100, 126, & 127 to communicate directly with each other, in a peer-to-peer manner. This peer-to-peer environment allows for an ad-hoc user-to-user configuration for sending data to and from all users. The second embodiment, sometime referred to as a star configuration system to people skilled in the art, uses a centralized (or distributed) server system 130 that is connected 125 to the Internet, Intranet, or Extranet 124 providing the infrastructure for all computing devices (100, 126, & 127) where each user's computing device 100, 126, & 127 is connected directly to the server system 130. The server system effectively acts as a router for passing location data to and from individual or groups of users.

Figure 2:
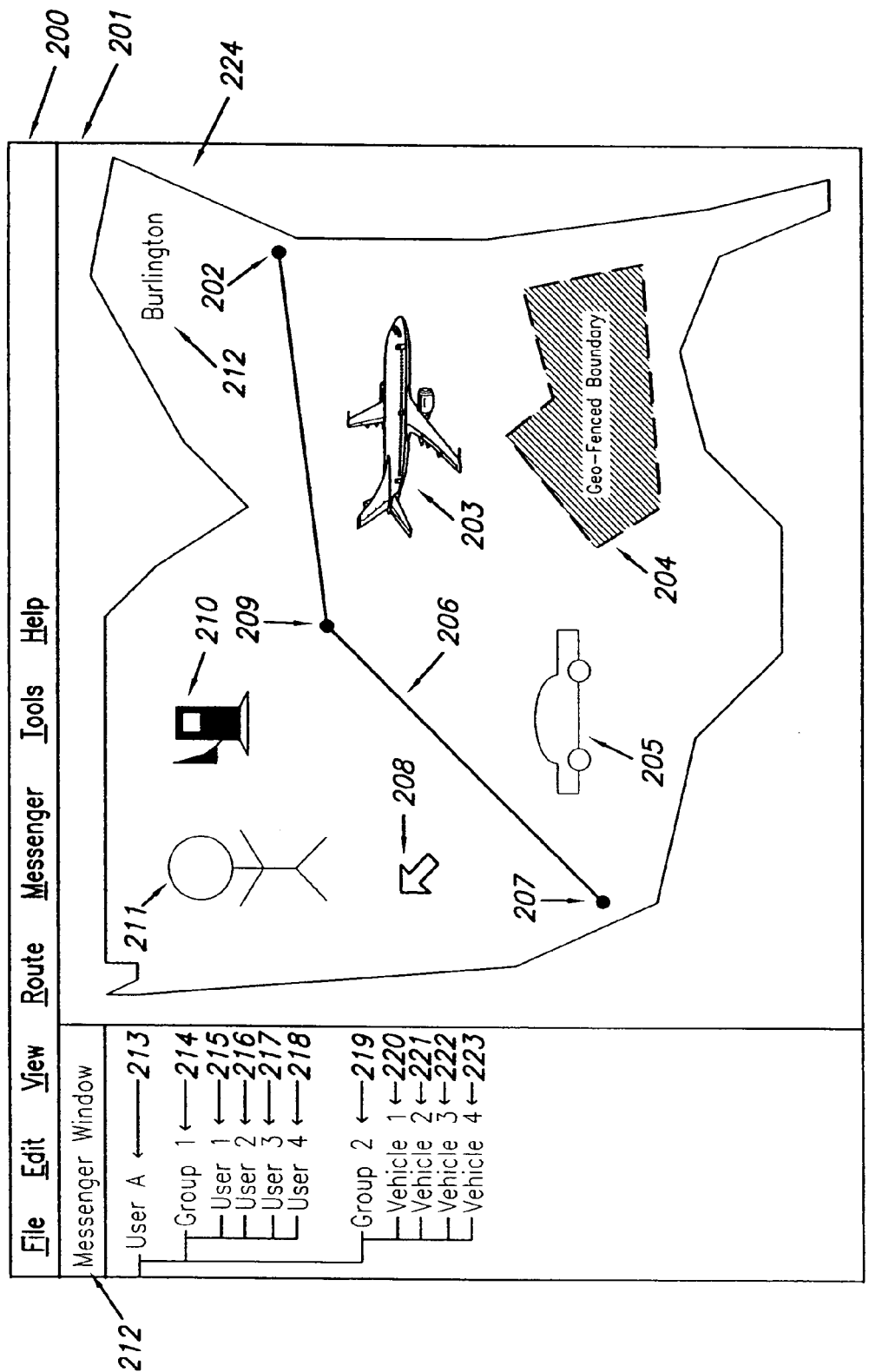
FIG. 2 illustrates one embodiment of the present invention showing a real-time communications program with an integrated mapping environment that displays various location-relevant objects on a map.
Figure 4:
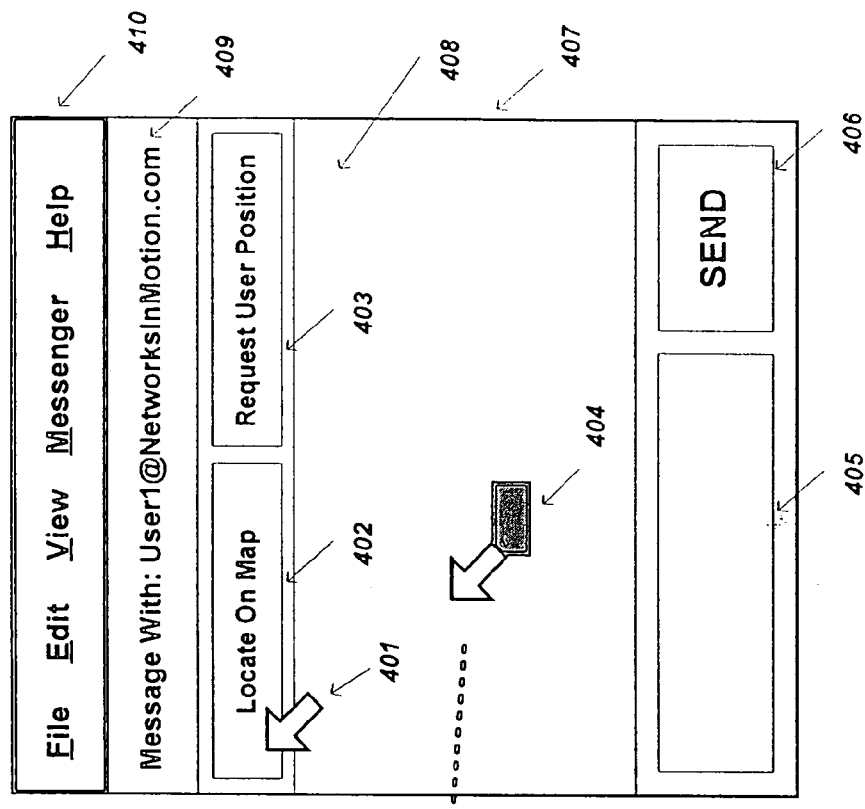
FIG. 4 illustrates one embodiment of the present invention for dynamically mapping a user from an Instant Message window.
Figure 4:
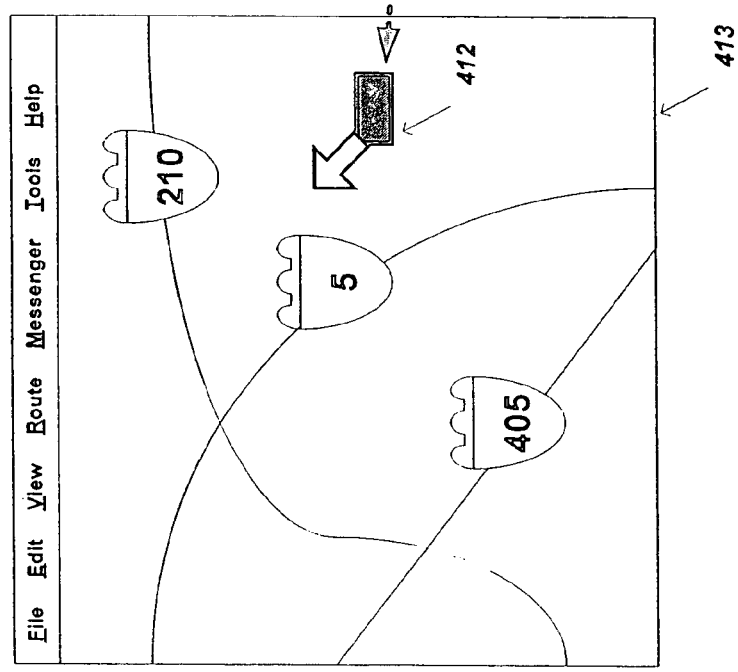
Figure 4A:
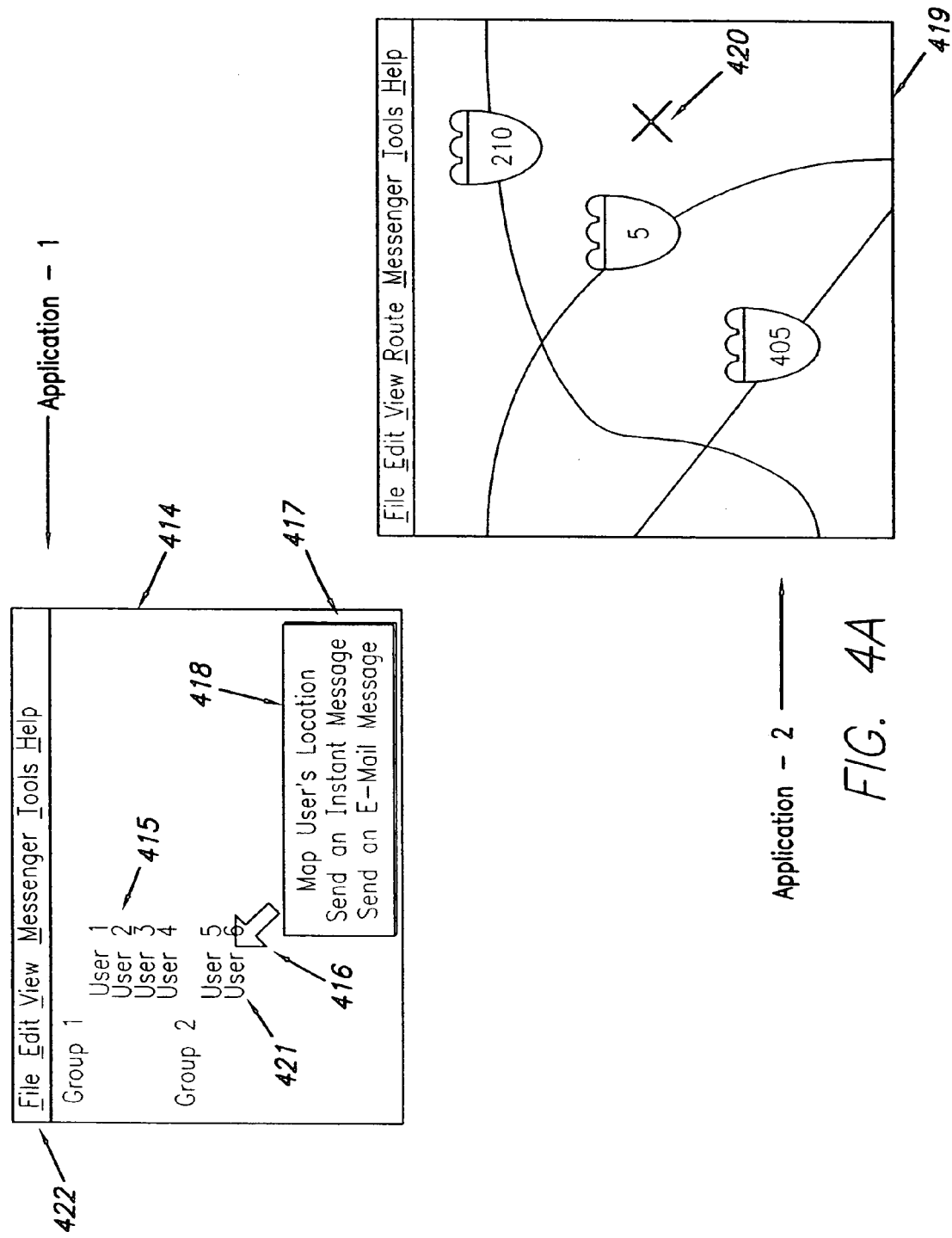
FIG. 4A illustrates one embodiment of the present invention for receiving location-relevant information in an Instant Message program and then mapping the received information in a separate mapping program.

FIG. 2 illustrates an application screen display of the Real-Time Communication and Mapping Program (RTCMP) 201 with a sample map 224 displayed below a menu bar 200. A location-relevant object is a map object that has a spatial component associated with it, such as latitude and longitude values, and is graphically selectable by the user. Identified on the map display 224 are several location-relevant objects 211, 210, 212, 206, 205, 203, & 204, that are selectable either in the RTCMP 201, or, when the two applications have been separated, such as shown in FIG. 4A, in the mapping application 419. A user is an entity, which can be an inanimate object (i.e., phone, vehicle, boat, etc.) or a living thing (i.e., person, pet, etc.) that uses the real-time communications system to communicate with other users. An example of various location-relevant objects, as shown in the sample map 224, includes a person (i.e., user) 211, vehicle (i.e., user) 205, plane (i.e., user) 203, POI (i.e., a gas station) 210, map identifier (i.e., city name) 212, route 206, and a geo-fenced boundary 204. A route 206 is comprised of an origin 207 and one or more destination points 209 & 202, which can each be considered a "link". the route is illustrated as a series of links, such as link 209 that connects an origin 207 and a destination 202. It should be noted, and appreciated to those skilled in the art, that a link need not be a straight line as illustrated in the sample map 224, but rather follows the topography of the roadways calculated between two route points, such as an origin 207 and destination 202 point. However, for simplicity, all links are illustrated as straight lines.

Also provided in the RTCMP 201 is an icon pointer 208, or cursor, that provides a signal to the RTCMP 201 to indicate an active segment of the display 201. When an element or object of the screen display is coincident with the focus of the icon pointer 208, that element or object is said to have the focus of the icon pointer 208. When the input device, such as a mouse, receives a triggered input, such as a mouse click or tap of a touchpad, the element having the focus of the icon pointer 208 at that moment is selected.

The real-time communication 212 part of the application is illustrated to the left of the map 224. The real-time communication feature 212, denoted as the messenger window, preferably provides a listing of users that are connected, in real-time communication, to the user's application. This list of users 212 is denoted as a roster list of users. The top-level user 213, or the controller of the RTCMP 201 program, is illustrated as "User A" 213. "User A" 213 has two groups 214 & 219 beneath it, with each group consisting of four users. The first group, denoted as "Group 1" 214, has four users organized within it, "User 1" 215, "User 2" 216, "User 3" 217, and "User 4" 218. The second group, denoted as "Group 2" 219, also has four users beneath it 220, 221, 222, & 223, where a user in this group 219 is represented here as, for instance, a vehicle.

Figure 3:
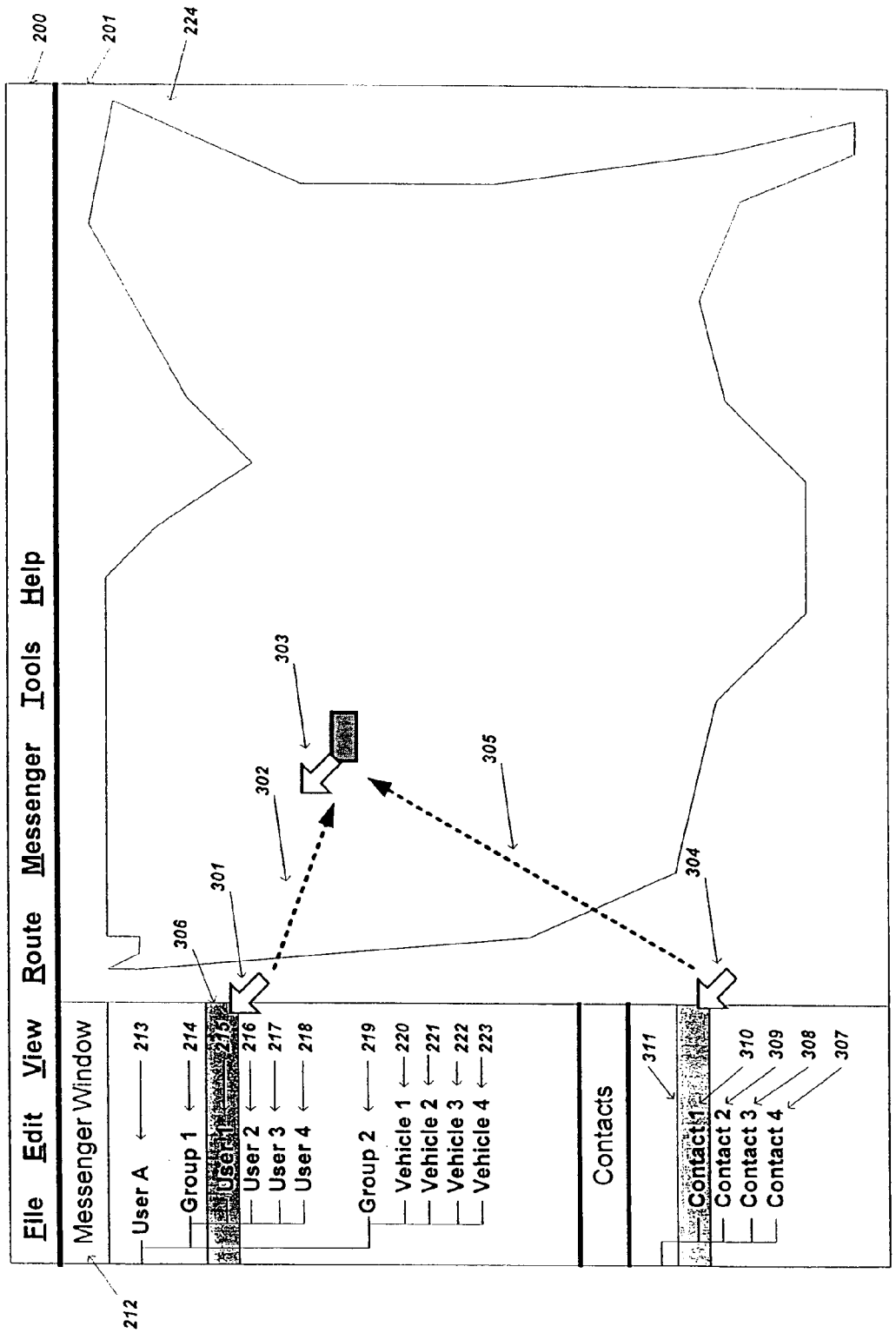
FIG. 3 illustrates one embodiment of the present invention for dynamically mapping a roster list of users and/or contacts using a drag-and-drop operation.

FIG. 3 illustrates one embodiment of a situation where a user can map another user's location using a simple graphical method of selecting a user, contact, or group of users or contacts, and dragging-and-dropping its graphical representation onto the map display 224. For example, in order to map "User 1" 215 icon pointer 301 is used to select the roster list representation of "User 1" 215, typically by such mechanisms as a mouse "click-hold" or a "tap-hold" of a touchpad for a handheld device. This action typically provides feedback to the user by highlighting or outlining 306 the selected user, such as "User 1" 215. The list representation of "User 1" 215 is then dragged 302 into the map display 224, and "dropped" 303, such as when the mouse "click" (or button) or the tapped-hold in a handheld device is dropped. People skilled in the art know that a "drag" or "drop" operation for a desktop computer with a mouse is different than a handheld device, but the essence of both operations remains the same. The drop action generally occurs when the user stops dragging the icon pointer and releases the mouse button. The release of the mouse button, at the point of the focus of the pointer 301 and at the moment the mouse button is released anywhere on the map display 224, is identified by the RTCMP 201.

This "drag-and-drop" operation signals to the RTCMP 201 program to initiate a location request, depending on whether the location information for the selected roster list user is stored locally, as in the form of a contact 311, or remotely, as in the form of a user 215 connected by the real-time communication system 150. If the selected user's location information is stored locally, as is the case with a contact whose location information is typically stored in a vcard that is located locally in the storage medium (such as a hard disk drive 107 or magnetic disk drive 110) of the computing device 100, then the location request retrieves the said location information and uses that for the mapping operation. If the location information is stored remotely, or is updated in an on-demand format, then the real-time communication system 150 is used to retrieve the location information from the remote user, such as "User 1" 215.

Figure 5:
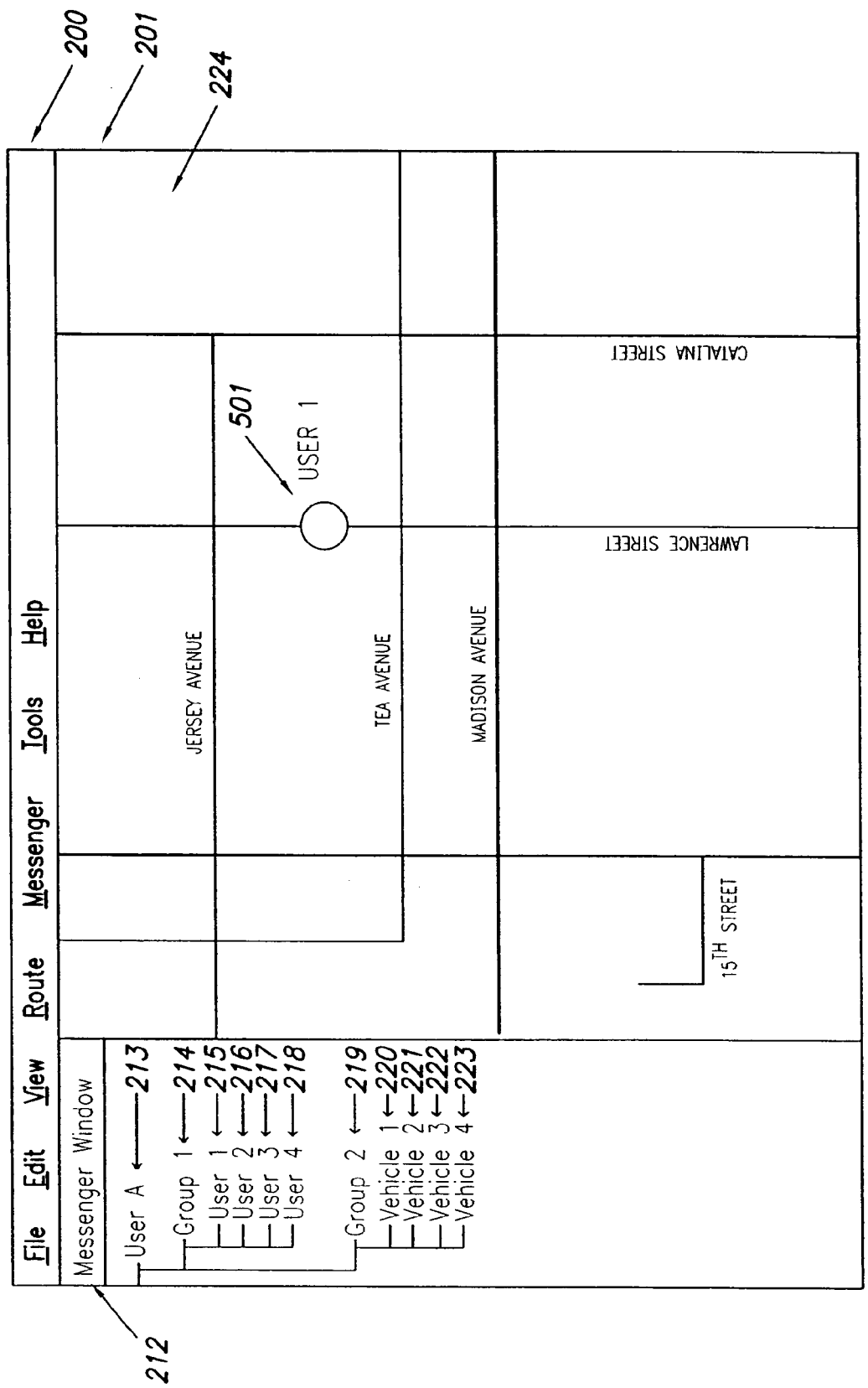
FIG. 5 illustrates one embodiment of the present invention for displaying the location of a user on a graphical map.

In one embodiment, "User 1" 215 represents a user with a wireless phone. After the process of "dragging-and-dropping" the user's graphical representation, such as "User 1" 215, onto the map display 224, the RTCMP 201 uses the real-time communication system 150 to initiate a request for "User 1's" 215 location. This location request is communicated via the real-time communication system 150 to "User 1's" 215 computing device application and either notifies "User 1" of the location request or automatically retrieves "User 1's" current location information from "User 1's" RTCMP 126. A notification of a location request is given to "User 1" if its permissions and/or preferences that specify notifications of location requests are preferably required for "User A" or for all users on "User 1's" roster list. Note that "User 1's" RTCMP 126 does not have to be in the exact form of "User A's" RTCMP 201, but only provide the functionality required by the real-time communication system 150 for the sending of location-relevant information. For instance, "User 1" 215 does not have to have a positioning device, such as a GPS device 138, connected to their RTCMP 126. The location information for "User 1" 215 may only include its vcard information, which is stored locally on "User 1's" computing device. After the location information from "User 1" 215 has been retrieved and sent back through the real-time communication system 150, "User A's" RTCMP 201 maps "User 1's" 215 retrieved location on the map display 224 of varying resolution and size. FIG. 5 illustrates "User 1's" current position 501 on a map display 224 of "User A's" RTCMP 201.

Additionally, in another embodiment shown in FIG. 3, "User A" 213 can select 304 a contact, such as "Contact 1" 311, and, using the same "drag 305 and drop 303" method, can map the contact's location information on the map display 224 of varying resolution and size. As people skilled in the art will appreciate, this "drag-and-drop" method allows users to retrieve and map location information locally or remotely through a real-time communication system 150. In another embodiment, illustrated in FIG. 4, a typical Instant Message (IM) window 407, known to people skilled in the art, includes, for desktop computing devices, a menu bar 410, text entry window 405, and a send button 406 for use in transferring composed messages. An IM window 407 typically also displays the user identification token 409 (i.e. user's name, email address, etc.) of the remote user to which these instant messages are being sent. While engaged in an instant message session with another user 409, the local user (i.e., "User A" 213) preferably types messages that are viewable in the message window display 408, also included in a typical IM window 407. As people skilled in the art will appreciate, in one embodiment, a method for mapping 401 and requesting a user's text location 403 information, as shown in FIG. 4, can be implemented by pressing a button 402 & 403 on an IM window application. For example, if a user wishes to receive another user's current geo-coded street address information, without mapping that user's location on a map, such as receiving the text "738 Lawrence Road, Pasadena, Calif., 91101", a user only need to press a button 403 on an IM window 407. The real-time communication system 150 preferably request from the other user their current location information, which includes obtaining their permission for transferring the said location information.

Figure 4B:
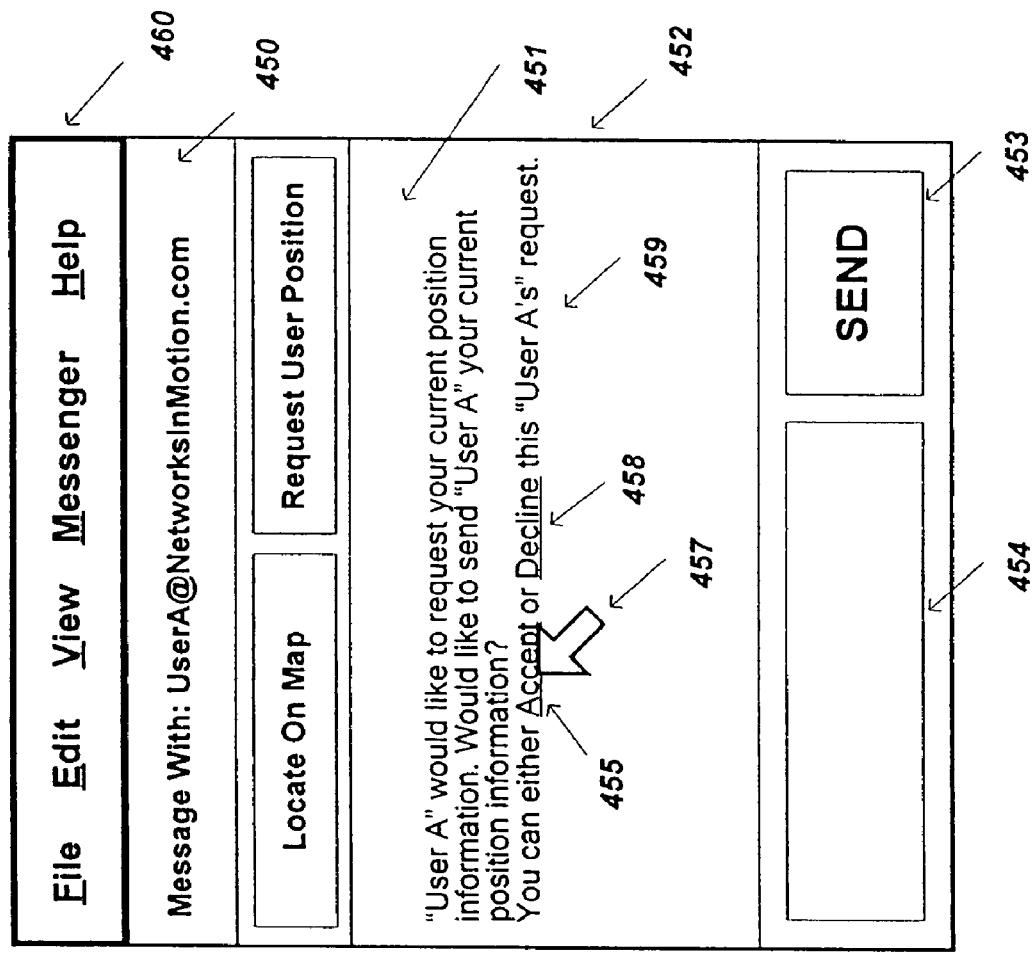
FIG. 4B illustrates one embodiment of the present invention for displaying a location request from another user.

One embodiment of such a permission request is illustrated in FIG. 4B. For example, a user using a similar IM window 452, which illustrates that real-time communication (i.e. instant messaging) is occurring with "User A" 450. The other similarities to the previous IM window 407, such as the menu bar 460, send button 453, and message composition window 454 are also shown. The location request 459 may resemble a message in the message window display 451, displaying the option to accept 455 or decline 458 the location request 459. A user can accept 455 or decline 458 the location request 459 by using an icon pointer 457 to select either choice. Upon accepting the location request 459 from "User A" 450, the local RTCMP would acquire its current position information from a positioning device 138 or from pre-defined position information, such as a default home address stored locally in a computer file. After the location information for the accepting user has been sent to the requesting user's (i.e. "User A") real-time communication program, the IM window 407 will display said location information.

In another embodiment, "User A" 213 can request "User 1's" 409 location information for mapping. The same process is initiated and once the location information for "User 1" 409 has been obtained, a mapping program 413 or map display 224 preferably display on a map of varying resolution and size "User 1's" 409 current location 501. Additionally, another embodiment for mapping "User 1's" 409 location information using the real-time communication system 150 is to graphically select 404 the message display window 408 of the IM window 407 and "drag 411 and drop 412" onto a mapping program 413. This would cause the mapping program 413 to map the user's current location of varying resolution in the map display of the mapping program 413. For both embodiments, where the real-time communication program 407 is not part of the mapping program 413, a hardware or software conduit (e.g., API) is necessary in order to pass the necessary commands that will trigger the mapping program 413 to map the desired location of varying resolution. This mapping operation can also be completed using the 'Locate On Map' 402 button or from a similar action familiar to those skilled in the art.

An additional benefit of this invention, as illustrated in FIG. 4A, is that both the real-time communication program 414 and mapping program 419 need not be integrated into one application. The only requirement is that the two applications allow the transfer of the necessary data required for this invention, which can be accomplished, as people skilled in the art know, by using software API, DLLs, or the like. In another embodiment, as shown in FIG. 4A, a location request and mapping event can be triggered using a real-time communication program 414, by selecting from a menu 417 the function 418 to map a user's location. Current prior art system, such as Microsoft's MapPoint can be integrated with a PIM manger, such as Microsoft's Outlook to allow a user to initiate the MapPoint application such that it displays the address information of a contact by clicking a button in the PIM manager. However, the advantage of this invention over this and other prior art systems, as people skilled in the art will appreciate, is that the location-relevant data is obtained, in a graphical manner, via a real-time communication system 150 from other users or from an Internet-connected database 131.

In another embodiment, a user can use an icon pointer 416 to select a user 421, or set of users 415, whose location information should be mapped on a separate, non-integrated mapping program 419. The user can then invoke the appearance of a pop-up menu 417 or a menu available from the menu bar of the application 422, and then choose the option from either menu to map the user's location. The appearance of the pop-up menu 417 can be invoked either by "right-clicking" the selected user's graphical representation in the roster list, or by using a tap-and-hold operation on a handheld device, which are all well known techniques to people skilled in the art. The pop-up menu 417 would illustrate various actions, one of which is mapping the selected user's location 418. Selecting the option to map the selected user's location would cause the location information to be retrieved as previously described in this section. Once the real-time communication program 414 has received the location information from the appropriate user 421, the program 414 would establish a connection with the mapping program 419 and pass the necessary data to initiate the mapping of varying resolution and size of the retrieved location information 420.

Figure 6:
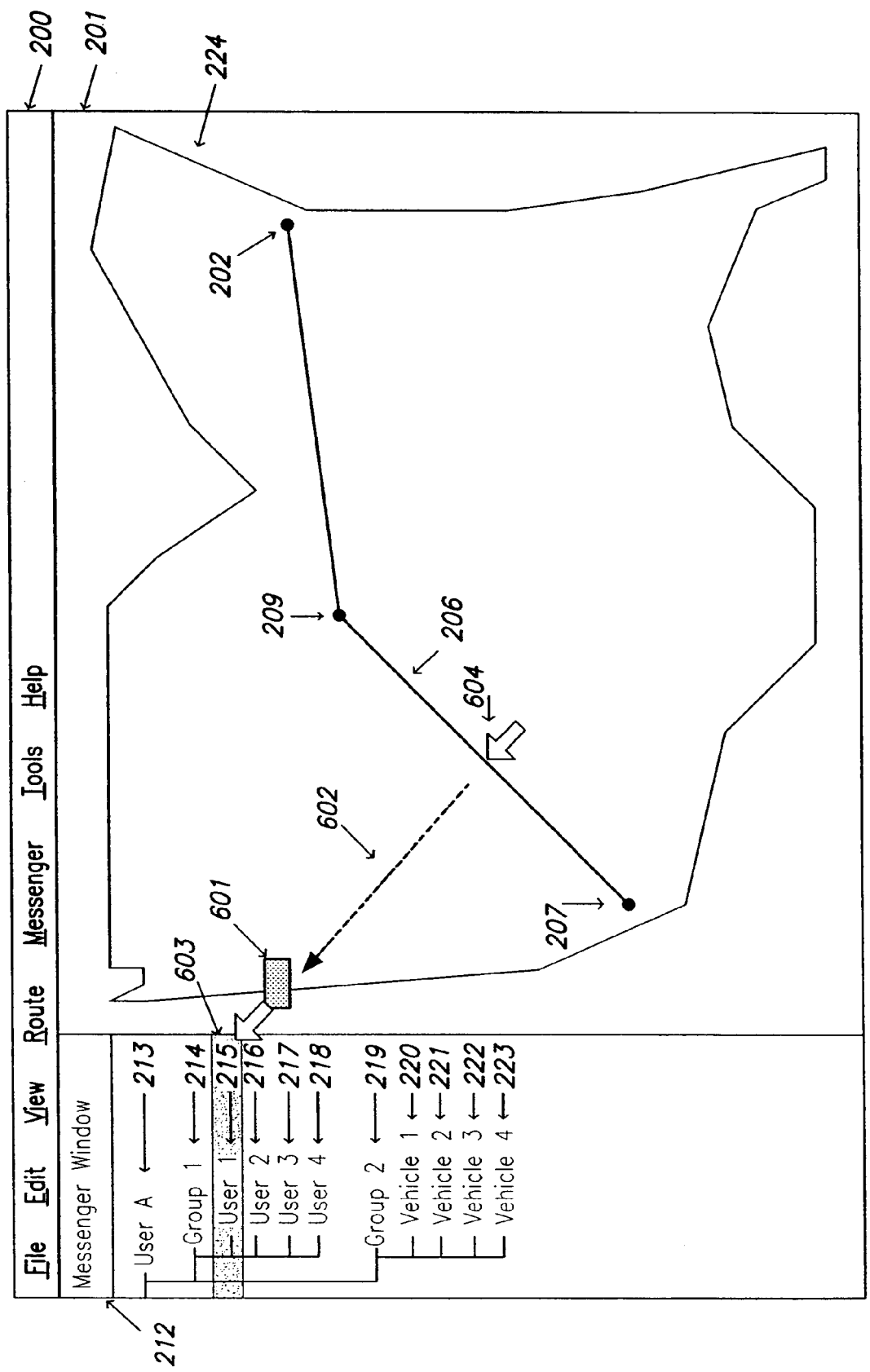
FIG. 6 illustrates one embodiment of the present invention for sending, or sharing, a route with another user by using a graphical drag-and-drop operation.

This invention provides the ability send location-relevant objects to other users, and as people skilled in the art will appreciate, location-relevant objects may include routes. In one embodiment, as shown in FIG. 6, a pre-calculated route 206 is defined as having an origin 207 and one or more destinations 209 & 202. Making a route selectable by an icon pointer 604 enables the local user 213 to initiate the process of sending the route to a user, or group of users in their roster list, as shown in FIG. 6. To send a route to a user or group of users, a local user 213 first selects the route 206 with their icon pointer 604 and drags 602 the route to the graphical representation for the specific roster list user, such as "User 1" 215, to which the route should be sent. The graphical representation for "User 1" 215 illustrates some feedback to the local user 213 controlling the pointer that the route selected 601 is ready to be sent. The feedback, as know to people skilled in the art, is typically shown as a highlighted image 603 on the graphical representation of the selected user that the dragged object should be sent to.

Figure 12:
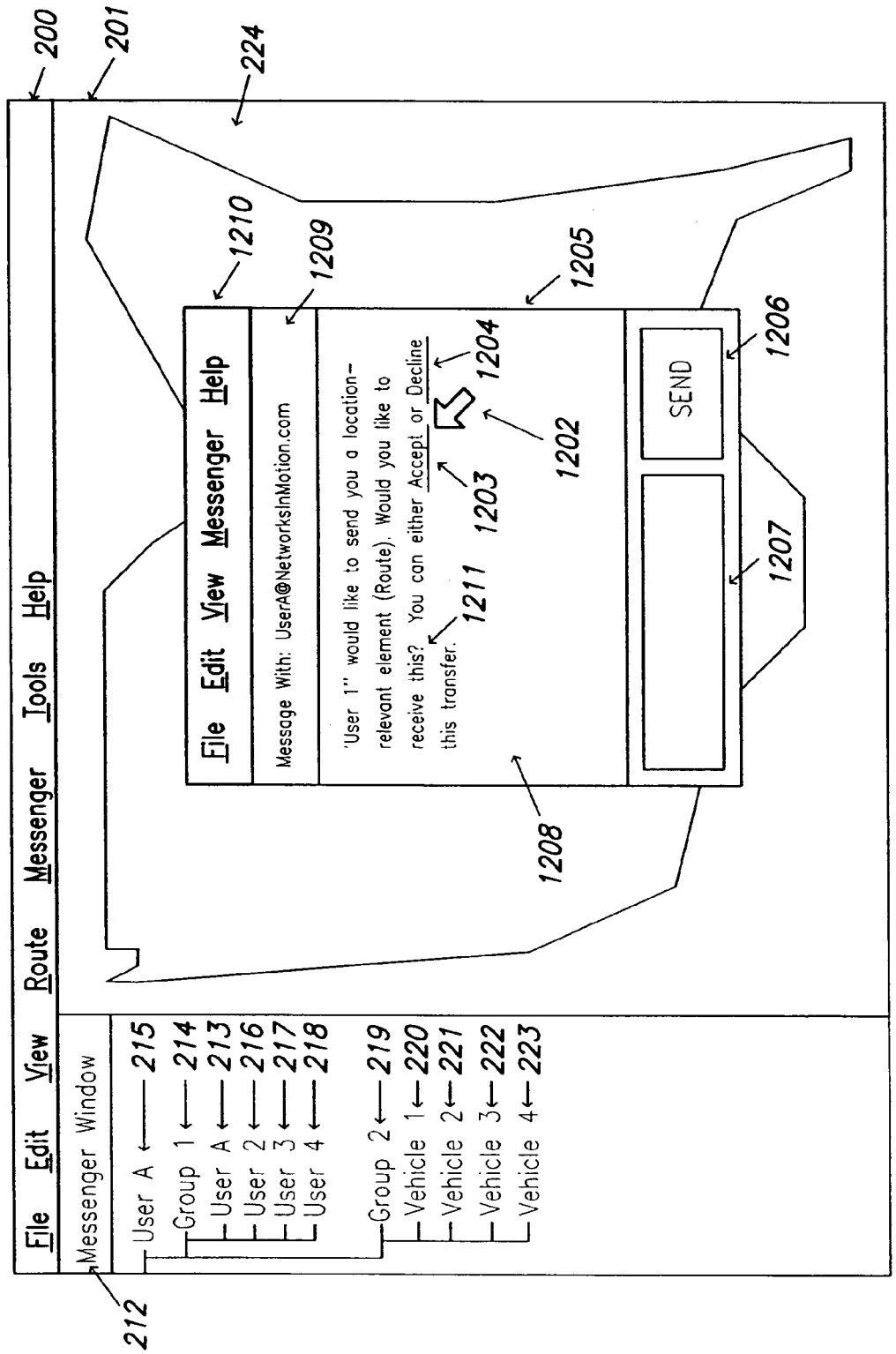
FIG. 12 illustrates one embodiment of the present invention for graphically displaying the request to transfer a location-relevant object.

The two displayed icon pointers 604 & 601 in FIG. 6 illustrate different actions. Specifically, the first pointer 604 illustrates that a user is about to select a location-relevant object, while a second pointer 601 illustrates that an object has been selected and is now being dragged with the pointer 604. Once the route 206 has been dropped onto the graphical representation of the destination user "User 1" 215, the route is sent via the real-time communication system 150 to the destination user "User 1" 215. In this embodiment, the destination user "User 1" 215 has an option to accept 1203 or decline 1204 the receipt of the route from the sender "User A" 213. In one embodiment, as shown in FIG. 12, "User 1" 215 can receive in its IM window 1205 the request for the receipt of location-relevant information, indicating the option to accept or decline the receiving of said route by a message text question 1211 within the IM window's text display 1208. The IM window 1205 is similar to the previously mentioned IM windows 407 & 452, since it also includes a menu bar 1210, a user identification display of the current user the message window is connected with 1209, a text entry window 1207 and a send button 1206. The remote user, "User 1" 215 can accept 1203 or decline 1204 the transfer using their icon pointer 1202.

Figure 6A:
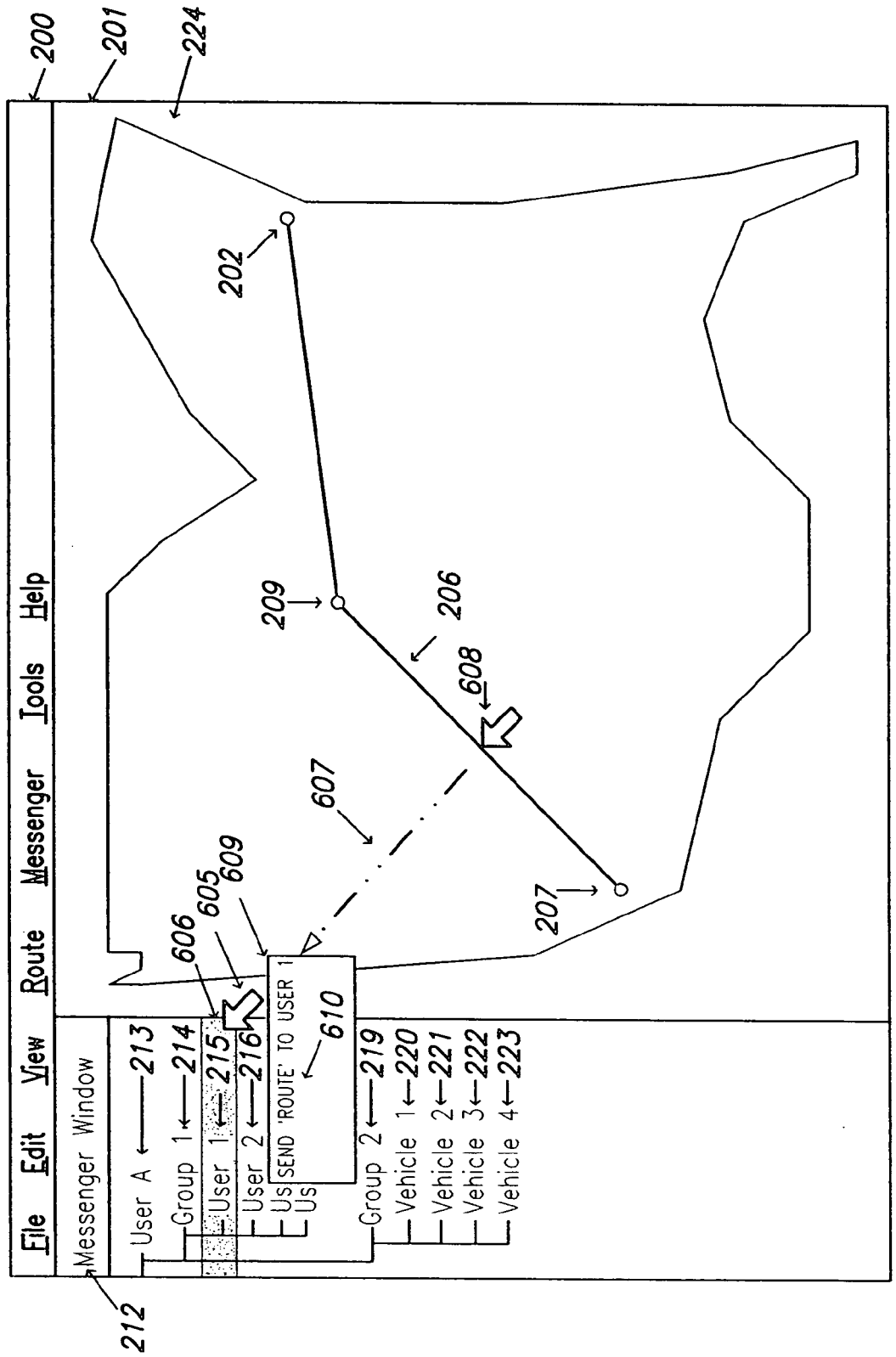
FIG. 6A illustrates one embodiment of the present invention for sending, or sharing, a route with another user by using a graphical menu selection operation.

Additionally, in another embodiment, a user can send a route 206, shown in FIG. 6A, using a similar approach. For example, a user 213 can select the route 608 and then immediately select the user "User 1" 215 to which the route 206 should be sent. This process does not require the drag-and-drop method, displays a different line type 607 to indicate the route sending selection process has begun, and consists of two back-to-back selection processes. The first selection 608 is the selection of the route 206 or location-relevant object, and the second selection 605 is the selection of the destination user 215 to which the route 206 should be sent. Prior to the second selection 605, the local user 213 can move the pointer 608 over the destined user 215, where the user 215 can highlight 606 indicating that the user 215 has been selected. Once the second selection 605 has been made, a menu 609 would pop-up displaying the options for the local user 213 to take, one of which, as in this case, is to send the route to the highlighted 606 user "User 1" 215. Once the local user 213 moves the icon pointer 608 over the menu 609 and selects "Send 'Route' To User 1" 610, as shown in FIG. 6A, the route 206 will be sent to the user "User 1" 215 using the real-time communication system 150.

Figure 7:
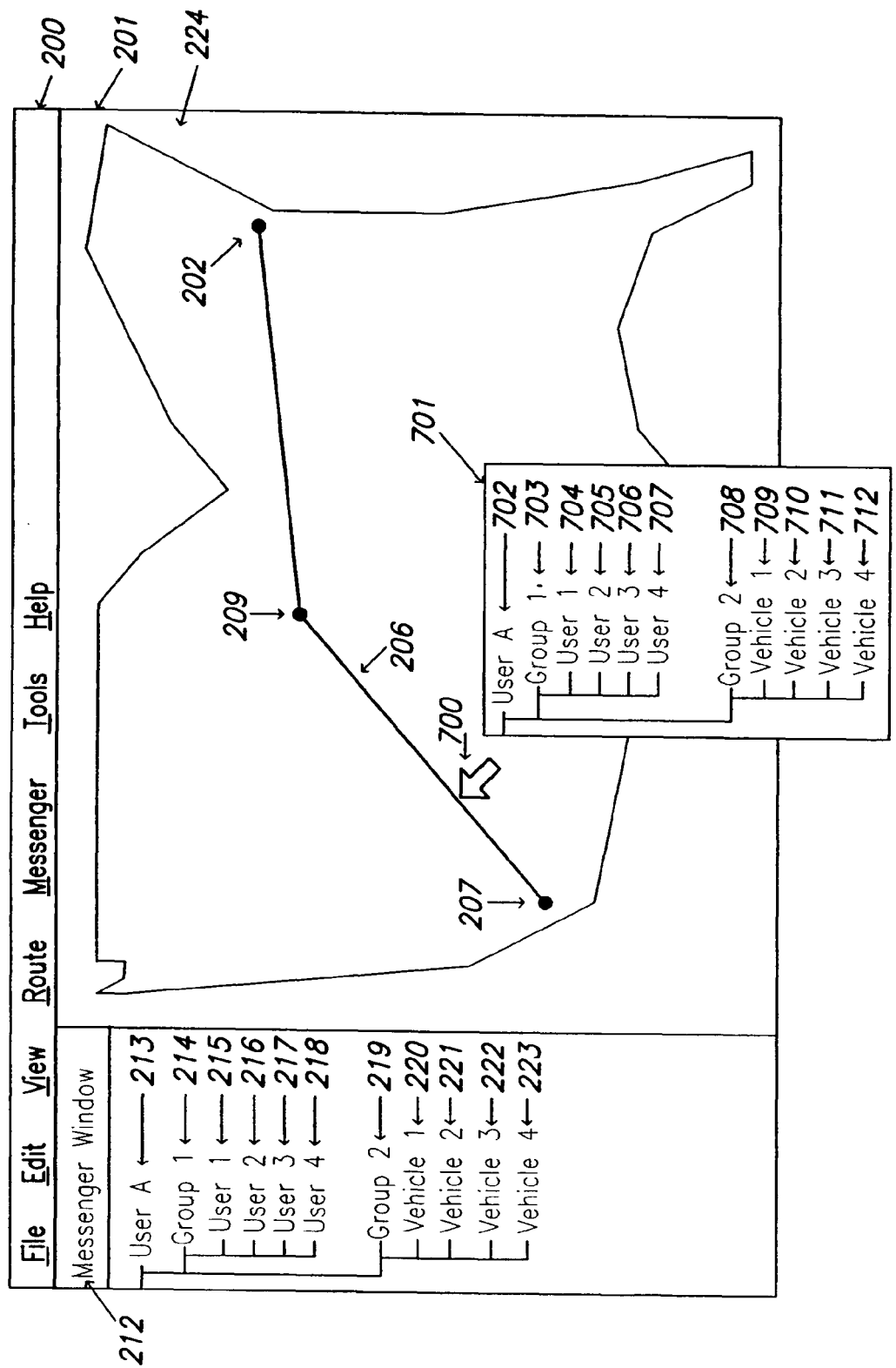
FIG. 7 illustrates one embodiment of the present invention for sending, or sharing, a route with a user or group of users by using a menu selection operation.
Figure 8:
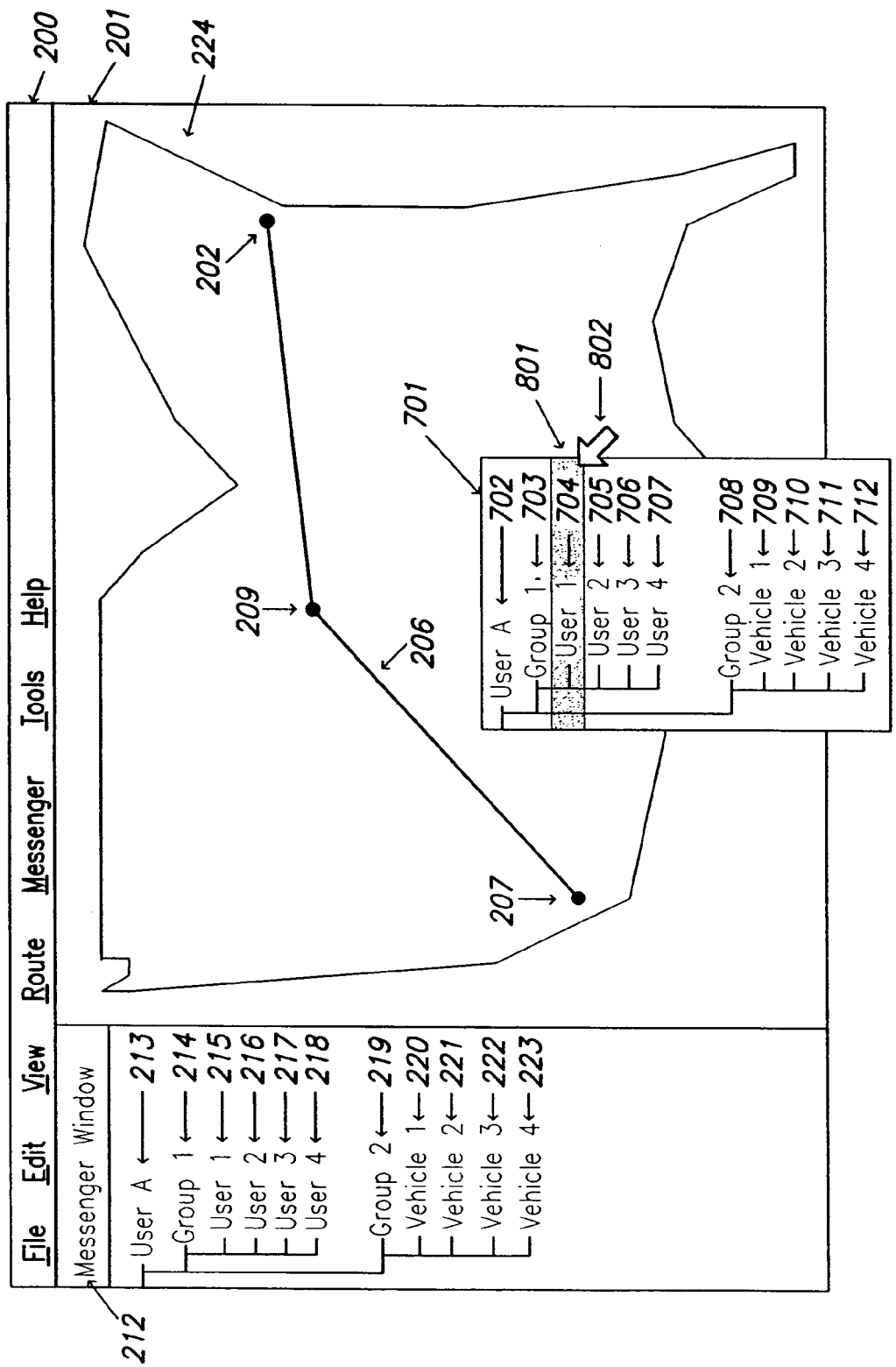
FIG. 8 illustrates one embodiment of the present invention for selecting a user for the purpose of sending, or sharing, a route with a user on a menu list.
Figure 9:
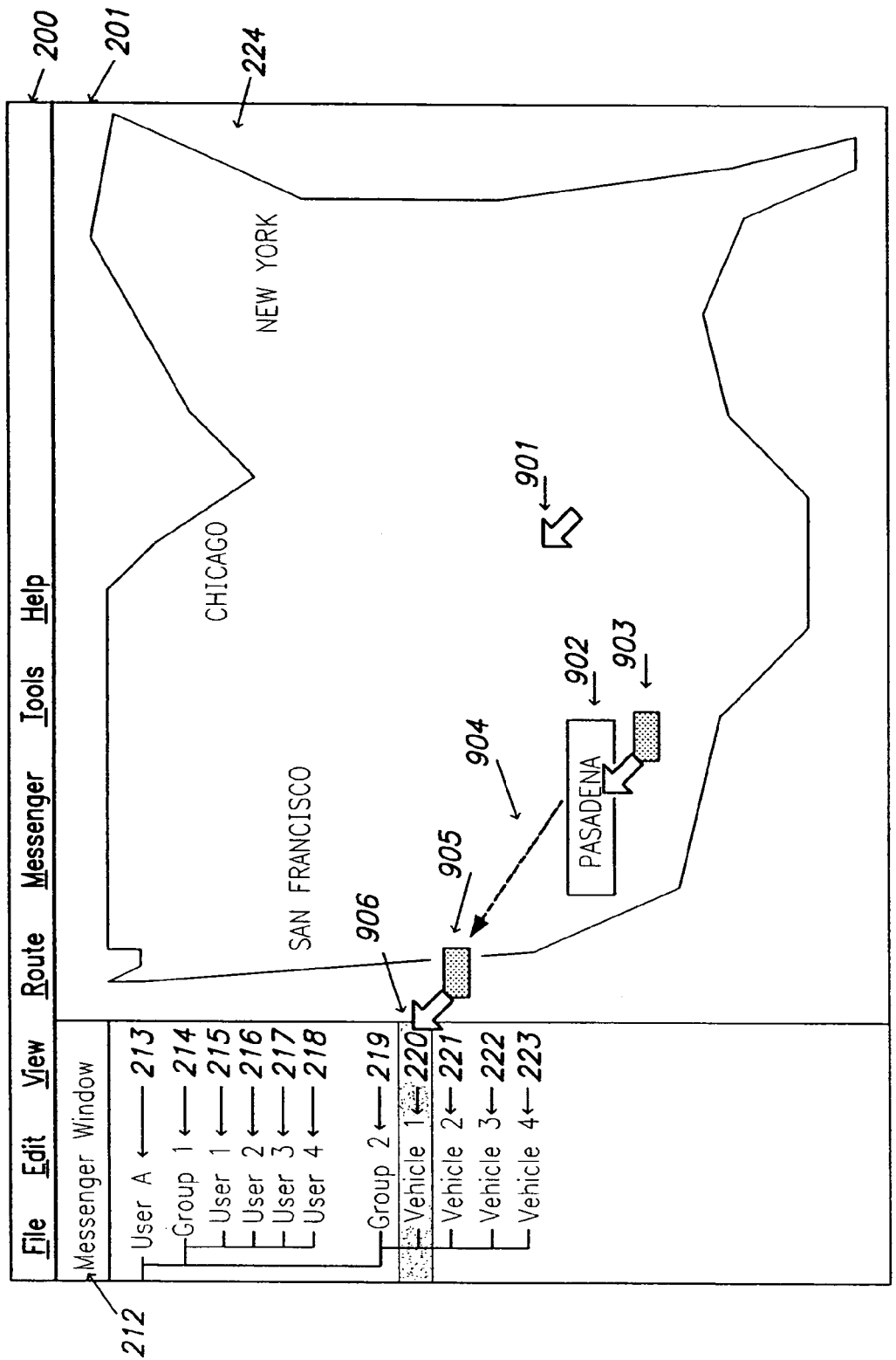
FIG. 9 illustrates one embodiment of the present invention for selecting a POI and graphically sending the location-relevant object to a vehicle by means of a real-time communication system.

Other embodiments exist for this invention for sending location-relevant objects, such as selecting a location-relevant object, such as a route 206, as shown in FIG. 7. After the route 206 has been selected using the icon pointer 700, a pop-up menu appears 701 that displays the local user's 702 roster list of users and groups of users, including the local user 702 itself. Using the icon pointer 802, as illustrated in FIG. 8, the local user 213 can select 801 the graphical representation of the user 704 to which the route 206 should be sent. The process is completed when the user "clicks" or "taps" the destination user or group of users, or by an equivalent mechanism known to people skilled in the art. In this embodiment, the route 206 that is sent includes all necessary information to completely re-create the route 206 on the remote user's 704 application without any loss of information.

Other location-relevant objects, as people skilled in the art will appreciate, include POIs, such as map identifiers which include names associated specifically with a map, such as city names, street names, highways names, interstates names, rivers names, state names, or a map name that is associated with a location. A POI can include, without limitation, a house, business, person, pet, map identifier, etc., and is also a well known term to people skilled in the art. For example, if a map displays a name on a map display, then that location on the map can be assumed to be the location associated with the displayed name. This invention allows users to send map identifiers using the real-time communication system 150 to other users in their roster list or, in an ad-hoc manner, to other users identified by a unique identifier, such as an e-mail address, telephone number, or the like.

On a map display 224 a user 213 preferably uses the icon pointer 901 to select 903 a map identifier, such as a city name 902. After selecting 903 the city name 902, the user can drag 904 the location-relevant object to the graphical representation for another user 220 in the local user's 213 roster list. As an aid to the user 213, the application can highlight 906 the specific user 220 that the icon pointer 905 is focused 220 on. Once the user 213 releases, or drops, the location-relevant object 902 on the destination user 220, then the location-transfer process begins by using the real-time communication system 150, sending the POI to the selected user as previously described, thus allowing the receiving user 220 to utilize the location-relevant object for a number of purposes, such as mapping, routing, etc.

Figure 10:
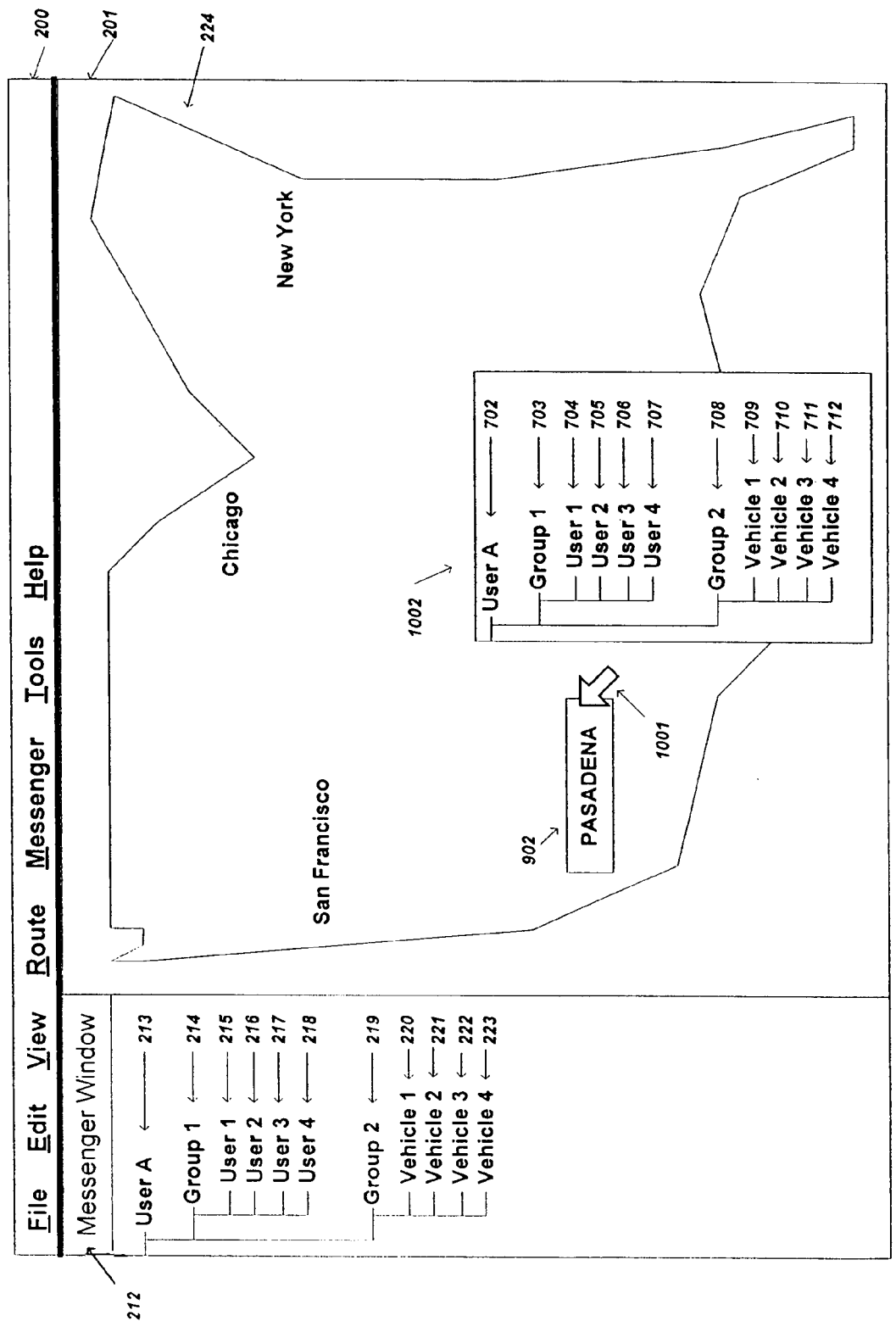
FIG. 10 illustrates one embodiment of the present invention for selecting a POI and graphically sending the location-relevant object to a user selected from a menu list.
Figure 11:
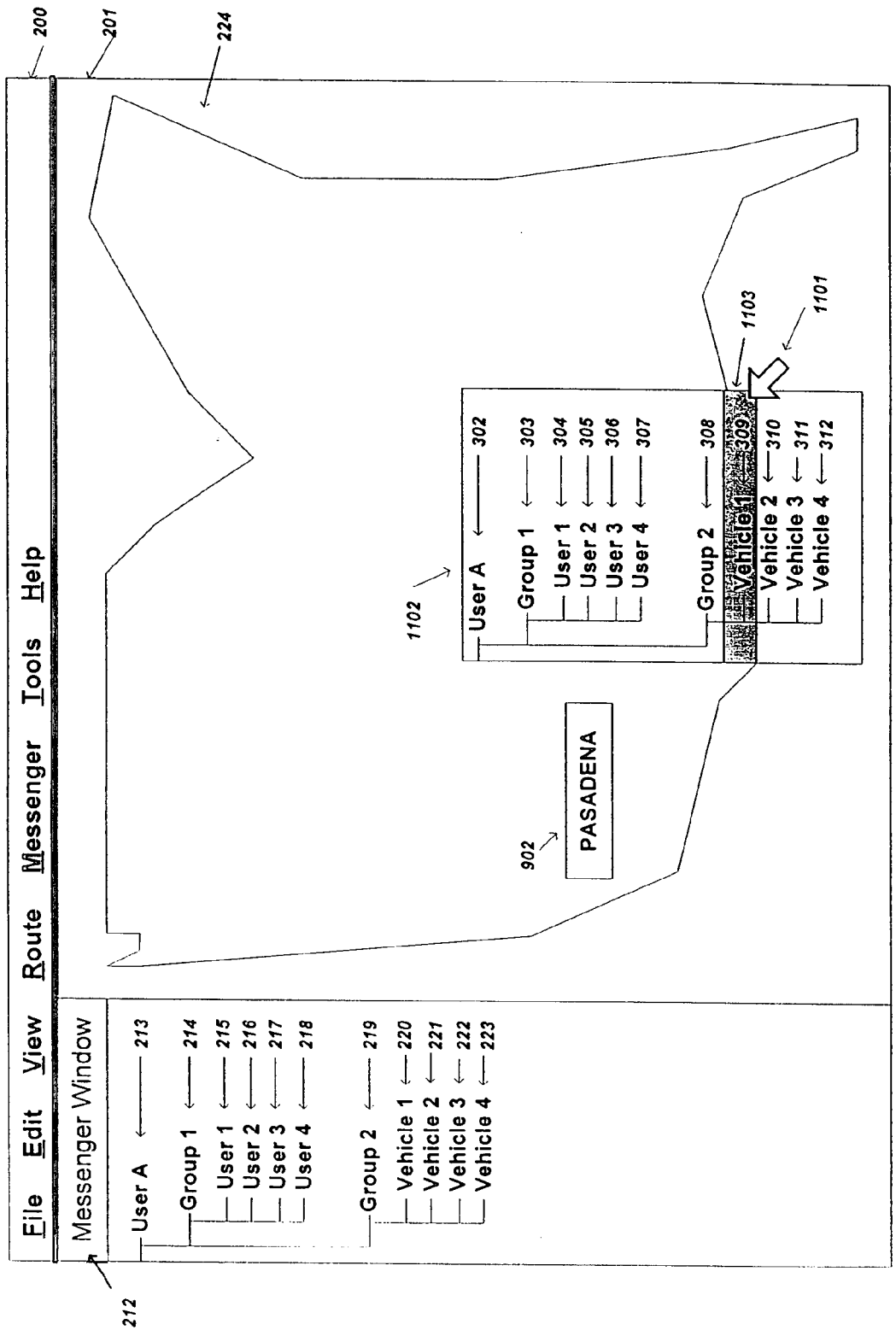
FIG. 11 illustrates one embodiment of the present invention for selecting a POI and graphically sending the location-relevant object to a vehicle selected from a menu list.

Another embodiment of sending POIs, which include map identifiers, is illustrated in FIG. 10. After a user selects a map identifier, such as the city name Pasadena 902, with an icon pointer 1001, a new pop-up menu would appear 1002 showing the main user's 213 roster list. Selecting a user "Vehicle 1" 309 from this pop-up menu will initiate the sending of the selected POI 902 to the selected user 309. Using the icon pointer 1101, shown in FIG. 11, to select 1103 the specific user 309 to send the POI to allow the local user to effectively send POIs over the real-time communication system 150 to any user in their roster list.

Figure 13:
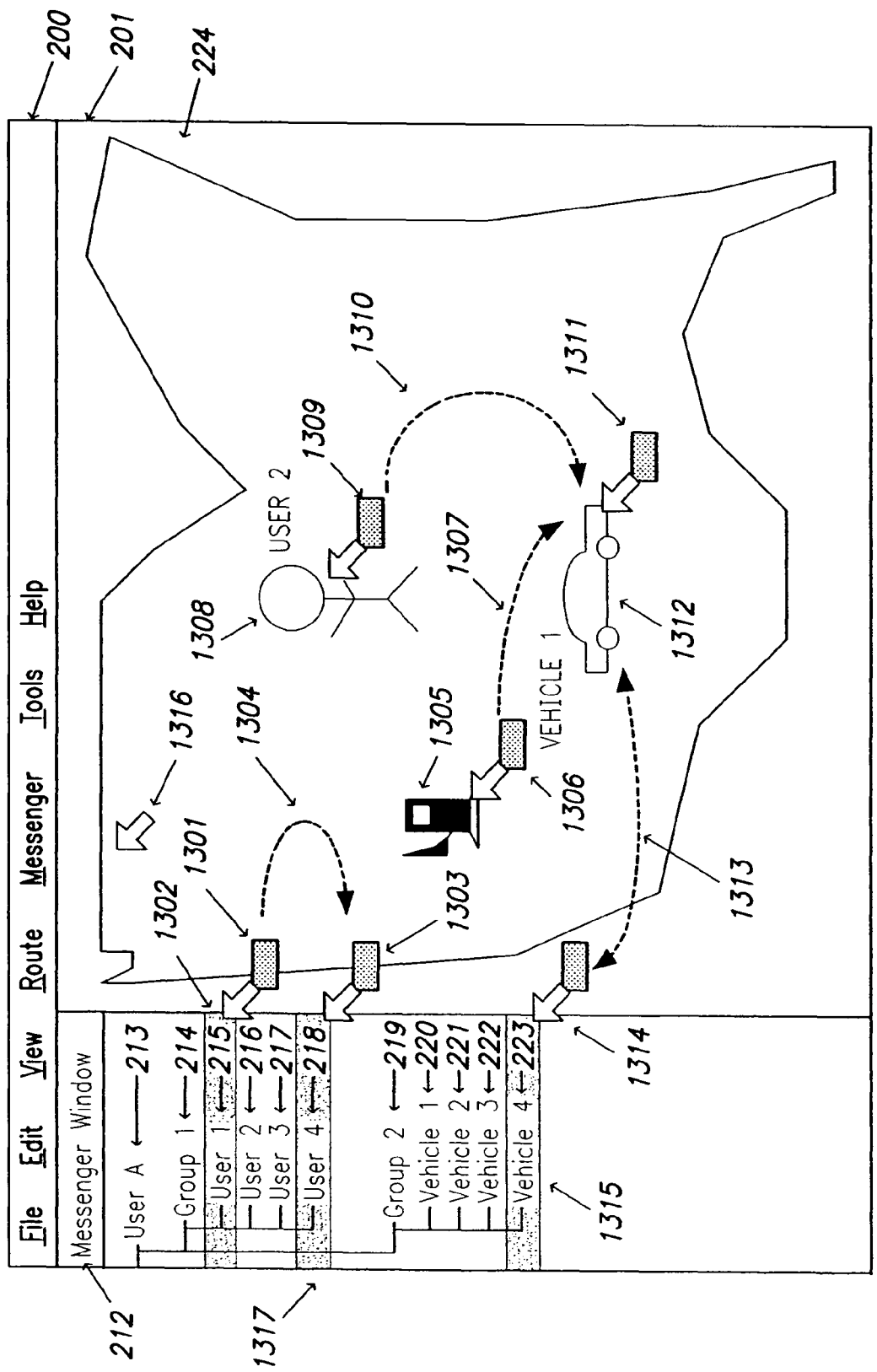
FIG. 13 illustrates one embodiment of the present invention for graphically transferring location-relevant information or objects from a user-to-user, or object-to-user where the initiator of the transfer acts as the hub.
Figure 14:
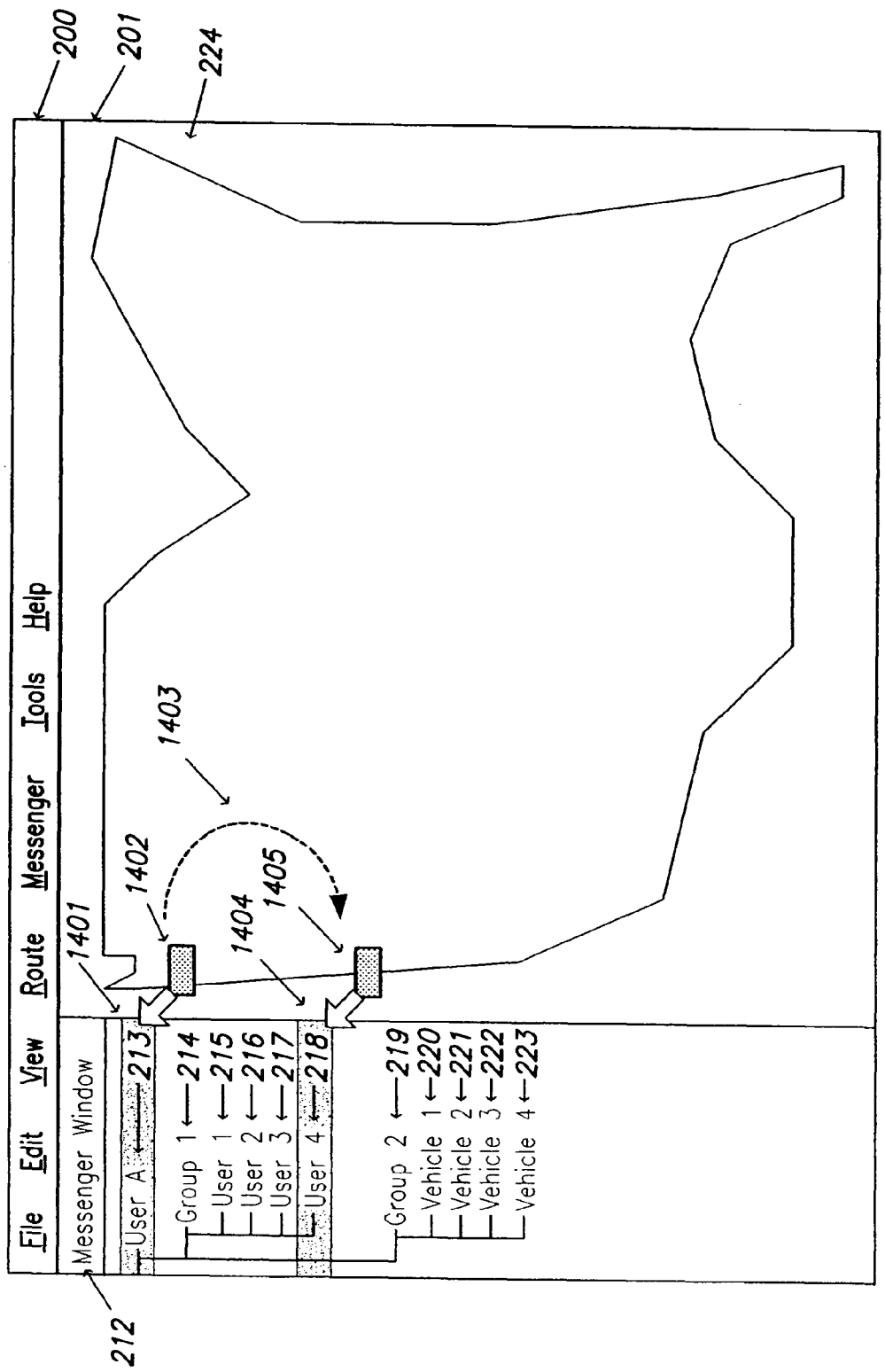
FIG. 14 illustrates one embodiment of the present invention for graphically transferring one's own location information to another user.

As people skilled in the art will appreciate, a local user of the RTCMP 201 program can transfer location-relevant information between users on their roster list, where the initiator acts as the location transfer hub of said location information. In one embodiment, as shown in FIG. 13, the local user 213 of the RTCMP 201 program can send the location information of "User 1" 215 to "User 4" 218 by using a graphical method. For example, the local user "User A" 213 can use the icon pointer 1316 to select 1302 the source user "User 1" 215, where a selection is known to be made when the icon pointer 1301 is illustrative of a selected object, when compared to the normal icon pointer symbol 1316. The graphical representation of "User 1" 215 can then be dragged 1304 to its destination position, which in this example is the graphical representation for "User 4" 218, so that the location information of "User 1" 215 is transferred to "User 4" 218. This action is competed in the RTCMP 201 program by moving the icon pointer 1301 to the new location 1303 over the destination user "User 4" 218. The destination user "User 4" 218 is highlighted 1317 when the icon pointer 1303 is focused on the destination user "User 4" 218.

The real-time communication system 150 provides the infrastructure for this transfer. The transfer occurs by requesting the location information from "User 1" 215 and after "User 1" 215 has agreed to sending their location information to "User 4" 218, the location transfer can occur using a number of methods of the real-time communication system 150. For example, a peer-to-peer method can be employed, sending the information directly from "User 1" 215 to "User 4" 218, or the location-information can be sent to a real-time communication server 132 and then redirected to the "User 4" 218. Additionally, the location-information can be sent from "User 1" 215 to the RTCMP 201 of the initiating user "User A" 213 and then sent to "User 4" 218. The first two methods allow "User A" 213 to initiate the transfer, even if "User 1" 215 and "User 4" 218 do not have each other in their own roster lists, and the location-information does not necessarily ever have to be sent to the initiating user "User A" 213. As people skilled in the art will appreciate, the mapping program does not need to be integrated with the real-time communication program in order to compete this transaction, as shown in FIG. 4A as "Application 1" 414.

Another embodiment of transferring location information between other users, where the initiator acts as the location-transfer hub, is shown in FIG. 13. If the destination user is illustrated as an icon map object 1312, representing "Vehicle 1" 220, location-relevant information and objects can be transferred to the vehicle icon 1312, and thus the user of "Vehicle 1" 220 by selecting objects and dragging and dropping them onto the icon representation of "Vehicle 1" 1312 on a map display 224. For example, by selecting 1315 "Vehicle 4" 223, using the icon pointer 1314, "User A" can drag 1313 the icon list representation of "Vehicle 4" 223 onto the map icon representation of "Vehicle 1" 1312, and drop or select the icon map representation of "Vehicle 1" 1312 using the icon pointer 1311. This will initiate, as previously described, the transfer process of sending "Vehicle 4's" 223 location information to "Vehicle 1" 220 using a graphical method. Also, this process can be reversed, since the local user 213 can select 1311, drag 1313 and drop 1314 the vehicle icon representation of "Vehicle 1" 1312 to the "Vehicle 4" user list representation 223, thus initiating the location transfer from user "Vehicle 1" 220 to user "Vehicle 4" 223. Additionally, this process can be done using a user's icon map representation 1308 to graphically initiate the transfer of "User 2's" 1308 current location information to another user's icon map representation, such as "Vehicle 1" 1312. In another embodiment, selecting "User 2's" 216 icon map representation 1308, and using the icon pointer 1309 to drag 1310 and using the icon pointer 1309 to drop the icon onto the "Vehicle 1" 220 user map icon representation 1312 initiates the location-transfer from "User 2" 216 to "Vehicle 1" 220.

In another embodiment, a local user 213 can select 1306 a POI 1305, such as a gas station, drag 1307 it to the vehicle icon map representation 1312, and drop it, using the icon pointer 1311, onto the vehicle icon map representation 1312 of "Vehicle 1" 220 in order to initiate the transfer of the POI 1305 to "Vehicle 1" 220. The difference of this scenario compared to the previous location-transfers, is that the location for the POI 1305 is known, or not changing since the POI 1305 is a static object (i.e., similar to a map identifier), prior to the start of the location transfer process. Thus, a location request need not be sent to the POI 1305, since its location is already known. The real-time communication program of the RTCMP 201 will then transfer the location-information of the POI 1305 to the selected user 1312 immediately upon their acceptance of the transfer.

Another advantage of this invention is that it allows a local user 213 to send their current location to another user on their roster list graphically. In one embodiment, shown in FIG. 14, "User A" 213 uses the icon pointer 1402 to select 1401 their own icon list representation and then drags 1403 the icon pointer 1405 to another user's icon list representation 218. The highlight 1404 is shown to illustrate that the icon pointer 1405 is over "User 4's" 218 icon list representation. Dropping or releasing the icon pointer 1405 initiates the transfer of the location information of "User A" 213 to the selected user "User 4" 218, and sends the location information after the requested user "User 4" 218 has accepted the transfer of said location information. As people skilled in the art will appreciate, this graphical transfer of the local user's location information significantly reduces the process required in prior art systems.

Figure 15:
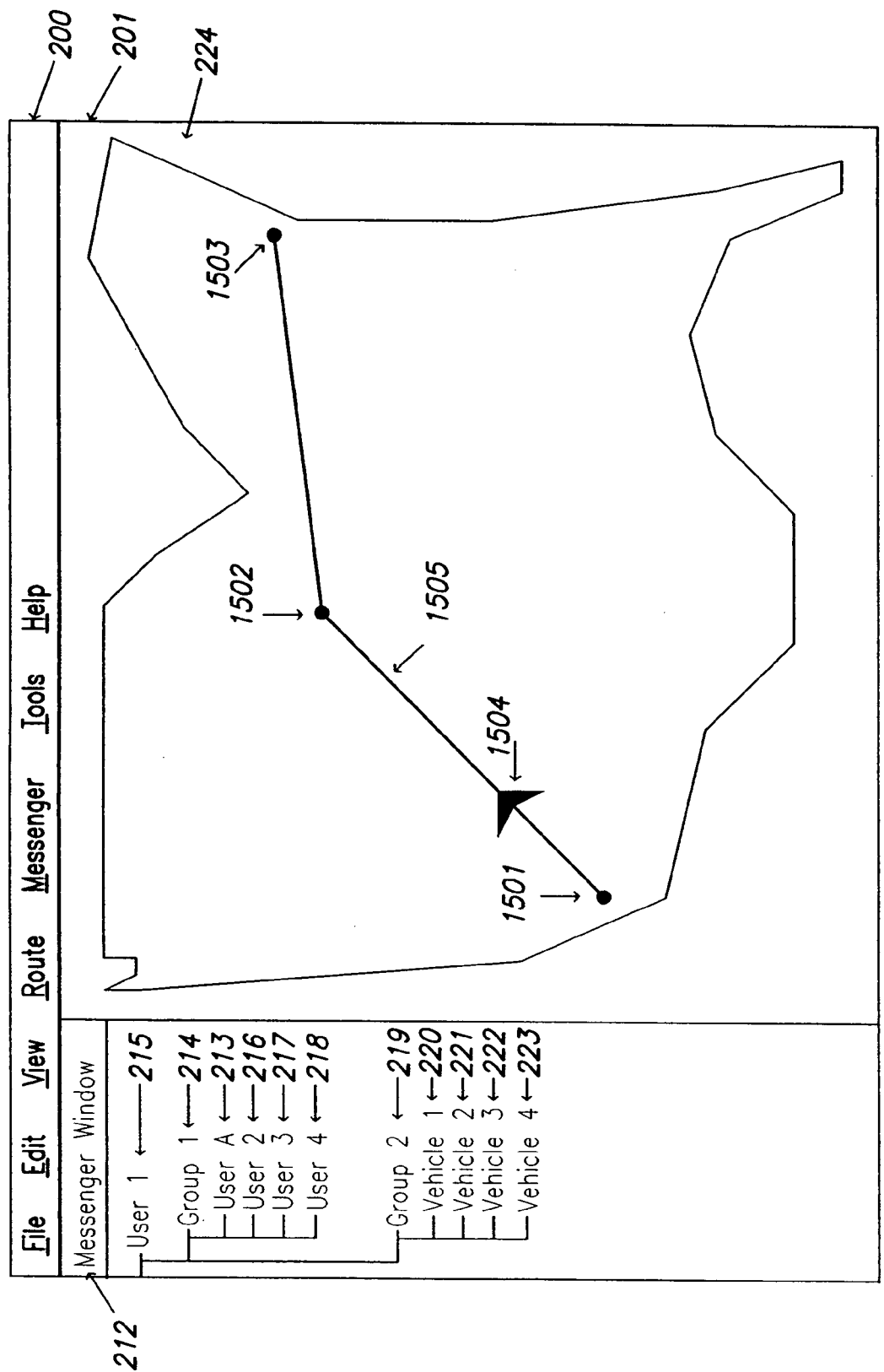
FIG. 15 illustrates one embodiment of the present invention for graphically displaying a received route from another user, and that other user's current location along that route on a map.

As illustrated in FIG. 6, the invention allows a user to send a route to another user. After the destination user has accepted the route, as illustrated in FIG. 12, if the remote destination user is running a RTCMP 126 similar to the sender's RTCMP the received route 1505 will be displayed in the destination user's map display 224, as shown in FIG. 15. The received route 1505 is the same as the original route 206, with the same origin 1501 and destination points 1502 and 1503 as the original route 206, except that the received route 1505 is being displayed on the destination user's ("User 1") 215 RTCMP 126. Additionally, the sender 213 has the option to also send their own real-time location information 1504 via the real-time communication system 150 to the destination user 215, which can then be graphically displayed on the map display 224 of the destination user's ("User 1") 215 RTCMP 126. As people skilled in the art will appreciate, this allows users to send or share routes with other users in real-time.

Figure 16:
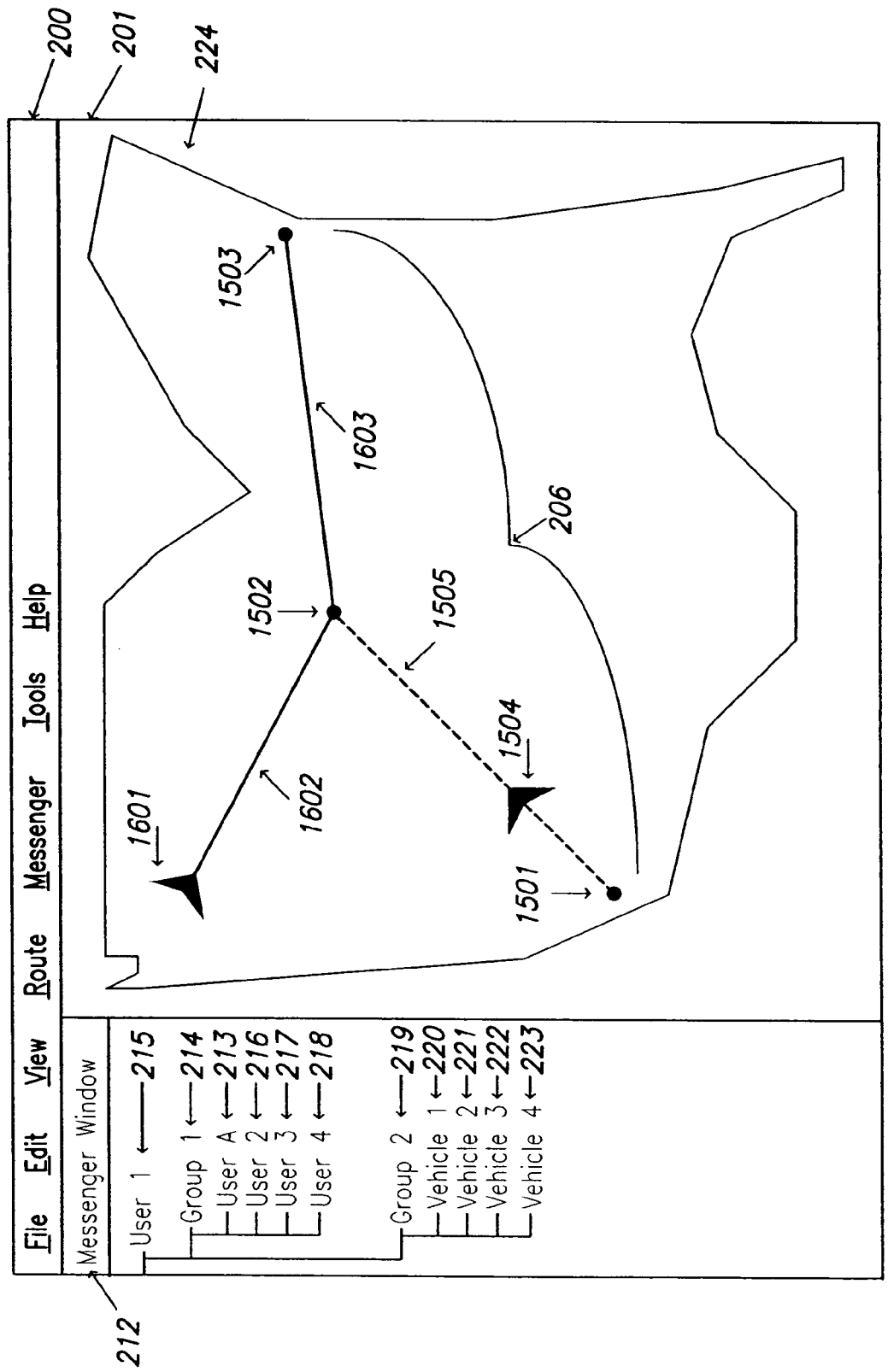
FIG. 16 illustrates one embodiment of the present invention for graphically displaying the originally received route and the newly calculated route based on the local user's position information and the received destination points.

An additional benefit of this invention, as shown in FIG. 16, is that the received route 206 does not have to include only the sending user's ("User A") 213 original route origin and destination points, amongst all the other parameters that completely define the sent route, such as the map database identifier, all relevant turn points, user preferences, etc. The destination user's ("User 1") 215 RTCMP 126 can automatically adjust the received route's 206 origin and destination points based on the destination user's ("User 1") 215 RTCMP 126 preferences. For example, the new origin of the received route can be automatically changed to the destination user's ("User 1") 215 current location information or to a chosen origin location, and the sent route 206 can then be recalculated and displayed on the destination user's map display 224.

In one embodiment, illustrated in FIG. 16, the original received route 1505, consisting of origin 1501 and destination points 1502 & 1503, is displayed on the local user's ("User 1") 215 map display 224. Additionally, the real-time location information 1504 of the sending user ("User A") 213 is also sent to the local user's ("User 1") real-time communication program and displayed on the map display 224 of the local user's ("User 1") 215 RTCMP 126. A received route may include a destination location where the local user ("User 1") 215 may want to meet the sending user ("User A"). In this case, the local user ("User 1") 215 would want to calculate a new route 1602 based on its own current location information 1601 and the desired meeting and/or destination points 1502 & 1503 present in the received route 206. A benefit of this invention is that all links 1603 in the route need not be re-calculated, but only the part of the received route 206 that has changed.

For example, the portion 1505 of the received route 206 (which consists of route points 1501, 1502, & 1503 and links 1505 & 1603 as shown in FIG. 16) between points 1501 and 1502 is the only portion of the route 1505 that needs to be recalculated, since the destination points 1502 & 1503 are common between both users. Thus, a new link 1602 can be calculated based on the received route's first destination point 1502 and the local user's ("User 1") 215 current location 1601 or preferred origin point. The rest of the route links 1603 can remain common between both users. Additionally, as shown in FIG. 16, the original received route 206 could be displayed in combination with the new route 1602 and the real-time location of both users 1504 & 1601 along those routes can also be displayed.

In addition to having the capability to map roster list users and contacts, send location-relevant information and objects, such as POIs, routes, etc., and handle permission issues with sending and receiving said location-relevant information and objects, all using the real-time communication system 150, this invention also has the capability to modify, create, and save routes using the real-time communication system 150. As people skilled in the art will appreciate, modifying, creating, and saving routes via a real-time communication system 150 allows users to make use of mapping and routing applications not available in current or prior art. The following figures relating to routes assume the application is in a route-planner mode, except as otherwise noted, since some of the same actions that are used for sending and mapping POIs can also be utilized for modifying, creating, planning, and retrieving routes.

Figure 17:
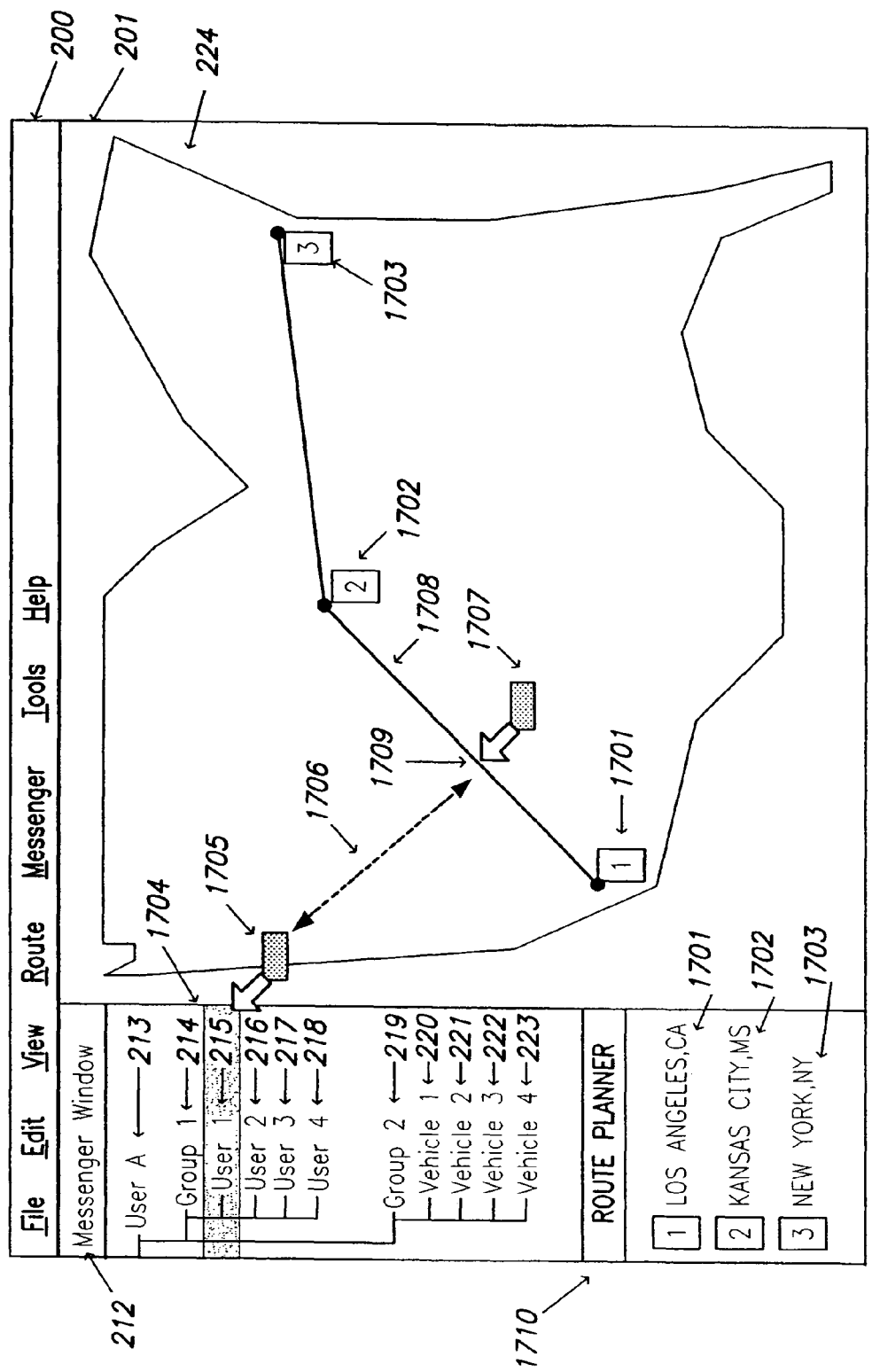
FIG. 17 illustrates one embodiment of the present invention for graphically adding a roster list user as a destination point to the graphical representation of a pre-calculated route.
Figure 18:
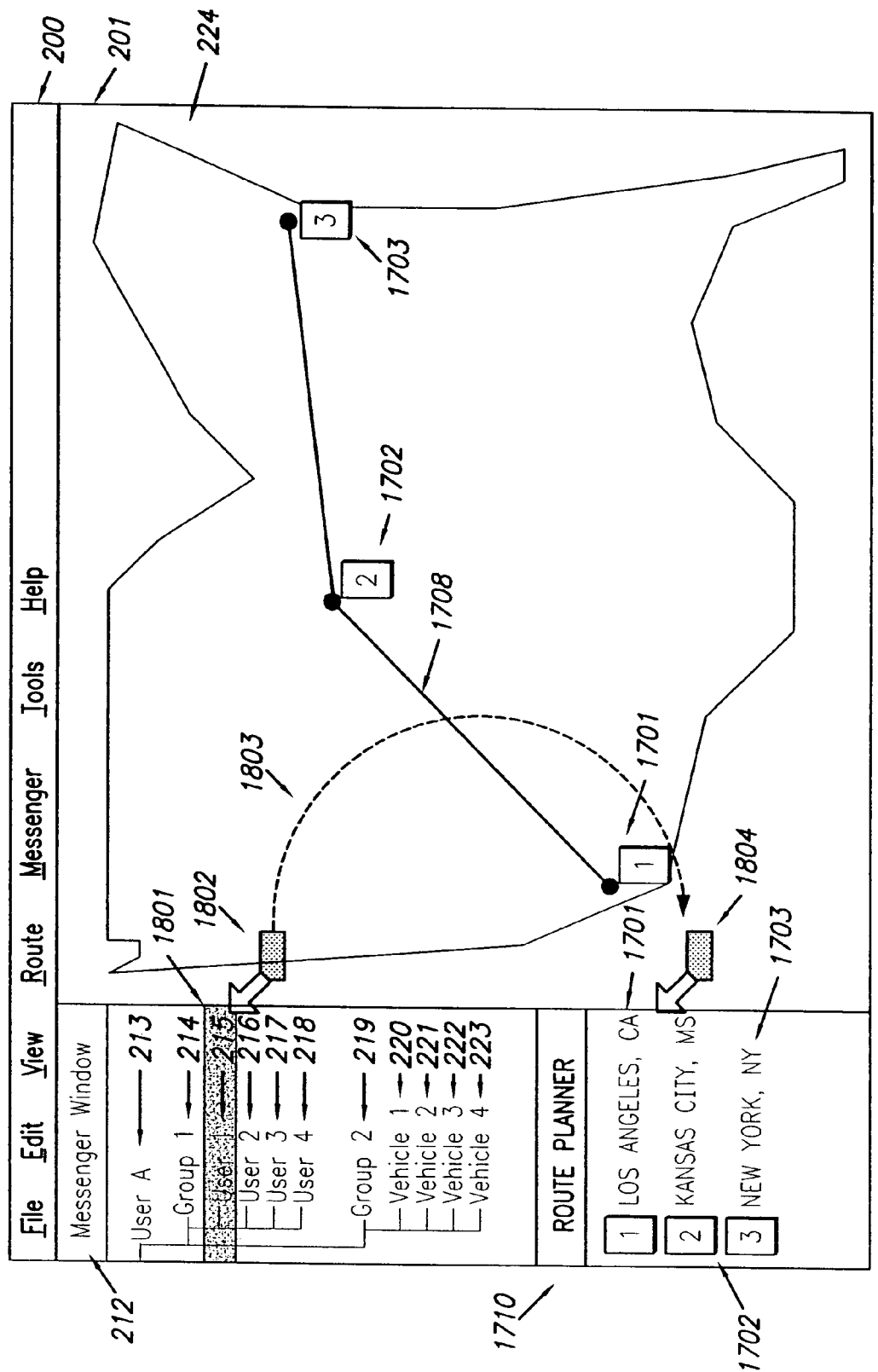
FIG. 18 illustrates one embodiment of the present invention for graphically adding a roster list user as a destination point in a route planner window.

As illustrated in FIG. 17, a route 1708 is defined as a combination of destination points 1701, 1702, & 1703, or an origin 1701 and one or more destination points 1702 & 1703. A map display 224 showing a pre-calculated route 1708 provides a user with a graphical illustration of the route, which provides better planning capabilities than standard driving directions or text information. Current prior art, such as Microsoft's MapPoint application, allows the ability to graphically add destination points to a pre-calculated route by selecting a point on the route and dragging-and-dropping the selected point to a new location in order to add a new destination point or change an existing one. As people skilled in the art will appreciate, using a real-time communication system 150 with a mapping application allows the capability to add users, contacts, or groups of users and contacts, using a graphical mechanism, to a pre-calculated route. In one embodiment, as shown in FIG. 17, a user can select 1704a user 215 from a roster list of users using a icon pointer 1705. The user can then drag 1706 the selected user 215 to a point 1709 on the pre-calculated route 1708 to dynamically add a new destination point 1709 to the pre-calculated route 1708, which corresponds to the current location information for the selected user which is obtained from the real-time communication system 150. As an additional benefit, a user can select a point 1709 on a pre-calculated route 1708 using the icon pointer 1707 where a new destination point should be added, and drag 1706 that point 1709 with the icon pointer 1705 to a user, contact, or group of users and contacts in the messenger window 212.

Once the selection in the messenger window 212 is highlighted 1704, the icon pointer 1705 is dropped or released over the icon list representation for a user "User 1" 215. This action would cause the current location information for "User 1" 215, obtained using the real-time communication system 150, to be added as a new destination point in the route 1708. As people skilled in the art will appreciate, the real-time communication system 150 does not have to be used, since the location information can be retrieved locally, as is typically the case with a user's contact information.

Both of the previously described methods for adding a user, contact, or group of users or contacts to a pre-calculated route involve adding them to a portion of the pre-calculated route. In the provided embodiments, as shown in FIG. 17, this was between the pre-calculated route points "1" 1701 and "2" 1702. The location information of the user, contact, or group of users or contacts can be incorporated into the route as a new destination point between these two points. The result is a system without the burden of recalculating the preferred order of destinations each time a new destination is added. The new destination is directly inserted in the proper order because the user is presented with the graphical representation of the pre-calculated route and has graphically identified the order position of the new destination point. The RTCMP 126 does not need to recalculate the entire route, but rather only the portion that was altered by the addition of the new destination.

Another aspect of this invention is allowing the user to directly add destinations, similar to the previous embodiments, except that the user selects 1801 the user, contact, or group of users or contacts with the icon pointer 1802 and drags 1803 the listing representation of the user "User 1" 215 to a route planner window 1710 and adds 1804 the selected 1801 user "User 1" 215 in the preferred destination order. Similarly, as illustrated before, the destination order is determined by the order that the user adds the new destinations to the route planner window 1710 or the position in which they are added if an origin 1701 and/or destination points 1702 & 1703 already exist. For example, Los Angeles, Calif. 1701 is the origin, while Kansas City, Miss. 1702 is the second stop and New York, N.Y. 1703 is the final destination. When the user adds the location of the selected 1801 user "User 1" 215 in-between 1804 the origin 1701 and first destination 1702, the route is recalculated based on the new order and on the retrieved location-information of the user "User 1" 215 added to the route 1708 in the route planner window 1710. The location information for user "User 1" 215 is retrieved using the real-time communication system 150.

Figure 19:
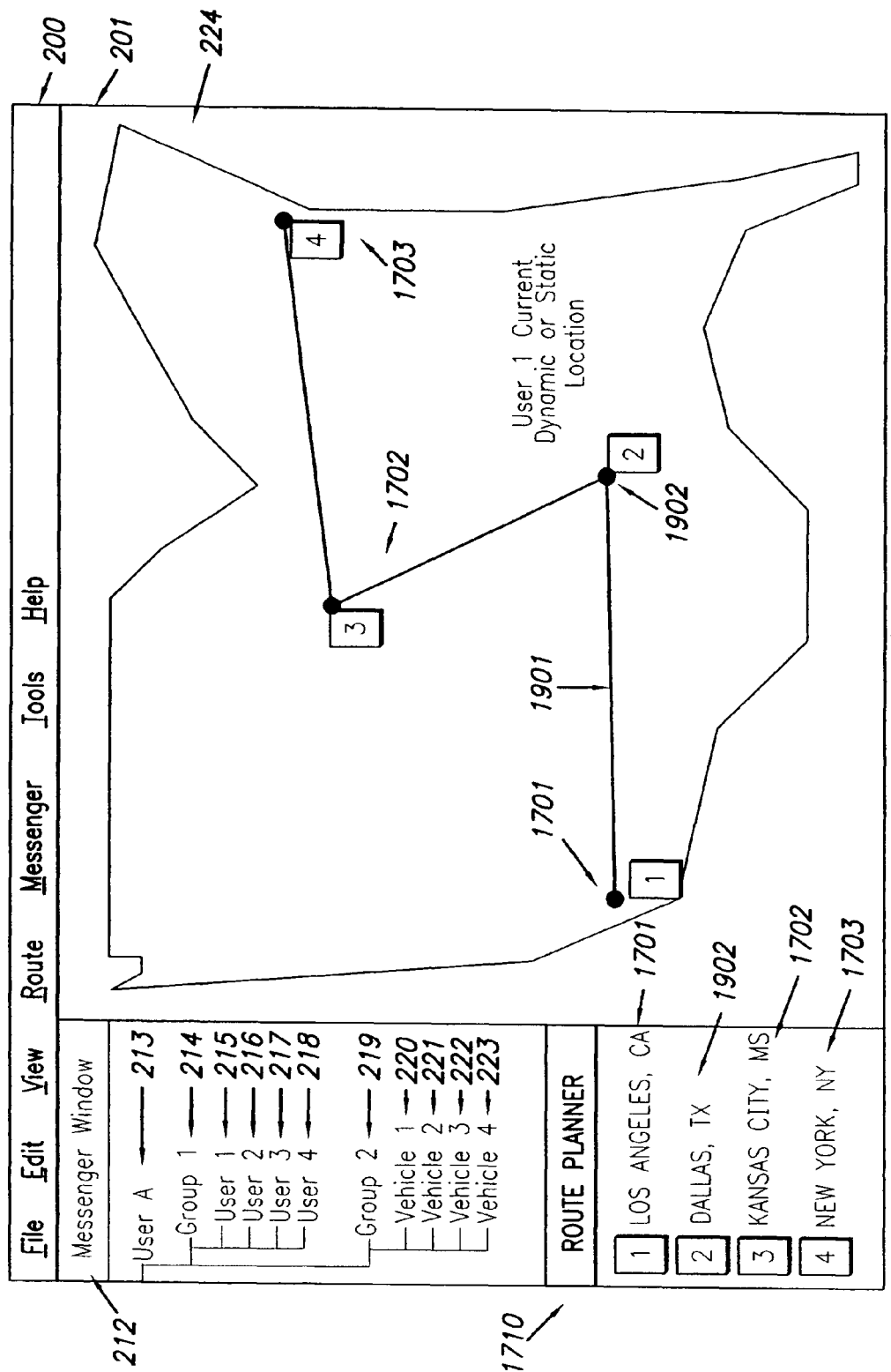
FIG. 19 illustrates one embodiment of the present invention for displaying the graphical route created in FIG. 18.

As illustrated in FIG. 19, the map display 224 shows a new route 1901 that includes the new destination point of Dallas, Tex. 1902. The route planner window 1710 illustrates the added destination point of Dallas, Tex. 1902 as the first destination point (i.e., point #2), the order of which was determined by the point at which the dropping or releasing action occurred, typically by using a mouse click release or any other acceptable mechanism for releasing the element with the focus of the icon pointer 1804, as shown in the previous figure. The origin and destination order of the route 1708 in the route planner window 1710 is follows that displayed in the map display window 224.

Figure 20:
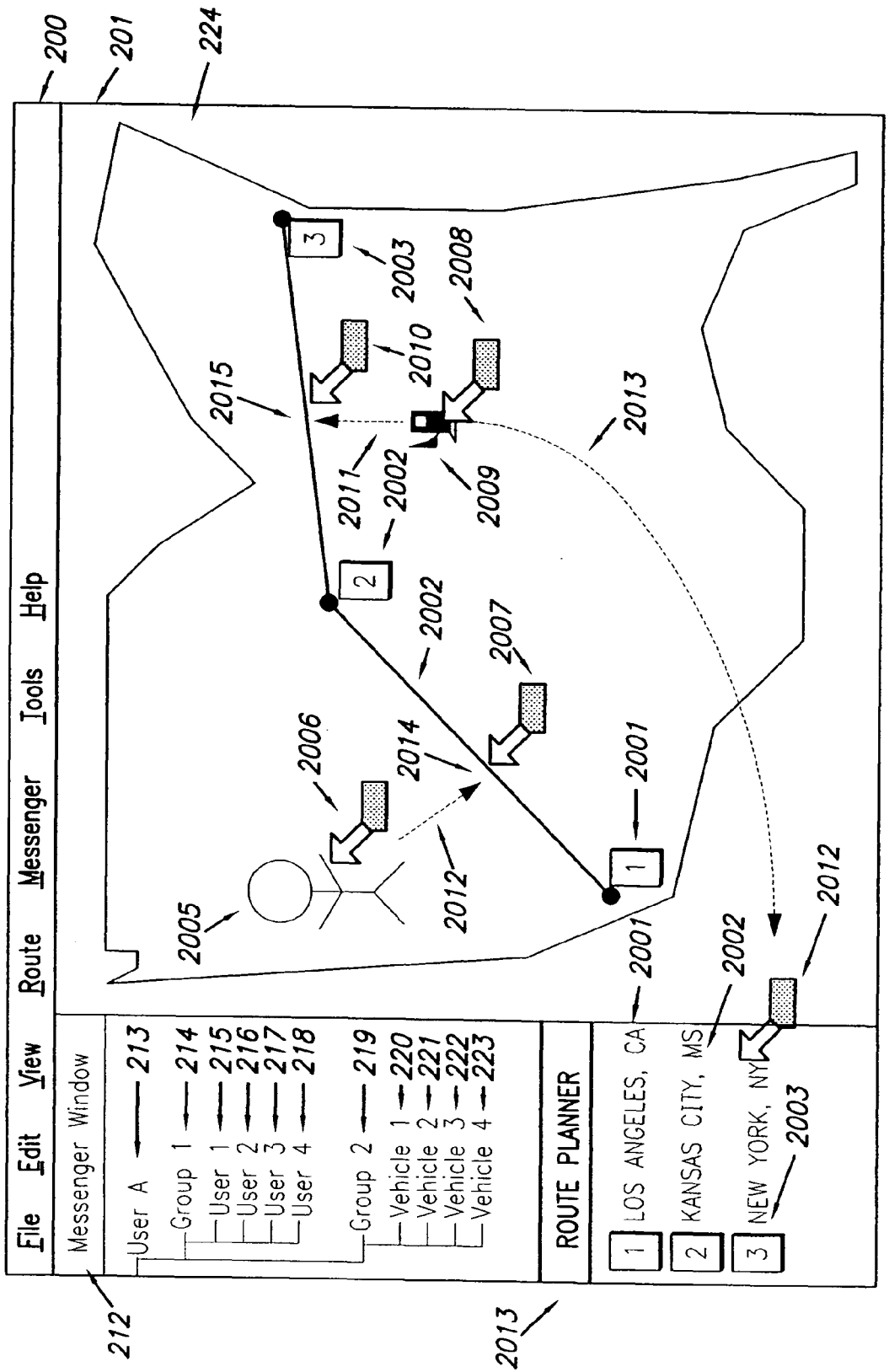
FIG. 20 illustrates one embodiment of the present invention for graphically adding location-relevant object icon representations to a pre-calculated route.
Figure 21:
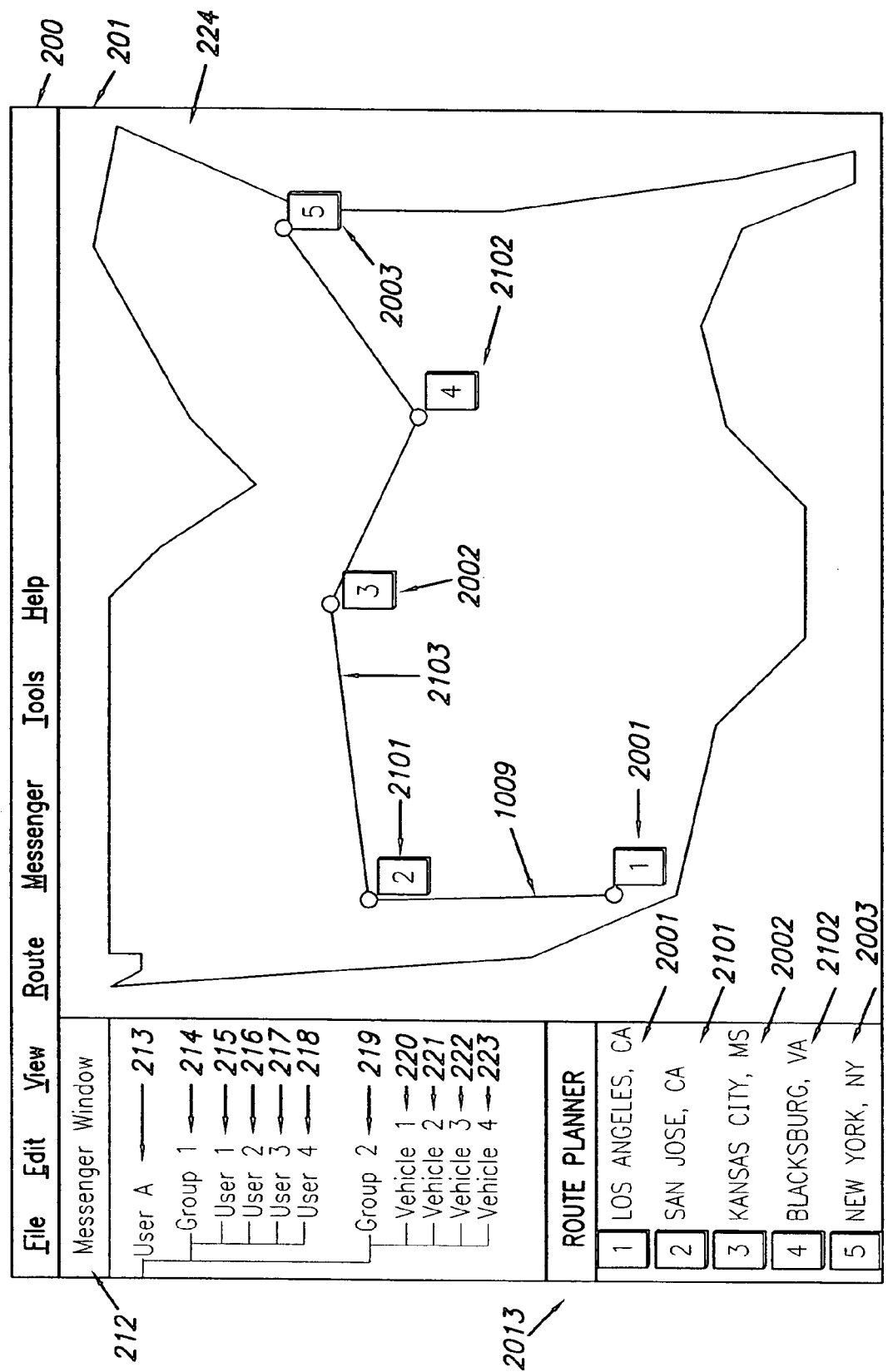
FIG. 21 illustrates one embodiment of the present invention for displaying the graphical route created in FIG. 20.

In one embodiment, when the route planner window 2013, as shown in FIG. 20, is open, the system is considered to be in a route-planning mode. FIGS. 20-21 illustrate the addition of roster list users and POIs to a pre-calculated route using a graphical method. As shown in FIG. 20, a pre-calculated route 2004 is has an origin of Los Angeles, Calif. 2001 and destination points Kansas City, Miss. 2002 and New York, N.Y. 2003. The origin and destination points are shown graphically on the map display 224 in the form of a route 2004 and in the route planner window 2013 in the form of a list. Both static POIs, whose positions are stored in the map data of the RTCMP 201 and dynamic POIs, which are graphical icon representations of roster list users whose position information is obtained using the real-time communication system 150, can be selected on the map display 224 using a graphical method defined by this invention to graphically add origin and destination points to a pre-calculated route.

In one embodiment, a user can select 2006 a graphical icon representation of a user 2005, whose position information is obtained using the real-time communication system 150, then using the icon pointer 2006, drag 2012 the icon representation of the user 2005 to a pre-calculated route 2004. The point 2014 at which the user releases the selected object using the icon pointer 2007 is added to the pre-calculated route as a new destination point. Additionally, a user can select a static POI 2009, such as a gas station, using the icon pointer 2008, and drag 2013 the POI icon to the route planner window 2013 in order to add the new destination point in between the first 2002 and second 2003 destination points. Adding a new destination point can automatically recalculate the new route, or the user can initiate the new route calculation. Also, the user can drag 2011 the selected static POI 2009 to the pre-calculated route 2004 and add a new destination point to the pre-calculated route 2004 at the point 2015 where the POI icon was dropped by releasing the selected POI 2010, which is done, as known to people skilled in the art, by a mouse click release, tap release, etc.

The newly added destination points can also be illustrated in the route planner window 2013 as italicized, indicating that they are to be added once the route has been recalculated. As shown in FIG. 21, the new route that was calculated in the previous example includes the new origin 2001 and destination points 2101, 2002, 2102, & 2003. The new destination points that were added are shown in FIG. 21 as San Jose, Calif. 2101, which is the position of another user 2005 updated using the real-time communication system 150, and Blacksburg, Va. 2102, the position of the POI 2009. It should be noted, and appreciated by those skilled in the art, that the only the links of the route that have changed are the ones that need to be recalculated and not the entire route. Under this example, the entire route needs to be recalculated.

Figure 22:
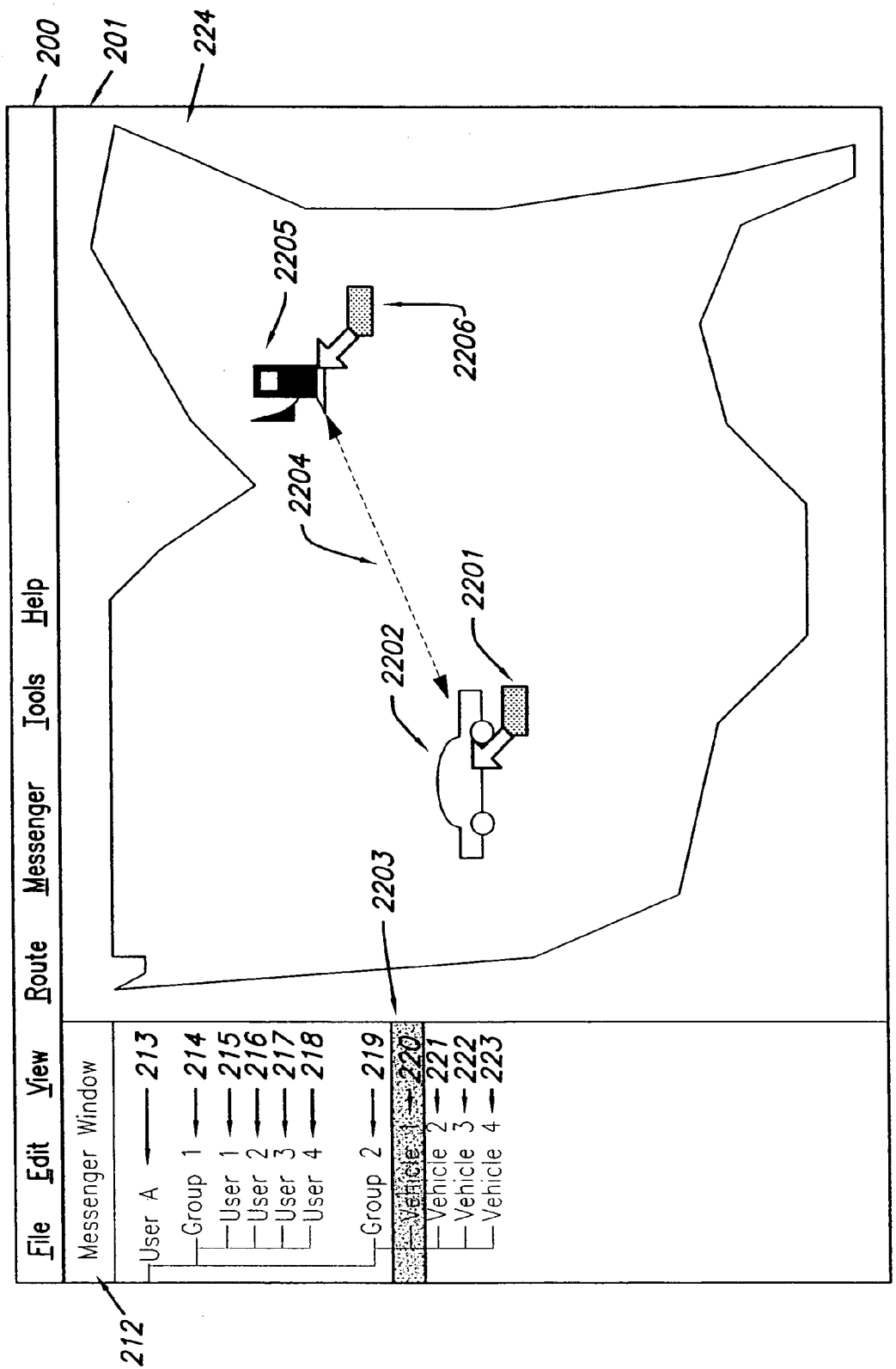
FIG. 22 illustrates one embodiment of the present invention for graphically creating a route using location-relevant objects on a map, where one of the objects is a roster list user and the other is a POI.
Figure 23:
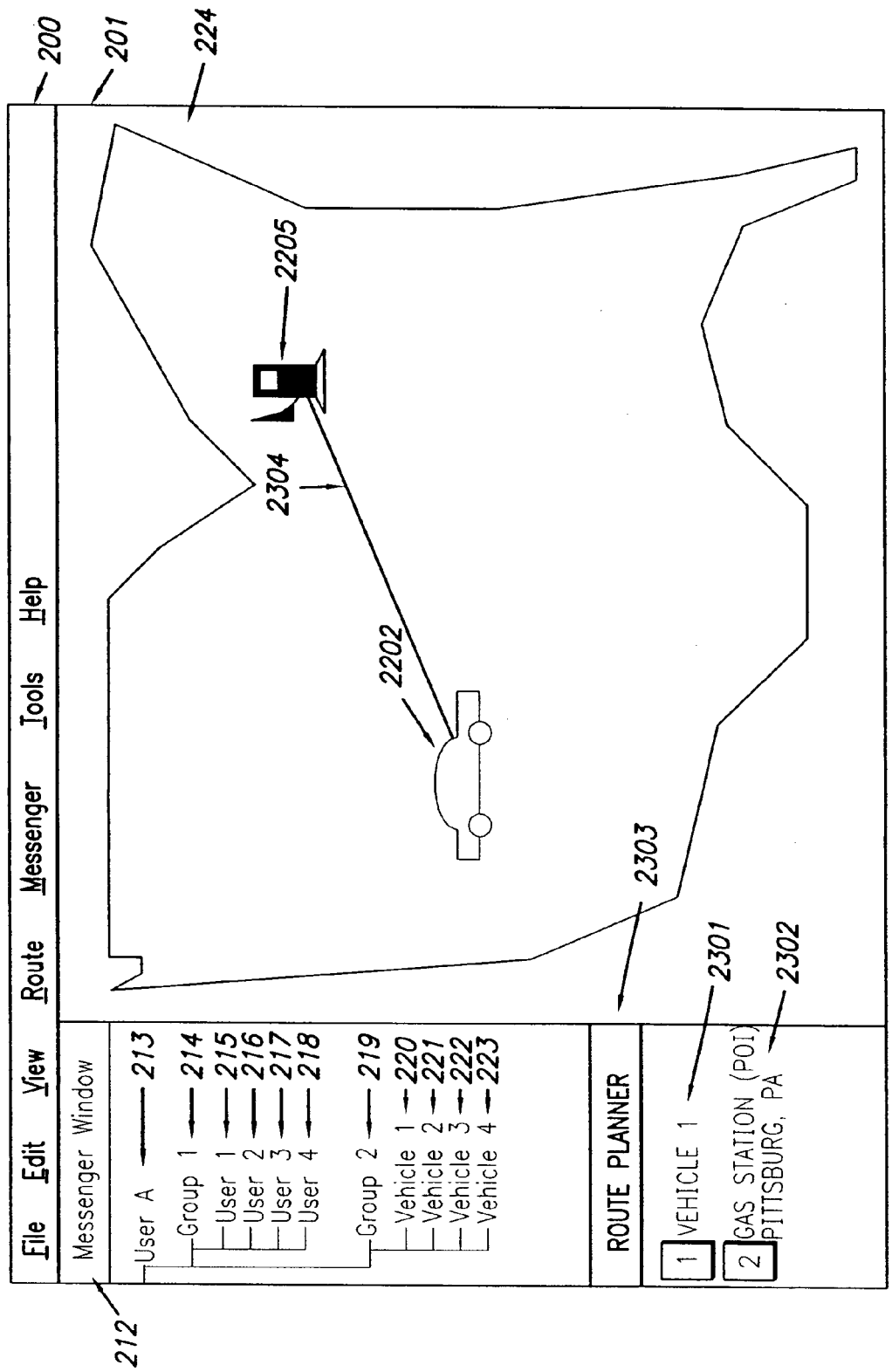
FIG. 23 illustrates one embodiment of the present invention for graphically displaying the route created in FIG. 22.
Figure 24:
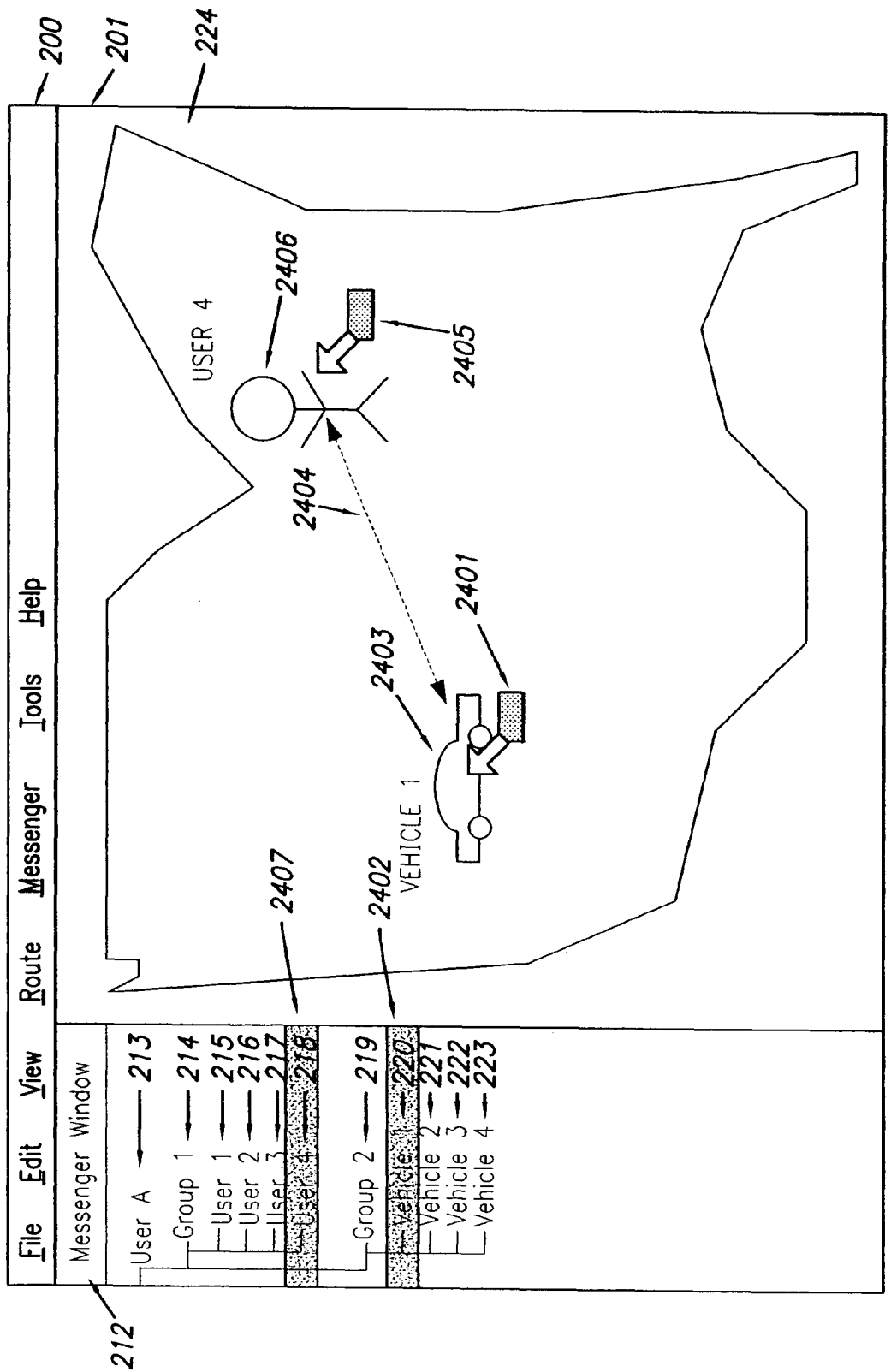
FIG. 24 illustrates one embodiment of the present invention for graphically creating a route from location-relevant objects on a map, where both of the objects are icon representations of roster list users.

Another benefit of this invention is illustrated in FIG. 22. In route-planner mode a user can select 2206 a POI 2205, such as a gas station, and drag 2204 it to a graphical icon representation 2202 of a roster list user on the map display 224, and then drop or release the icon pointer 2201 with the focus over the graphical icon representation 2202 of a roster list user in order to create a route from the location of that roster list user to the selected POI 2205. Additionally, after having selected the POI 2205, when the icon pointer 2201 is focused over the graphical icon representation 2202 of the roster list user on the map display 224, the messenger window 212 icon listing of said user 220 will also highlight 2203, as illustrated in FIG. 22. It should be noted that the location information of the roster list user whose graphical icon representation 2202 was selected was known and can be periodically updated using the real-time communication system 150. The calculated route 2304 between "Vehicle 1" 2202 and the "Gas Station" 2205 whose address is in Pittsburgh, Pa. is displayed in the map display 224 of FIG. 23. Additionally, the route planner window 2303 illustrates the order of the origin 2301 and destination 2302 of the route 2304.

As people skilled in the art will appreciate, multiple POIs can be added to the route 2304 using this approach, such that each POI, in this embodiment, is added as the last destination in the route 2304 and displayed as such in the route planner window 2303. Additionally, this method of adding a destination to a route can be reversed, such that, in one embodiment, the graphical icon representation 2202 of the roster list user "Vehicle 1" 220 can be dragged onto a POI's graphical icon representation 2205 on the map display 224. In this embodiment, the order of the destinations is chronological, according to the time a new destination point was added to the route 2304. In both of these embodiments the route is dynamically calculated based on location updates from the real-time communication system 150.

Figure 25:
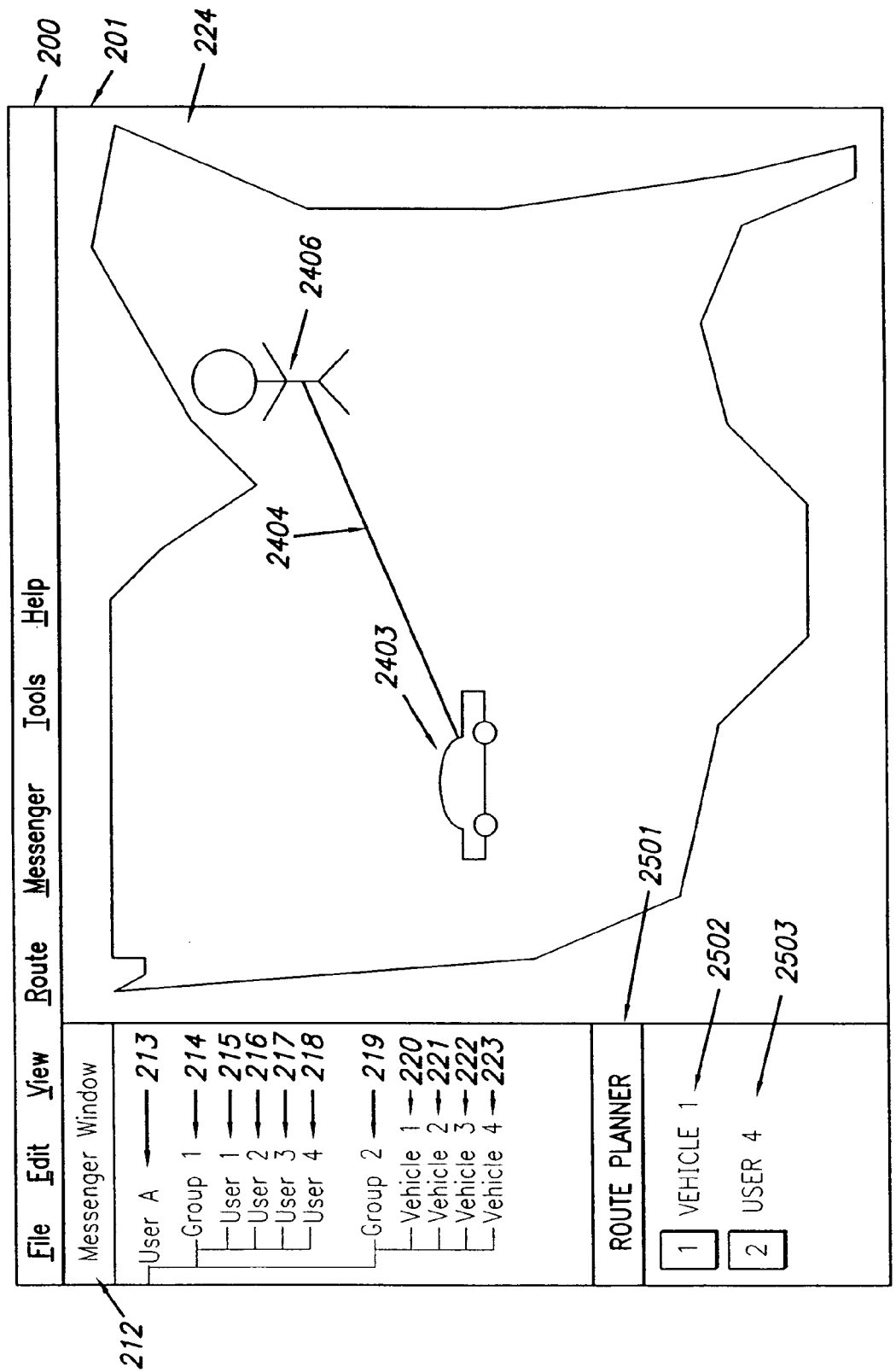
FIG. 25 illustrates one embodiment of the present invention for displaying the graphical route created in FIG. 24.

An added benefit of this invention is that the destination points of the previous embodiments do not have to be static POIs, but can be dynamic POIs that represent roster list users and the real-time communication system 150 can be used to obtain real-time location updates. One embodiment, shown in FIG. 24, includes two graphical icon representations 2403 & 2406 of roster list users "Vehicle 1" 220 and "User 4" 218, respectively. The selection of the graphical icon representation 2406 of roster list user "User 4" 218 causes the roster list window 212 list representation of "User 4" 218 to highlight 2407. Dragging the select user 2406 using the icon pointer 2405 so that it is positioned over the graphical icon representation 2403 of roster list user "Vehicle 1" 220 causes the roster list window 212 representation of user "Vehicle 1" 220 to highlight 2402. Once the graphical icon representation 2406 of roster list user "User 4" 218 is dropped or released onto the graphical icon representation 2403 of roster list user "Vehicle 1" 2403, a real-time route between the first user 2406 ('destination') and the second user 2403 ('origin') is created. Since the initial location information for both users are known, the real-time communication system 150 can be used when new position updates arrive, and then a new route is recalculated based on those new locations. Shown in FIG. 25 is the route 2504 calculated between the graphical icon representations for the origin user 2403 and destination user 2406.

The route planner window 2501 also shows the order of the route between the two users, where the origin 2502 is the location of "Vehicle 1" 220 and the destination 2503 is the location of "User 4" 218. As people skilled in the art will appreciate, multiple destinations can be added to this route using both static (i.e., POs) and dynamic (i.e., roster users) location-relevant objects, where the order, in this embodiment, of the new destination point is based on the order it was added.

Figure 26:
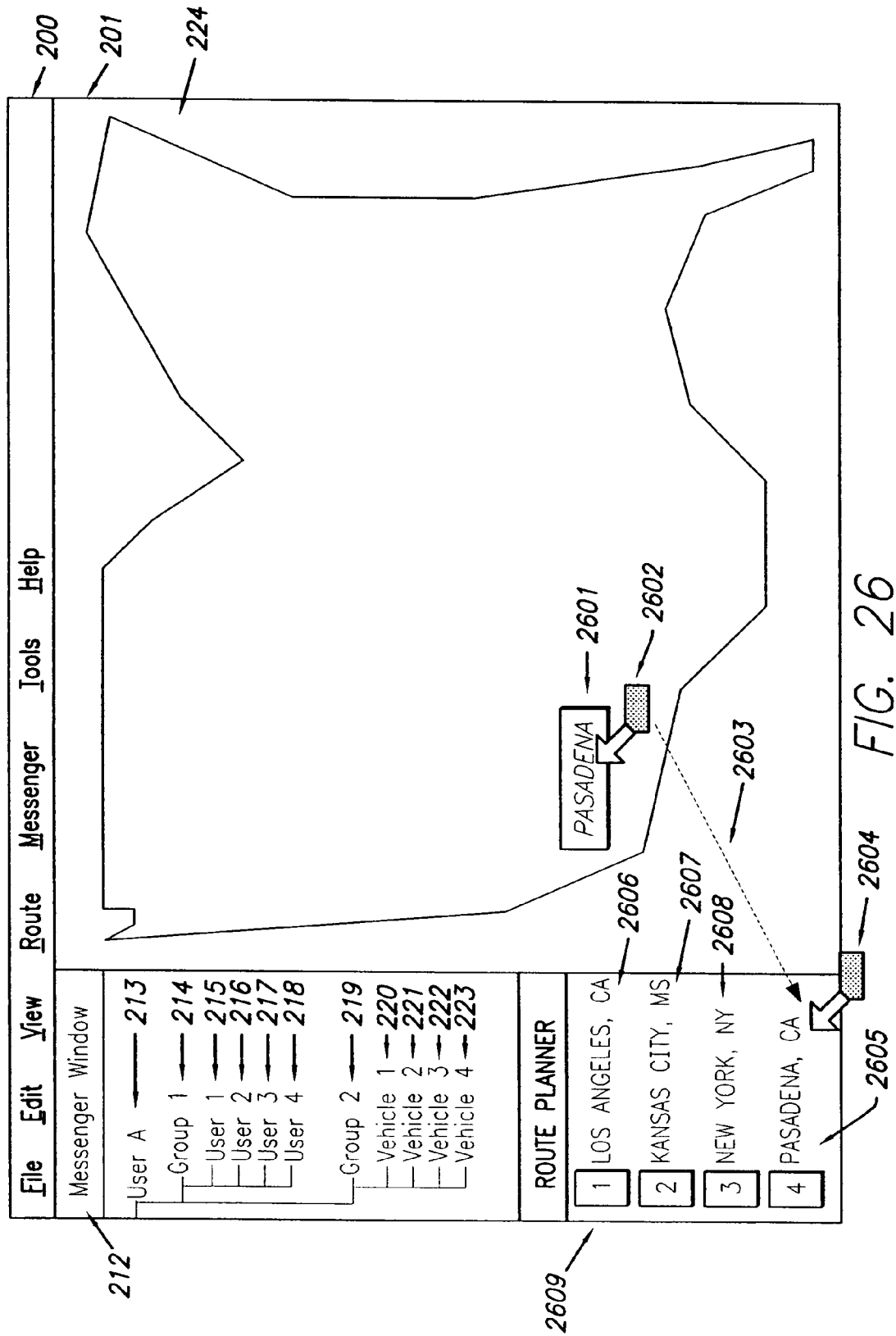
FIG. 26 illustrates one embodiment of the present invention for graphically adding location-relevant objects to a route planner using their icon representations.

Using this invention also allows for adding POIs to a route planner using a drag-and-drop method. In one embodiment, as shown in FIG. 26, a POI 2601, such as a map identifier (i.e., city name of Pasadena), can be graphically selected using an icon pointer 2602 and using a dragging motion 2603 or some other accepted practice used by those in the art. The selected POI 2601 can then be dragged into a route planner window 2609. The user can then use the icon pointer 2604 to drop the POI 2601 into the route planner window 2609, where the focus of the icon pointer 2604 relative to the current origin 2606 and destination points 2607 & 2608 determines the new order of the origin and destination points. For example, the POI 2601 was added to the end of the list of origin and destination points in the route planner window 2609, thus causing this POI 2601 to be the last destination 2605 of the route, which can be either a pre-calculated or a previously-uncalculated route.

Figure 27:
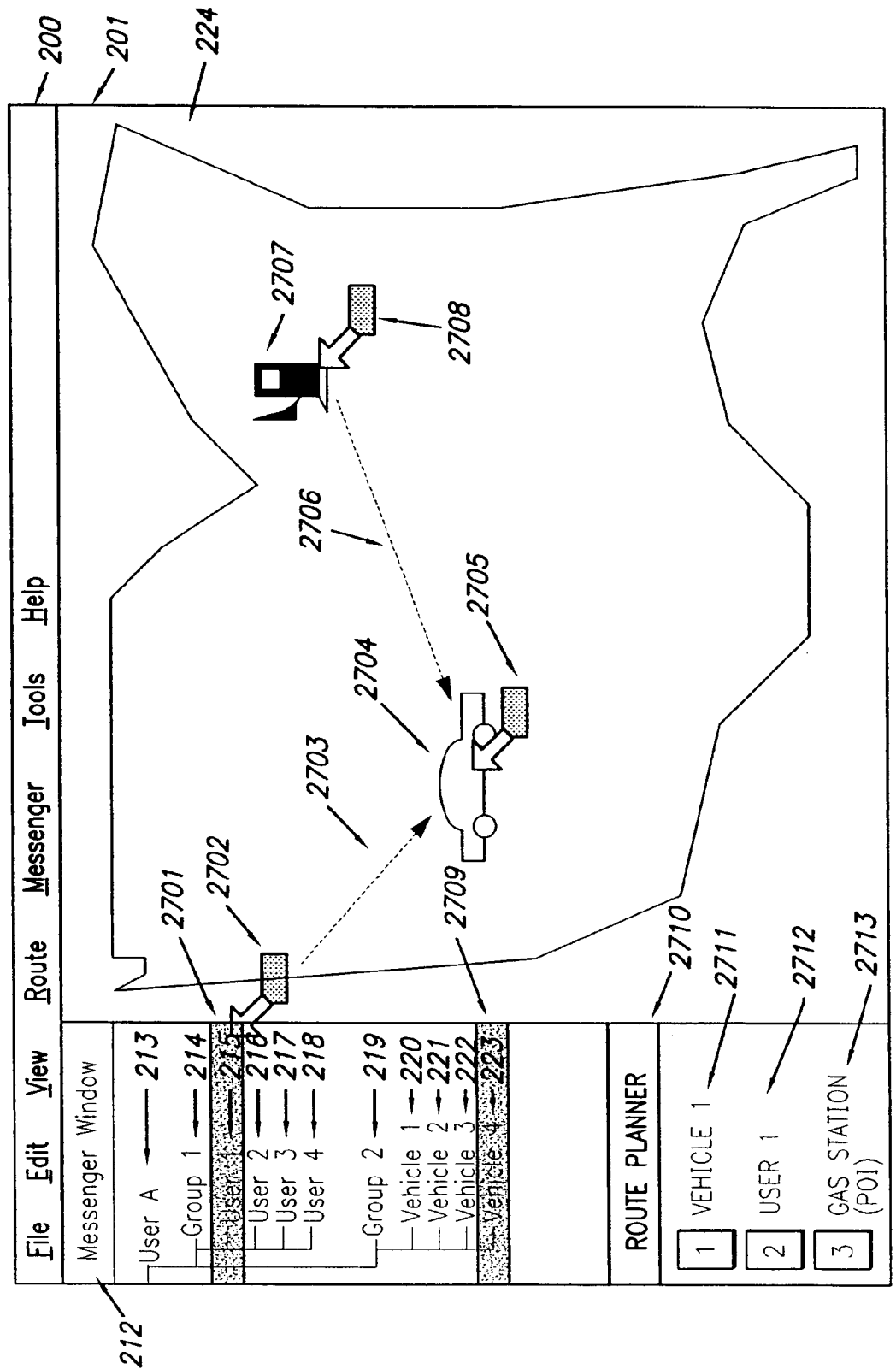
FIG. 27 illustrates one embodiment of the present invention for graphically adding destination points to a route using location-relevant objects.

Illustrating the use of a combination of both static POIs and dynamic POIs, which represent roster list users, in the graphical creation of a route is further shown in FIG. 27. In one embodiment, with the program in a route mode operation, a user can create a route by selecting 2701 the icon list representation of a roster list user "User 1" 215 using an icon pointer 2702. Then by dragging 2703 the roster list user icon list representation 215 to a graphical icon representation 2704 on a map display 224 and releasing it with the icon pointer 2705 focused over the destined objected 2704, so that the destined object's 2704 roster list representation 223 is highlighted 2709 in the roster list window 212. This action will add both objects to a route in the route planner window 2710.

For instance, the origin 2711 is the location of the destined object 2704 of the drag 2703 operation, and the first destination point 2712 is the location of the roster list user 215. The same process can be completed using a static POI 2707, where the user selects the POI 2707 using an icon pointer 2708 and drags 2706 the icon pointer to the desired map object 2704. When the icon pointer 2705 is focused on the desired map object 2704 on the map display 224 and then released both objects will be added to the route in the route planner window 2710. Since the destination object is already the origin 2711 in the route planner, the POI 2707 is added to the end of the destination points 2713 in the route planner window 2710. It should be noted that as location updates arrive using the real-time communication system 150, the location of all points in the route planner window 2710 that are tied to the real-time communication system 150 could be updated accordingly.

Figure 28:
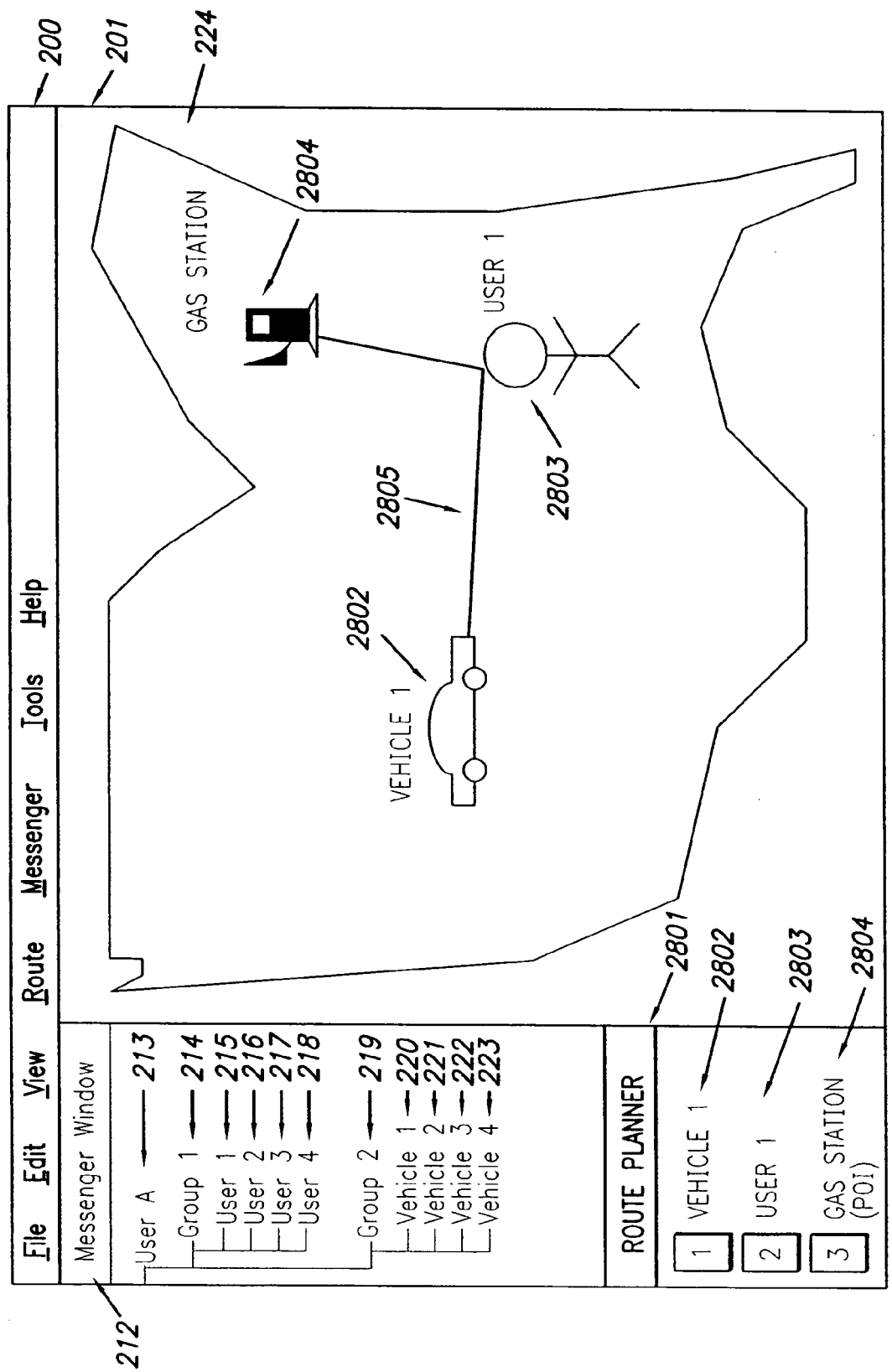
FIG. 28 illustrates one embodiment of the present invention for displaying the graphical route created in FIG. 24.

In one embodiment as shown in FIG. 28, after all destination points have been added using this graphical system and method, and a route is computed, a route 2805 is displayed in the route planner window 2801 and on the map display 224. The origin will be the user 2802 that was first selected and the first destination is that object 2803 upon which the first selected object was dropped. The second destination will be the POI 2804 that was added to the first selected object 2802. Thus, the new route 2805 will display the origin and destination points 2802 & 2803 & 2804 in both the map display 224 and route planner window 2801.

Figure 29:
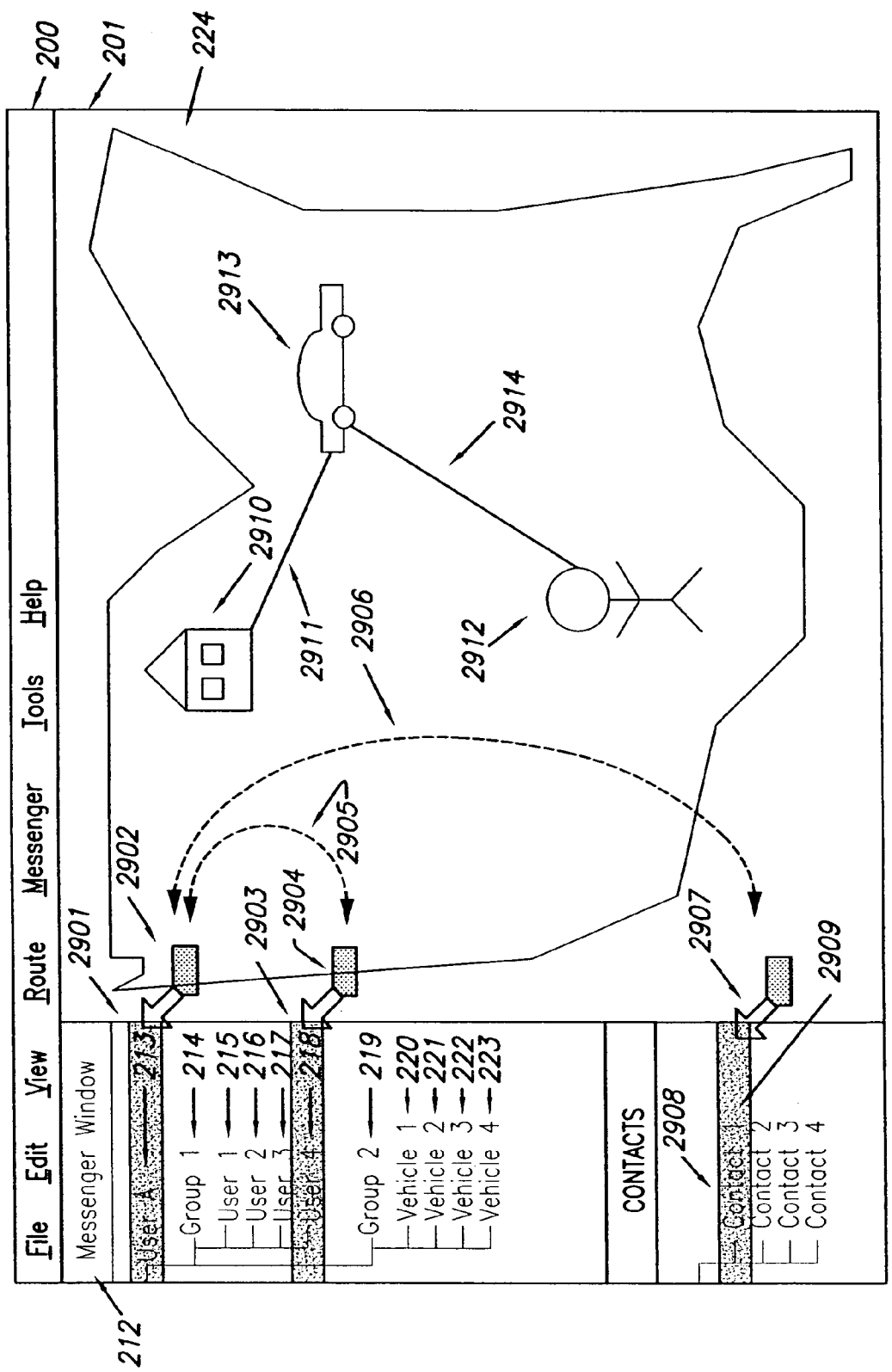
FIG. 29 illustrates one embodiment of the present invention for graphically creating routes using a roster list of users or contacts, where the local user is the origin of the route.

Another aspect of this invention, while in a route planner mode, allows an extremely efficient mechanism for creating routes to and from the local user's "User A" 213 current location. In one embodiment, for an in-vehicle navigation application, creating a route from the local user's "User A" 213 current location to the location of another user or contact simply involves selecting the local user's "User A" 213 roster list representation 213 with the icon pointer 2902, which will cause it to be highlighted 2901, and dragging 2905 it to another roster list user's list representation, such as "User 4" 218. When the icon pointer 2904 is focused over the user's list representation 218, as illustrated by it being highlighted 2903, and then dropped or released a route 2914 from the local user's "User A" location to the user's "User 4" 218 location is created. Additionally, selecting local user's "User A" roster list representation 213, which becomes highlighted upon selection, using the icon pointer 2902, then dragging 2906 the icon pointer 2907 to the list representation of a contact 2909, illustrated by the contact's list representation being highlighted 2908, and finally dropping or releasing it will create a route 2911 from the local user's "User A" location to the location of "Contact 1" 2909. Both of these embodiments can use the real-time communication system 150 for location updates. If both the user's and the contact's location information is stored locally or cached, then the real-time communication system 150 is not necessary. As illustrated in FIG. 29, the double arrows 2905 & 2906 indicate that the dragging operation process can be reversed, and the contacts and other users can be selected and then dragged and dropped into the local user's "User A" roster list representation 213 with the icon pointer.

Figure 30:
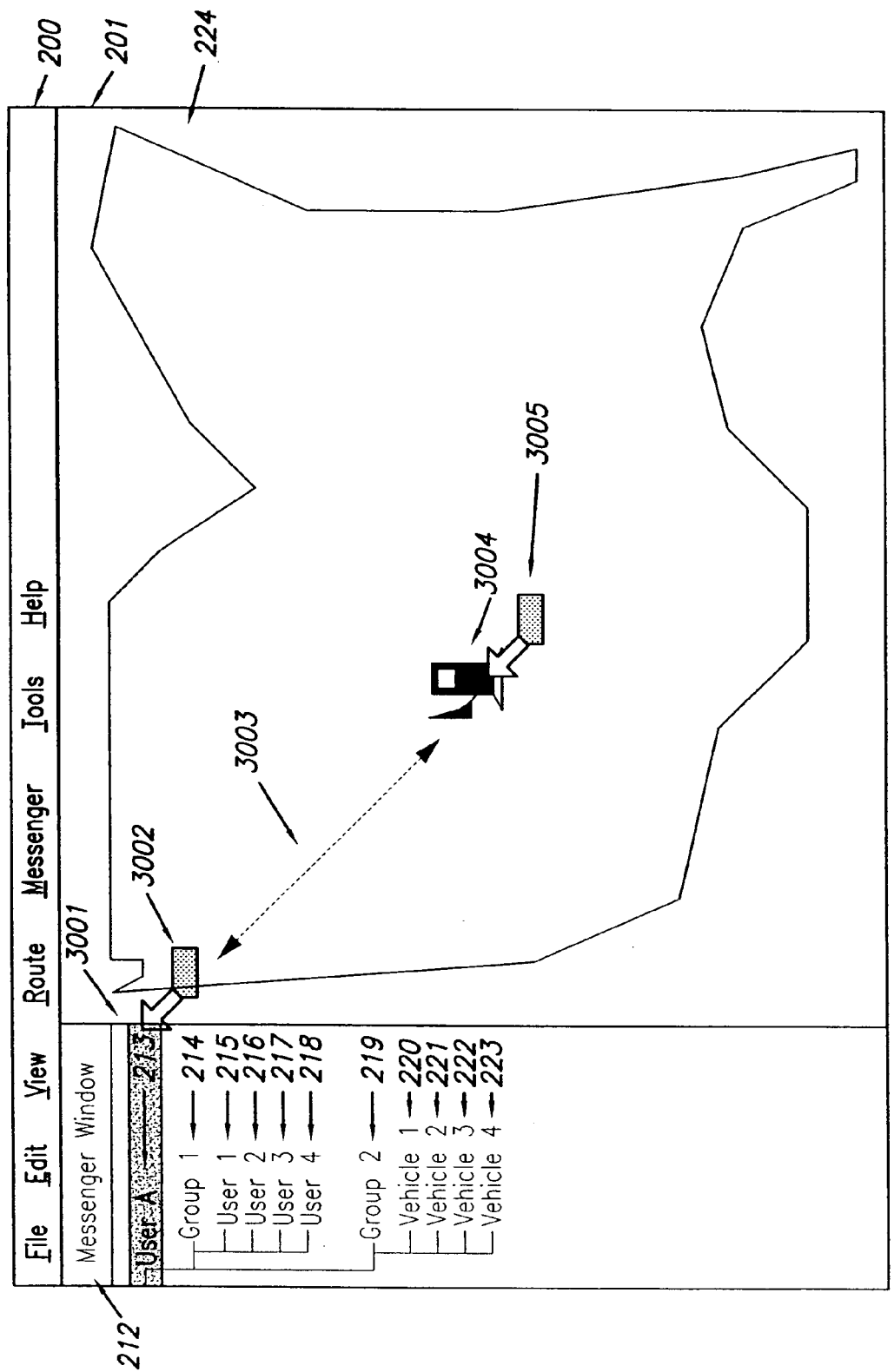
FIG. 30 illustrates one embodiment of the present invention for graphically creating routes using location-relevant objects on a map, where the local user is the origin of the route.
Figure 31:
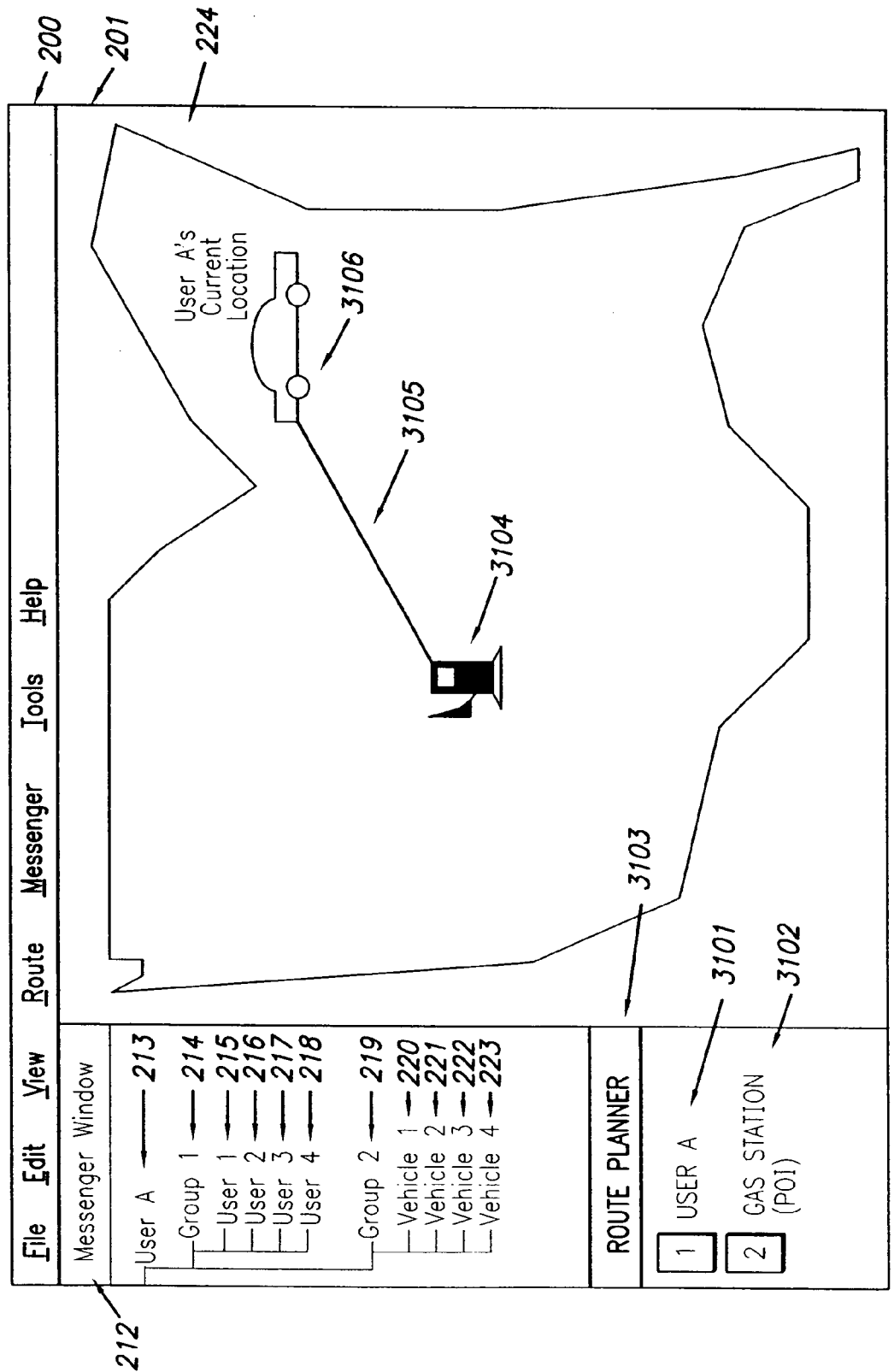
FIG. 31 illustrates one embodiment of the present invention for displaying the graphical route created in FIG. 30.

Other objects that can be used for route creation in an in-vehicle navigation system in route planner mode, such as shown in FIG. 30, include POIs or any graphical map object (i.e., map identifiers, users, etc.). In one embodiment, the local user's "User A" roster list representation 213 can be selected with the icon pointer 3002, illustrated by the local user's icon representation 213 being highlighted 3001, and then dragged 3003 and dropped using the icon pointer 3005 onto a POI 3004 in order to create a route. As illustrated in FIG. 31, a route 3105 is generated between the current location 3106 of "User A" 213 and the location of the POI 3104. Additionally, the route planner window 3103 is updated to include both the origin 3101 and destination 3102 points. It should be noted that the origin could be a moving point when it represents an object whose location information is updated locally or through the real-time communication system 150.

Figure 32:
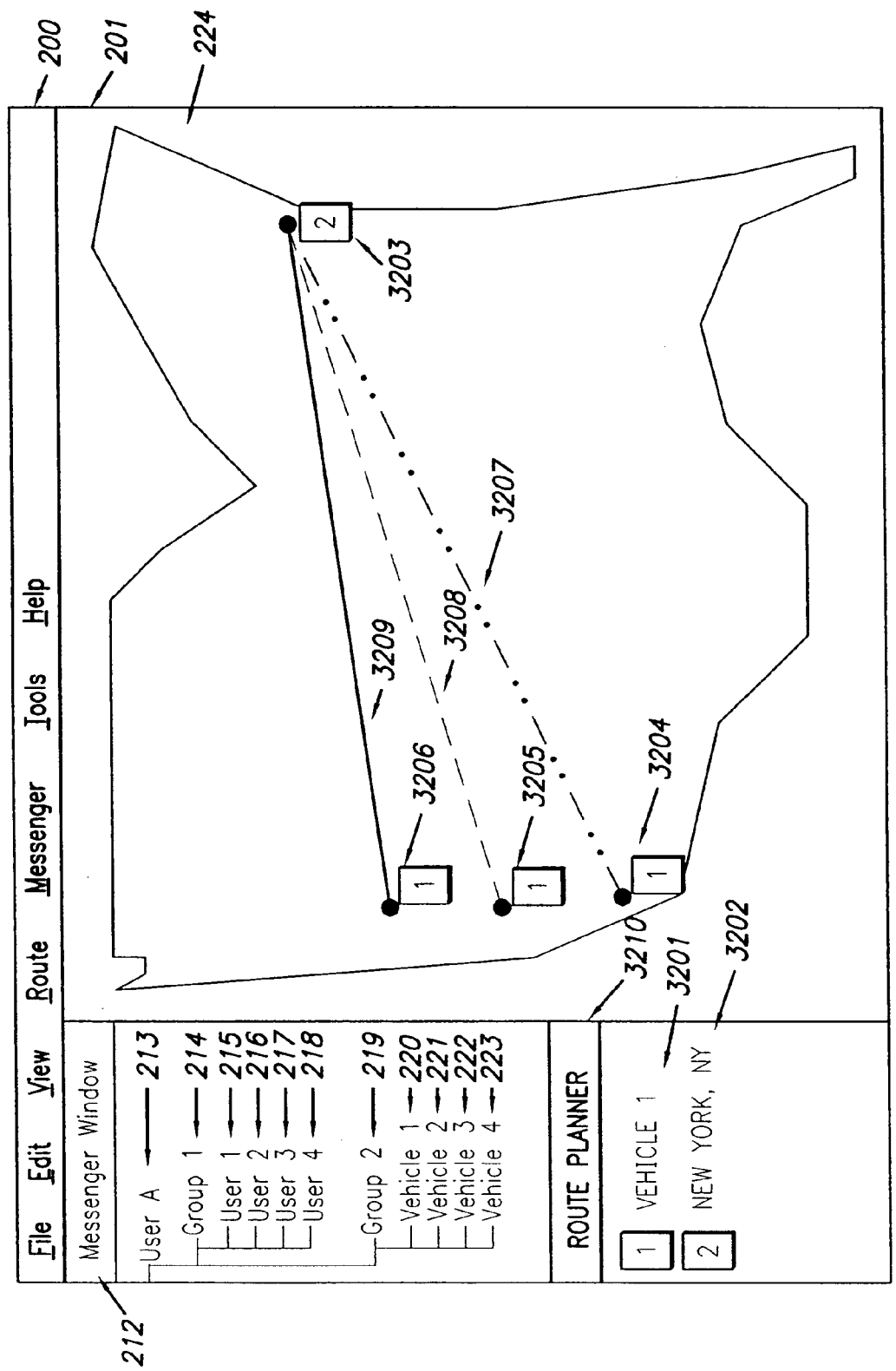
FIG. 32 illustrates one embodiment of the present invention for displaying a current dynamic route and a history of previous routes on the same map.

As people skilled in the art will appreciate, having a history trail based on a moving origin or destination points can provide a very necessary capability for graphically viewing location history trails based on real-world routes. In one embodiment, as shown in FIG. 32, an original route 3207 between an origin 3201 and destination 3202 is displayed in a route planner window 3210. The original route 3207 that was created is shown in the map display 224. As location updates arrive via the real-time communication system 150, the origin location of "Vehicle 1" 3201 & 220 changes thus changing its location on the map display 224.

The new origin location on the map display 224 is shown 3205, as well as the original destination point 3203. Additionally, a new route 3208 is computed between the new origin 3205 and original destination 3203. When the location of the origin 3201 changes again 3206 a new route 3209 will be computed based on the new origin location 3201 & 3206 and the original destination 3202 & 3203. Instead of erasing the original route 3207, it is displayed as a different color and pattern than the newly updated routes 3208 & 3209. In another embodiment, a legend can even be displayed to illustrate the pattern and color of the routes correlated with the time when they were updated. This route history allows the user to better graphically analyze the route information when using a dynamically updated route origin or destination.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

We claim:

1. A computer-readable medium for use in a communication device having a processor, a data storage medium, an input device, and a display device for providing a graphical interface, said graphical interface including a movable graphical pointer for selecting and moving graphical icons displayed on the graphical interface, said computer-readable medium including executable instructions comprising:
    displaying a first user graphical icon representing a first user device;
    displaying a second user graphical icon representing a second user device;
    retrieving first user location information associated with a location of said first user device; and
    in response to a command signal generated by said first user device moving a graphical pointer to select and move said first user graphical icon towards said second user graphical icon, sending said first user location information to said second user device.

2. The computer-readable medium for use in a communication device having a processor, a data storage medium, an input device, and a display device for providing a graphical interface, said graphical interface including a movable graphical pointer for selecting and moving graphical icons displayed on the graphical interface according to claim 1, wherein said first user location information is retrieved from said data storage medium.

3. The computer-readable medium for use in a communication device having a processor, a data storage medium, an input device, and a display device for providing a graphical interface, said graphical interface including a movable graphical pointer for selecting and moving graphical icons displayed on the graphical interface according to claim 1, wherein said executable instructions further comprise:
    requesting permission from said first user device to retrieve said first user location information.

4. The computer-readable medium for use in a communication device having a processor, a data storage medium, an input device, and a display device for providing a graphical interface, said graphical interface including a movable graphical pointer for selecting and moving graphical icons displayed on the graphical interface according to claim 1, wherein said executable instructions further comprise:
    requesting permission from said first user device to send said first user location information to said second user device.

5. The computer-readable medium for use in a communication device having a processor, a data storage medium, an input device, and a display device for providing a graphical interface, said graphical interface including a movable graphical pointer for selecting and moving graphical icons displayed on the graphical interface according to claim 1, wherein said executable instructions further comprise:
    retrieving second user location information associated with a location of said second user device; and
    displaying a graphical representation of a route connecting said location of said first user device and said location of the second user device.

6. The computer-readable medium for use in a communication device having a processor, a data storage medium, an input device, and a display device for providing a graphical interface, said graphical interface including a movable graphical pointer for selecting and moving graphical icons displayed on the graphical interface according to claim 5, wherein said second user location information is retrieved from said data storage medium.

7. The computer-readable medium for use in a communication device having a processor, a data storage medium, an input device, and a display device for providing a graphical interface, said graphical interface including a movable graphical pointer for selecting and moving graphical icons displayed on the graphical interface according to claim 5, wherein said executable instructions further comprise:
    retrieving updated first user location information associated with an updated location of said first user; and
    in response to a route recalculation signal, displaying a graphical representation of an updated route connecting said updated location of said first user device and said location of said second user device.

8. The computer-readable medium for use in a communication device having a processor, a data storage medium, an input device, and a display device for providing a graphical interface, said graphical interface including a movable graphical pointer for selecting and moving graphical icons displayed on the graphical interface according to claim 7, wherein said executable instructions further comprise:
    retrieving updated second user location information associated with an updated location of said second user device; and
    in response to a second route recalculation signal, displaying a graphical representation of a second updated route connecting said updated location of said first user device and said updated location of said second user device.

9. A communication device having a data storage medium, an input device, and a display device for providing a graphical interface, said graphical interface including a movable graphical pointer for selecting and moving graphical icons displayed on the graphical interface, a programmed processor executing instructions comprising:
    displaying a first user graphical icon representing a first user device;
    displaying a second user graphical icon representing a second user device;
    retrieving first user location information associated with a location of said first user device; and
    in response to a command signal generated by said first user device moving a graphical pointer to select and move said first user graphical icon towards said second user graphical icon, sending said first user location information to said second user device.

10. The communication device having a data storage medium, an input device, and a display device for providing a graphical interface, said graphical interface including a movable graphical pointer for selecting and moving graphical icons displayed on the graphical interface, a programmed processor executing instructions according to claim 9, wherein said first user location information is retrieved from said data storage medium.

11. The communication device having a data storage medium, an input device, and a display device for providing a graphical interface, said graphical interface including a movable graphical pointer for selecting and moving graphical icons displayed on the graphical interface, a programmed processor executing instructions according to claim 9, further comprising:

requesting permission from said first user device to retrieve said first user location information.

12. The communication device having a data storage medium, an input device, and a display device for providing a graphical interface, said graphical interface including a movable graphical pointer for selecting and moving graphical icons displayed on the graphical interface, a programmed processor executing instructions according to claim 9, further comprising:

requesting permission from said first user to send said first user location information to said second user device.

13. The communication device having a data storage medium, an input device, and a display device for providing a graphical interface, said graphical interface including a movable graphical pointer for selecting and moving graphical icons displayed on the graphical interface, a programmed processor executing instructions according to claim 9, further comprising:

retrieving second user location information associated with a location of said second user device; and displaying a graphical representation of a route connecting said location of said first user device and said location of said second user device.

14. The communication device having a data storage medium, an input device, and a display device for providing a graphical interface, said graphical interface including a movable graphical pointer for selecting and moving graphical icons displayed on the graphical interface, a programmed processor executing instructions according to claim 13, further comprising:

retrieving updated first user location information associated with an updated location of said first user device; and in response to a route recalculation signal, displaying a graphical representation of an updated route connecting said updated location of said first user device and said location of said second user device.

15. The communication device having a data storage medium, an input device, and a display device for providing a graphical interface, said graphical interface including a movable graphical pointer for selecting and moving graphical icons displayed on the graphical interface, a programmed processor executing instructions according to claim 14, further comprising:

retrieving updated second user location information associated with an updated location of said second user device; and in response to a second route recalculation signal, displaying a graphical representation of a second updated route connecting said updated location of said first user device and said updated location of said second user device.

16. A method for sending location information using a communication device having a processor, a data storage medium, an input device, and a display device for providing a graphical interface, said graphical interface including a movable graphical pointer for selecting and moving graphical icons displayed on the graphical interface, comprising:

displaying a first user graphical icon representing a first user device;

displaying a second user graphical icon representing a second user device;

retrieving first user location information associated with a location of said first user device; and in response to a command signal generated by said first user device moving a graphical pointer to select and move said first user graphical icon towards said second user graphical icon, sending said first user location information to said second user device.

17. The method for sending location information using a communication device having a processor, a data storage medium, an input device, and a display device for providing a graphical interface, said graphical interface including a movable graphical pointer for selecting and moving graphical icons displayed on the graphical interface according to claim 16, wherein said first user location information is retrieved from said data storage medium.

18. The method for sending location information using a communication device having a processor, a data storage medium, an input device, and a display device for providing a graphical interface, said graphical interface including a movable graphical pointer for selecting and moving graphical icons displayed on the graphical interface according to claim 16, further comprising:

requesting permission from said first user to retrieve said first user location information.

19. The method for sending location information using a communication device having a processor, a data storage medium, an input device, and a display device for providing a graphical interface, said graphical interface including a movable graphical pointer for selecting and moving graphical icons displayed on the graphical interface according to claim 16, further comprising:

requesting permission from said first user device to send said first user location information to said second user device.

20. The method for sending location information using a communication device having a processor, a data storage medium, an input device, and a display device for providing a graphical interface, said graphical interface including a movable graphical pointer for selecting and moving graphical icons displayed on the graphical interface according to claim 16, further comprising:

retrieving second user location information associated with a location of said second user device; and displaying a graphical representation of a route connecting said location of said first user device and said location of said second user device.

21. The method for sending location information using a communication device having a processor, a data storage medium, an input device, and a display device for providing a graphical interface, said graphical interface including a movable graphical pointer for selecting and moving graphical icons displayed on the graphical interface according to claim 20, wherein said second user location information is retrieved from said data storage medium.

22. The method for sending location information using a communication device having a processor, a data storage medium, an input device, and a display device for providing a graphical interface, said graphical interface including a movable graphical pointer for selecting and moving graphical icons displayed on the graphical interface according to claim 20, further comprising:

retrieving updated first user location information associated with an updated location of said first user; and in response to a route recalculation signal, displaying a graphical representation of an updated route connecting said updated location of said first user device and said location of said second user device.

23. The method for sending location information using a communication device having a processor, a data storage medium, an input device, and a display device for providing a graphical interface, said graphical interface including a movable graphical pointer for selecting and moving graphical icons displayed on the graphical interface according to claim 22, further comprising:
   retrieving updated second user location information associated with an updated location of said second user device; and
   in response to a second route recalculation signal, displaying a graphical representation of a second updated route connecting said updated location of said first user device and said updated location of said second user device.

24. A computer-readable medium for use in a communication device having a processor, a data storage medium, a display device, and a graphical touch screen input interface for selecting and moving graphical objects displayed on the display, said computer-readable medium including executable instructions comprising:
   displaying a first user graphical icon representing a first user device;
   displaying a second user graphical icon representing a second user device;
   retrieving first user location information associated with a location of said first user device; and
   in response to a command signal generated by said first user device using a graphical touch screen input interface to select and move said first user graphical icon towards said second user graphical icon, sending said first user location information to said second user device.

25. The computer-readable medium for use in a communication device having a processor, a data storage medium, a display device, and a graphical touch screen input interface for selecting and moving graphical objects displayed on the display according to claim 24, further comprising:
   retrieving said first user location information from said data storage medium.

26. The computer-readable medium for use in a communication device having a processor, a data storage medium, a display device, and a graphical touch screen input interface for selecting and moving graphical objects displayed on the display according to claim 24, further comprising:
   requesting permission from said first user device to retrieve said first user location information.

27. The computer-readable medium for use in a communication device having a processor, a data storage medium, a display device, and a graphical touch screen input interface for selecting and moving graphical objects displayed on the display according to claim 24, further comprising:
   requesting permission from the said user to send said first user location information to said second user device.

28. The computer-readable medium for use in a communication device having a processor, a data storage medium, a display device, and a graphical touch screen input interface for selecting and moving graphical objects displayed on the display according to claim 24, further comprising:
   retrieving second user location information associated with a location of said second user; and
   displaying a graphical representation of a route connecting said location of said first user and said location of said second user.

29. The computer-readable medium for use in a communication device having a processor, a data storage medium, a display device, and a graphical touch screen input interface for selecting and moving graphical objects displayed on the display according to claim 27, wherein said second user location information is retrieved from said data storage medium.

30. The computer-readable medium for use in a communication device having a processor, a data storage medium, a display device, and a graphical touch screen input interface for selecting and moving graphical objects displayed on the display according to claim 27, further comprising:
   retrieving updated first user location information associated with an updated location of said first user device; and
   in response to a route recalculation signal, displaying a graphical representation of an updated route connecting said updated location of said first user and said location of said second user.

31. The computer-readable medium for use in a communication device having a processor, a data storage medium, a display device, and a graphical touch screen input interface for selecting and moving graphical objects displayed on the display according to claim 29, further comprising:
   retrieving updated second user location information associated with an updated location of said second user device; and
   in response to a second route recalculation signal, displaying a graphical representation of a second updated route connecting said updated location of said first user device and said updated location of said second user device.

32. A communication device having a data storage medium, a display device, and a graphical touch screen input interface for selecting and moving graphical objects displayed on the display, a programmed processor for executing instructions comprising:
   displaying a first user graphical icon representing a first user device;
   displaying a second user graphical icon representing a second user device;
   retrieving first user location information associated with a location of said first user device; and
   in response to a command signal generated by said first user device using a graphical touch screen input interface to select and move said first user graphical icon towards said second user graphical icon, sending said first user location information to said second user device.

33. The communication device having a data storage medium, a display device, and a graphical touch screen input interface for selecting and moving graphical objects displayed on the display, a programmed processor for executing instructions according to claim 31, wherein said first user location information is retrieved from said data storage medium.

34. The communication device having a data storage medium, a display device, and a graphical touch screen input interface for selecting and moving graphical objects displayed on the display, a programmed processor for executing instructions according to claim 31, further comprising:
   requesting permission from said first user device to retrieve said first user location information.

35. The communication device having a data storage medium, a display device, and a graphical touch screen input interface for selecting and moving graphical objects displayed on the display, a programmed processor for executing instructions according to claim 31, further comprising:

requesting permission from said first user device to send said first user location information to said second user device.

36. The communication device having a data storage medium, a display device, and a graphical touch screen input interface for selecting and moving graphical objects displayed on the display, a programmed processor for executing instructions according to claim 31, further comprising:
retrieving second user location information associated with a location of said second user; and
displaying a graphical representation of a route connecting said location of said first user device and said location of said second user.

37. The communication device having a data storage medium, a display device, and a graphical touch screen input interface for selecting and moving graphical objects displayed on the display, a programmed processor for executing instructions according to claim 35, further comprising:
retrieving updated first user location information associated with an updated location of said first user device; and
in response to a route recalculation signal, displaying a graphical representation of an updated route connecting between said updated location of said first user device and said location of said second user device.

38. The communication device having a data storage medium, a display device, and a graphical touch screen input interface for selecting and moving graphical objects displayed on the display, a programmed processor for executing instructions according to claim 36, further comprising:
retrieving updated second user location information associated with an updated location of said second user device; and
in response to a second route recalculation signal, displaying a graphical representation of a second updated route connecting between said updated location of said first user device and said updated location of said second user device.

39. A method for sending location information using a communication device having a processor, a data storage medium, a display device, and a graphical touch screen input interface for selecting and moving graphical objects displayed on the graphical interface, comprising:
displaying a first user graphical icon representing a first user device;
displaying a second user graphical icon representing a second user device;
retrieving first user location information associated with a location of said first user device; and
in response to a command signal generated by said first user device using a graphical touch screen input interface to select and move said first user graphical icon towards said second user graphical icon, sending said first user location information to said second user device.

40. The method for sending location information using a communication device having a processor, a data storage medium, a display device, and a graphical touch screen input interface for selecting and moving graphical objects displayed on the graphical interface according to claim 38, wherein said first user location information is retrieved from said data storage medium.

41. The method for sending location information using a communication device having a processor, a data storage medium, a display device, and a graphical touch screen input interface for selecting and moving graphical objects displayed on the graphical interface according to claim 38, further comprising:
requesting permission from said first user device to retrieve said first user location information.

42. The method for sending location information using a communication device having a processor, a data storage medium, a display device, and a graphical touch screen input interface for selecting and moving graphical objects displayed on the graphical interface according to claim 38, further comprising:
requesting permission from said first user device to send to said second user device said first user location information.

43. The method for sending location information using a communication device having a processor, a data storage medium, a display device, and a graphical touch screen input interface for selecting and moving graphical objects displayed on the graphical interface according to claim 38, further comprising:
retrieving second user location information associated with a location of said second user device; and
displaying a graphical representation of a route connecting said location of said first user device and said location of said second user device.

44. The method for sending location information using a communication device having a processor, a data storage medium, a display device, and a graphical touch screen input interface for selecting and moving graphical objects displayed on the graphical interface according to claim 42, wherein said second user location information is retrieved from said data storage medium.

45. The method for sending location information using a communication device having a processor, a data storage medium, a display device, and a graphical touch screen input interface for selecting and moving graphical objects displayed on the graphical interface according to claim 42, further comprising:
retrieving updated first user location information associated with an updated location of said first user device; and
in response to a route recalculation signal, displaying a graphical representation of an updated route connecting said updated location of said first user device and said location of said second user device.

46. The method for sending location information using a communication device having a processor, a data storage medium, a display device, and a graphical touch screen input interface for selecting and moving graphical objects displayed on the graphical interface according to claim 42, further comprising:
retrieving updated second user location information associated with an updated location of said second user device; and
in response to a second route recalculation signal, displaying a graphical representation of a second updated route connecting said updated location of said first user device and said updated location of said second user device.

47. A method of communicating location information, comprising:
displaying a first user graphical icon representing a first user device;
displaying a second user graphical icon representing a second user device;
retrieving first user location information associated with a location of said first user device; and in response to a command signal generated by said first user device moving a graphical pointer to select and move said first user graphical icon towards said second user graphical icon, sending said first user location information to said second user device.

48. The method of communicating location information according to claim 47, further comprising:
requesting permission from said first user device to retrieve said first user location information.

49. The method of communicating location information according to claim 47, further comprising:
requesting permission from said first user device to send said first user location information to said second user device.

50. The method of communicating location information according to claim 47, further comprising:
retrieving second user location information associated with a location of said second user device; and
displaying a graphical representation of a route connecting said location of said first user device and said location of the second user device.

51. A method of communicating location information, comprising:
displaying a first user graphical icon representing a first user device;
displaying a second user graphical icon representing a second user device;
retrieving first user location information associated with a location of said first user device; and
in response to a command signal generated by said first user device using a graphical touch screen input interface to select and move said first user graphical icon towards said second user graphical icon, sending said first user location information to said second user device.

52. The method of communicating location information according to claim 51, further comprising:
requesting permission from said first user device to retrieve said first user location information.

53. The method of communicating location information according to claim 51, further comprising:
requesting permission from said first user device to send said first user location information to said second user device.

54. The method of communicating location information according to claim 51, further comprising:
retrieving second user location information associated with a location of said second user device; and
displaying a graphical representation of a route connecting said location of said first user device and said location of the second user device.

\* \* \* \* \*